(12) United States Patent
Kaede

(10) Patent No.: US 12,152,900 B2
(45) Date of Patent: Nov. 26, 2024

(54) INFORMATION PROCESSING APPARATUS, NON-TRANSITORY COMPUTER READABLE MEDIUM, AND METHOD

(71) Applicant: FUJIFILM Business Innovation Corp., Tokyo (JP)

(72) Inventor: Ikumi Kaede, Kanagawa (JP)

(73) Assignee: FUJIFILM Business Innovation Corp., Tokyo (JP)

( * ) Notice: Subject to any disclaimer, the term of this patent is extended or adjusted under 35 U.S.C. 154(b) by 362 days.

(21) Appl. No.: 17/590,062

(22) Filed: Feb. 1, 2022

(65) Prior Publication Data

US 2023/0061610 A1    Mar. 2, 2023

(30) Foreign Application Priority Data

Sep. 2, 2021  (JP) ................. 2021-143531

(51) Int. Cl.
| | |
|---|---|
| *G06Q 10/02* | (2012.01) |
| *G01C 21/36* | (2006.01) |
| *G02B 27/01* | (2006.01) |
| *G06F 3/14* | (2006.01) |
| *G06V 20/00* | (2022.01) |

(52) U.S. Cl.
CPC ..... *G01C 21/3679* (2013.01); *G02B 27/0172* (2013.01); *G06F 3/14* (2013.01); *G06V 20/00* (2022.01); *G02B 2027/014* (2013.01)

(58) Field of Classification Search
CPC ......... G09G 2354/00; G09G 2370/022; G09G 2380/06; G06V 20/00; G06V 20/20; G06F 3/14; G06F 3/147; G06F 3/0482; G02B 2027/014; G02B 2027/0141; G02B 27/017; G02B 27/0172; G02B 2027/0185; G02B 27/0179; G01C 21/3679; G06Q 10/02; G06Q 10/1093; G06Q 20/0457; G06Q 20/123; G06Q 20/3223; G06Q 20/3224; G06Q 20/3267; G06Q 30/0601; G06Q 50/01; G06Q 50/14; H04W 4/021; H04W 4/025; H04W 4/029
See application file for complete search history.

(56) References Cited

U.S. PATENT DOCUMENTS

| | | | |
|---|---|---|---|
| 10,359,839 B2 | 7/2019 | Kato et al. | |
| 10,809,530 B2 | 10/2020 | Kimura et al. | |
| 2017/0000348 A1* | 1/2017 | Karsten | ............... G06Q 10/1093 |
| 2021/0385611 A1* | 12/2021 | Takahara | ............... H04W 4/029 |

FOREIGN PATENT DOCUMENTS

| | | |
|---|---|---|
| JP | 2002-108829 A | 4/2002 |
| JP | 2008-77311 A | 4/2008 |
| JP | 2017-120550 A | 7/2017 |
| JP | 6402718 B2 | 10/2018 |

* cited by examiner

*Primary Examiner* — Dionne Pendleton
(74) *Attorney, Agent, or Firm* — Oliff PLC

(57) ABSTRACT

An information processing apparatus includes a processor configured to: obtain schedule information of a user; determine, based on the schedule information of the user, facility information to present to the user, the facility information including information on one or more facilities the user is not scheduled to visit around a current position of the user; and present the facility information to the user.

20 Claims, 30 Drawing Sheets

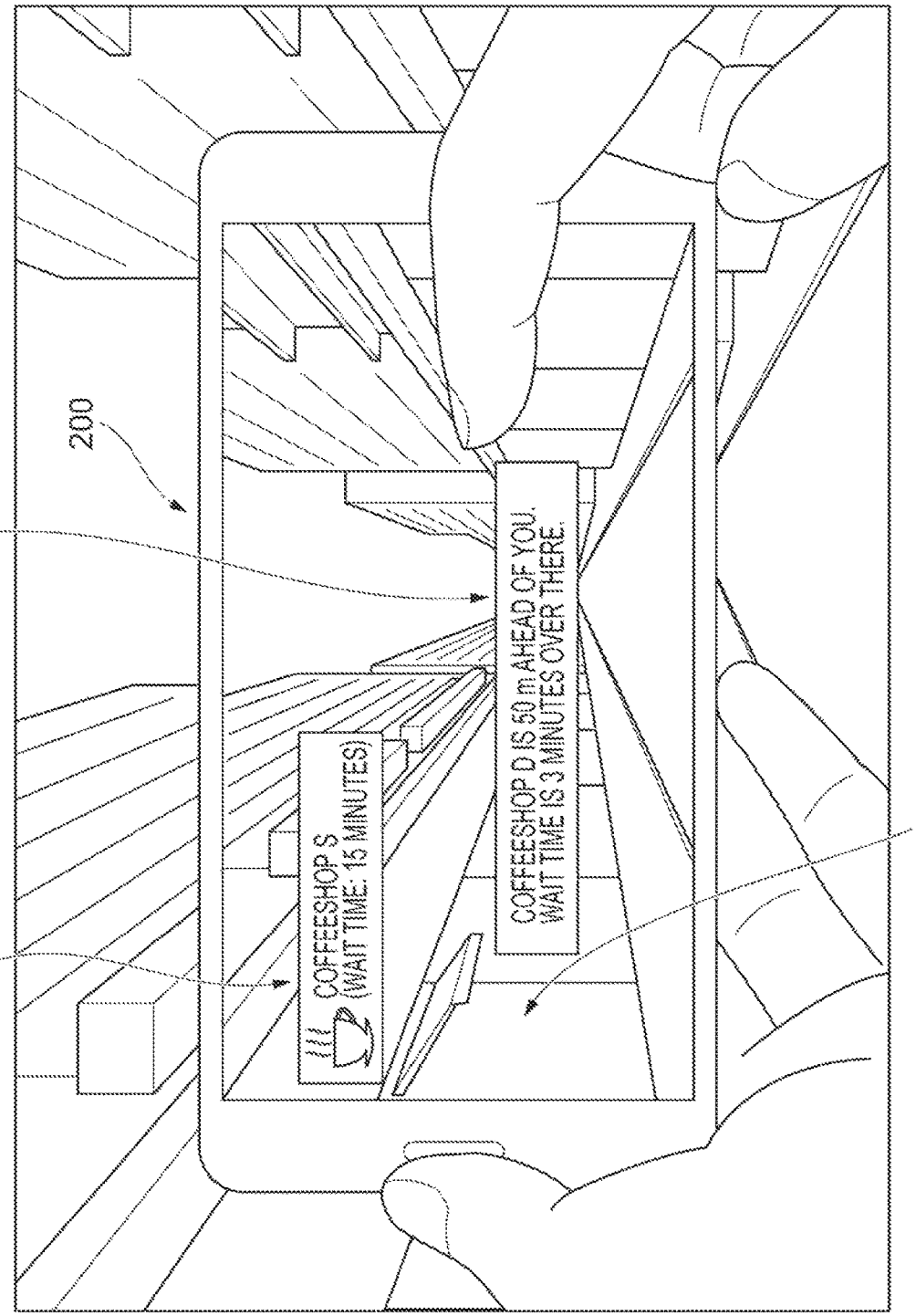

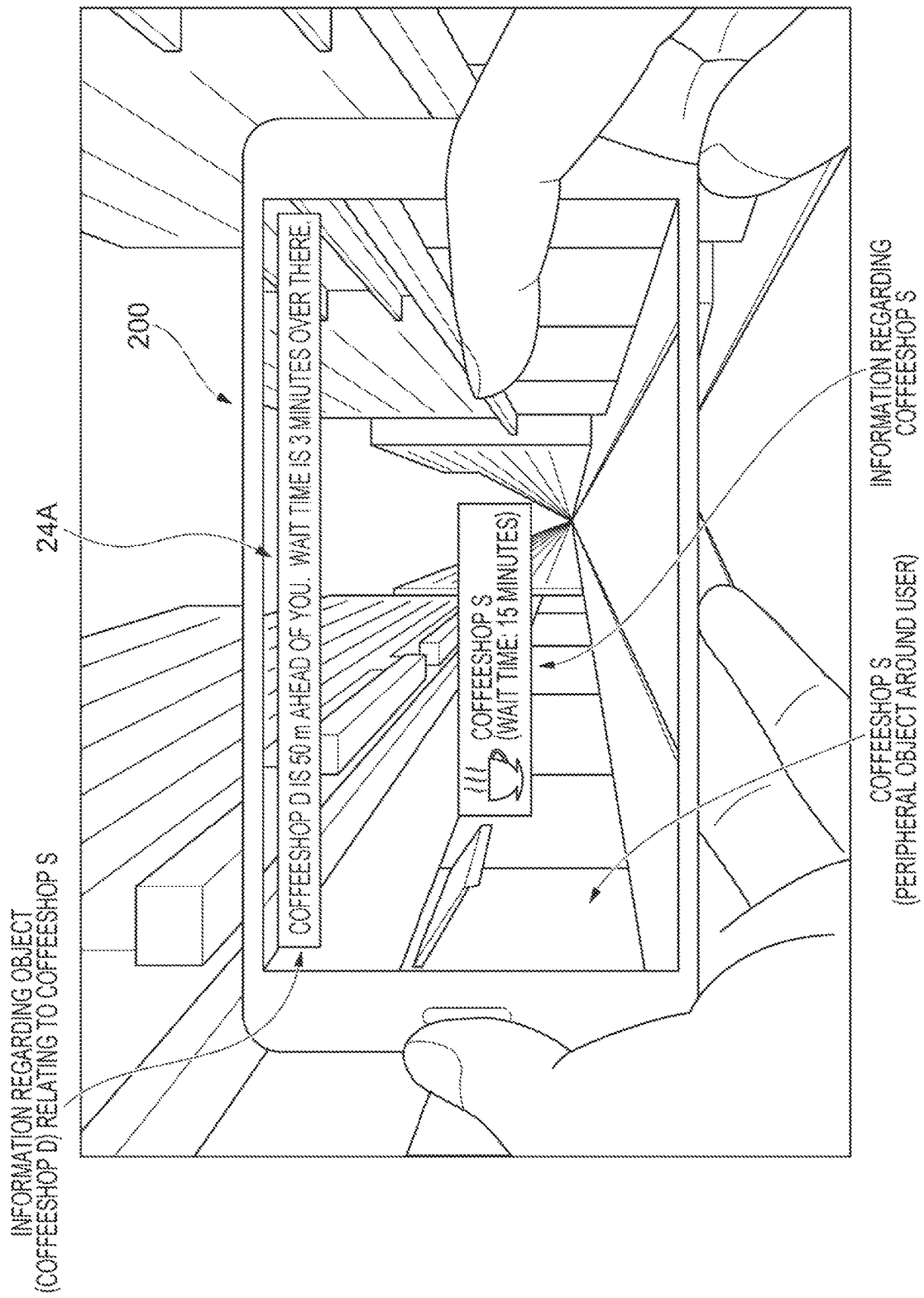

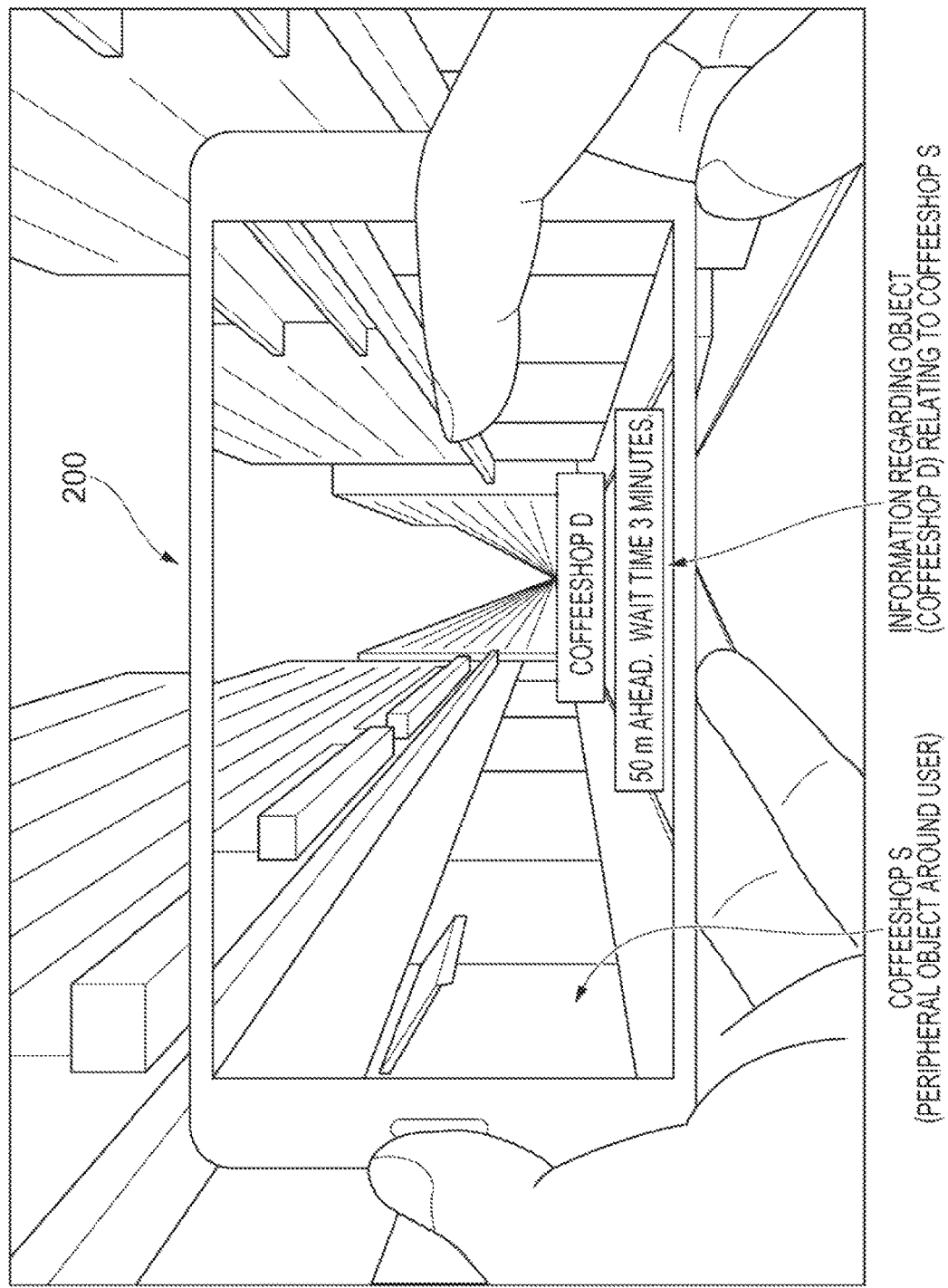

FIG. 29

| FACILITY ID | FACILITY NAME | POSITIONAL INFORMATION | TYPE OF BUSINESS | RATING | CURRENT CONGESTION STATUS | APPROXIMATE STAY TIME | TAKEAWAY | ONLINE RESERVATION/ORDER | PRESENTATION AS RELATED OBJECT | AFFILIATED FACILITIES | CAMPAIGN |
|---|---|---|---|---|---|---|---|---|---|---|---|
| 001 | COFFEESHOP S | | CAFE | 4.3/5.0 | WAIT TIME 15 min. | 5 TO 30 min. | YES | https://www.s... | NO | 002, 006, 007 | YES |
| 002 | WATCH STORE C | | SHOP (WATCH STORE) | 3.8/5.0 | NOT CROWDED | 5 TO 30 min. | N/A | | NO | 001 | YES |
| 003 | RESTAURANT S | | RESTAURANT (CASUAL) | 4.0/5.0 | VERY CROWDED | 30 TO 60 min. | NO | N/A | YES | | YES |
| 004 | COFFEESHOP T | | CAFE | 4.1/5.0 | WAIT TIME 3 min. | 5 TO 30 min. | YES | N/A | NO | | |
| 005 | MODERN MUSEUM | | MUSEUM | 3.9/5.0 | BIT CROWDED | 60 TO 90 min. | N/A | N/A | NO | | |
| 006 | COFFEESHOP D | | CAFE | 4.0/5.0 | WAIT TIME 3 min. | 5 TO 30 min. | YES | https://www.d... | YES | 001 | YES |
| 007 | BOOTH | | RENTAL SPACE | 3.5/5.0 | IN USE | 15 TO 60 min. | N/A | https://www.c... | YES | 001 | |

INFORMATION PROCESSING APPARATUS, NON-TRANSITORY COMPUTER READABLE MEDIUM, AND METHOD

CROSS-REFERENCE TO RELATED APPLICATIONS

This application is based on and claims priority under 35 USC 119 from Japanese Patent Application No. 2021-143531 filed Sep. 2, 2021.

BACKGROUND

(i) Technical Field

The present disclosure relates to an information processing apparatus, a non-transitory computer readable medium, and a method.

(ii) Related Art

Japanese Unexamined Patent Application Publication No. 2017-120550 discloses a process where if an activity state of a user is determined as a first state, a first operation input method for operating an operation target through a first operation is selected, and if the activity state of the user is determined as a second state, a second operation input method for operating the operation target through a second operation, which is different from the first operation, is selected.

Japanese Unexamined Patent Application Publication No. 2002-108829 discloses a process where when time currently remaining until an activity start time reaches a certain period of time, a user is notified of stored schedule data.

Japanese Unexamined Patent Application Publication No. 2008-77311 discloses a process comprising: creating a route plan from a departure point to a destination; and causing a display to display route guidance based on the route plan.

SUMMARY

There is a function of presenting information regarding objects within a user's view. With this function, information regarding all objects included in a user's view or all objects recognized by a user might be presented. In this case, an excessive amount of information may be presented.

Aspects of non-limiting embodiments of the present disclosure relate to display of information to a user after making a determination as to the display of the information using schedule information regarding the user.

Aspects of certain non-limiting embodiments of the present disclosure overcome the above disadvantages and/or other disadvantages not described above. However, aspects of the non-limiting embodiments are not required to overcome the disadvantages described above, and aspects of the non-limiting embodiments of the present disclosure may not overcome any of the disadvantages described above.

According to an aspect of the present disclosure, there is provided an information processing apparatus including a processor configured to: obtain schedule information of a user; determine, based on the schedule information of the user, facility information to present to the user, the facility information including information on one or more facilities the user is not scheduled to visit around a current position of the user; and present the facility information to the user.

BRIEF DESCRIPTION OF THE DRAWINGS

An exemplary embodiment of the present disclosure will be described in detail based on the following figures, wherein:

FIG. 23 is a diagram illustrating the terminal apparatus displaying information on a peripheral object around the user and information on a related object related to the peripheral object;

FIG. 24A is a diagram illustrating another exemplary position to display the information on the related object;

FIG. 25 is a diagram illustrating the terminal apparatus displaying information on a related object related to the peripheral object;

FIG. 29 is a diagram illustrating an exemplary database referred to by a central processing unit (CPU).

DETAILED DESCRIPTION

Exemplary embodiments of the present disclosure will be described in detail hereinafter with reference to the accompanying drawings.

Figure 1:
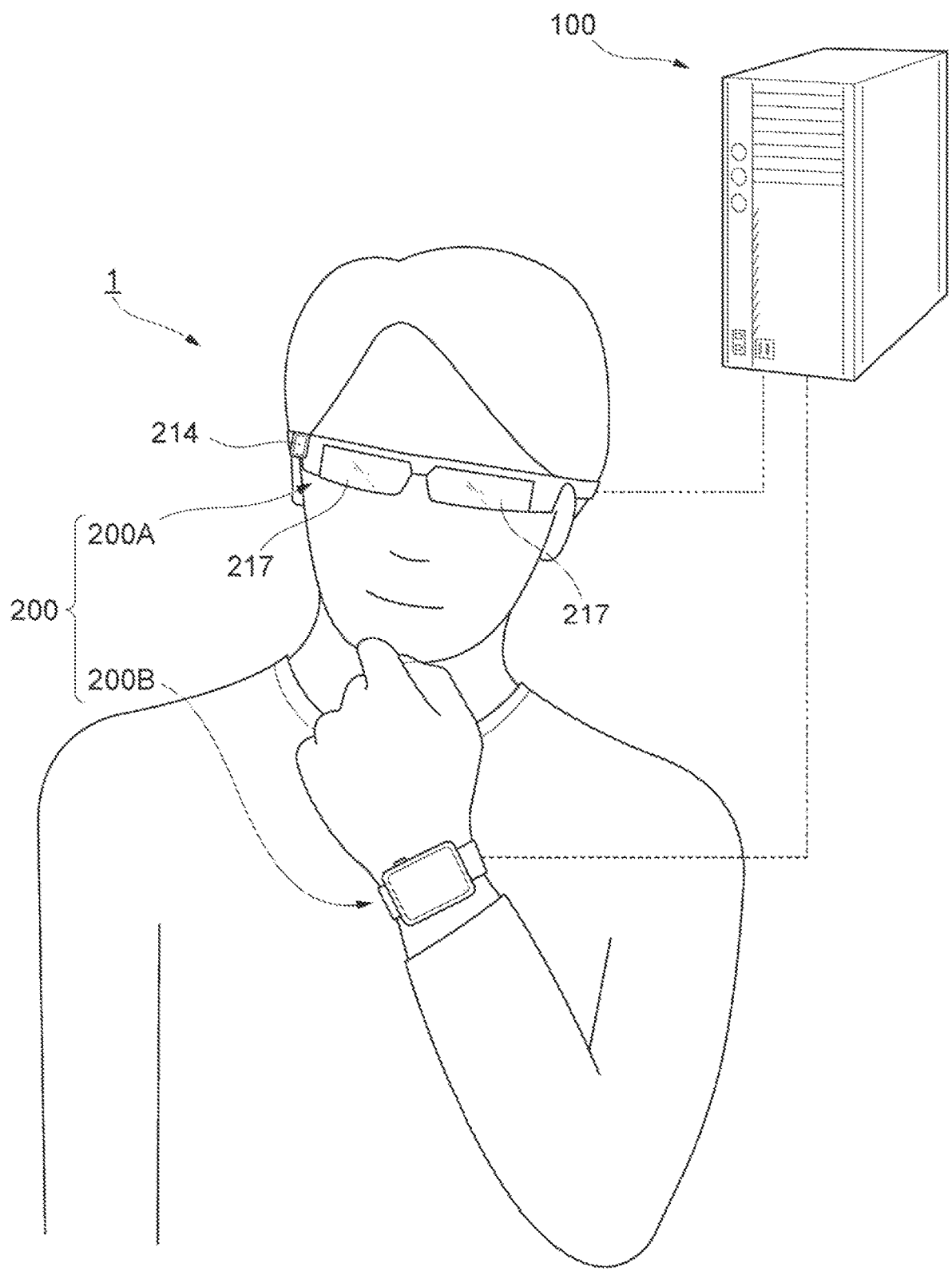
FIG. 1 is a diagram illustrating an exemplary configuration of an information processing system.

FIG. 1 is a diagram illustrating an exemplary configuration of an information processing system 1 comprising a plurality of information processing apparatuses communicating with each other. More specifically, the information processing system 1 comprises terminal apparatuses 200 owned by a user and an external server 100 that communicates information with the terminal apparatuses 200.

The terminal apparatuses 200 and the external server 100 are connected for example by a communication network such as the Internet.

In the exemplary configuration illustrated in FIG. 1, the user is wearing an eye-wearable terminal apparatus 200A and a wrist-wearable terminal apparatus 200B as exemplary terminal apparatuses 200. The terminal apparatuses 200 may not necessarily be terminal apparatuses worn by a user. Other examples of the terminal apparatuses 200 include a smartphone. A user may not necessarily have two terminal apparatuses 200. He/she may have one terminal apparatuses 200 or three or more terminal apparatuses 200.

Although not illustrated in FIG. 1, different users may have their own terminal apparatuses 200 that are connected to the external server 100.

Figure 2:
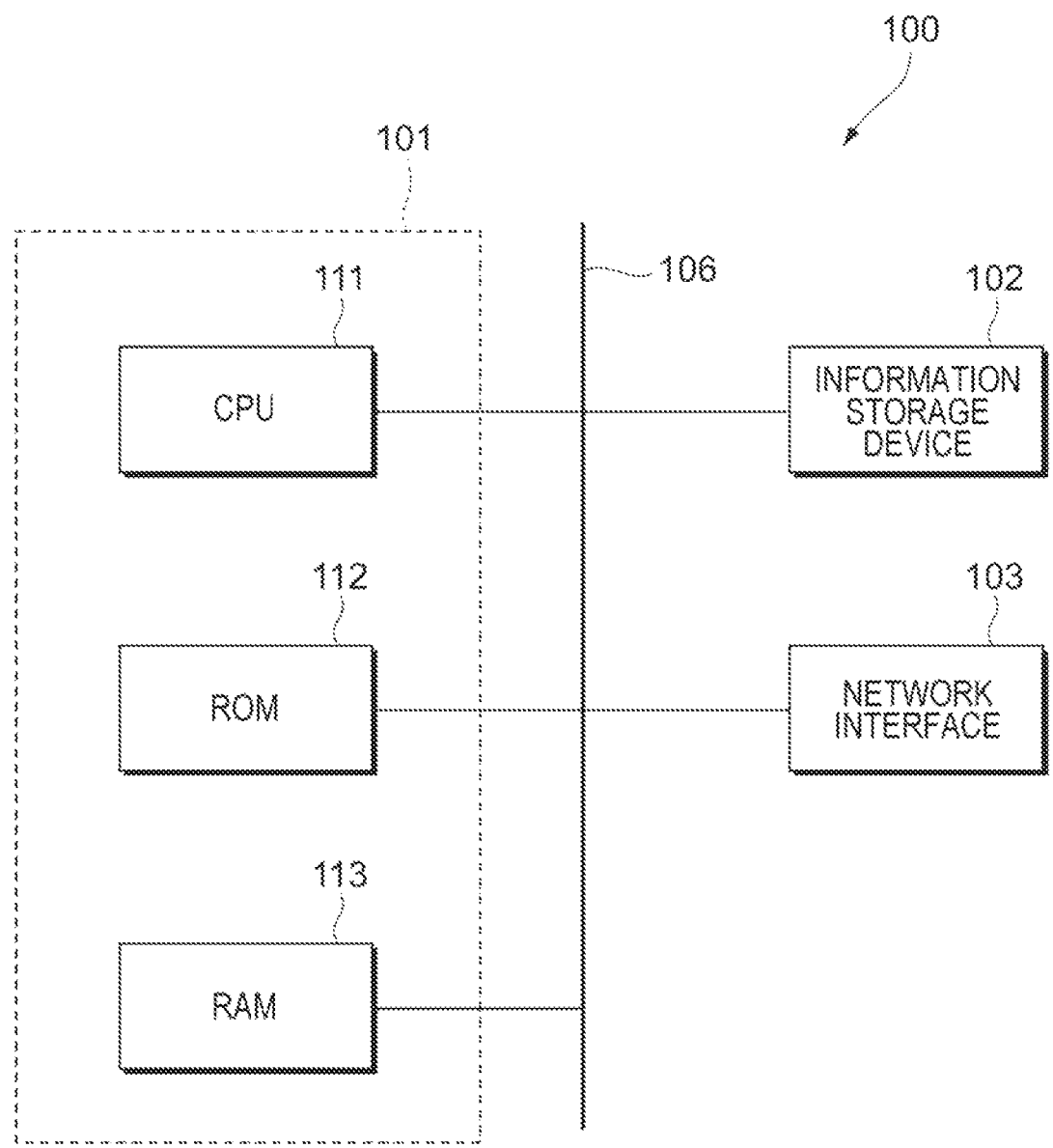
FIG. 2 is a diagram illustrating an exemplary hardware configuration of an external server.

FIG. 2 is a diagram illustrating an exemplary hardware configuration of the external server 100.

The exemplary external server 100 (an example of an information processing apparatus) includes an information processing unit 101, an information storage device 102 for storing information, and a network interface 103 which enables communication via a local area network (LAN) cable or the like.

The exemplary information processing unit 101 includes a CPU 111, which is an example of a processor, a read-only memory (ROM) 112 storing basic software, a basic input/output system (BIOS), and the like, and a random-access memory (RAM) 113 used as a working area.

The CPU 111 may for example be a multi-core processor. The ROM 112 may for example be a rewritable nonvolatile semiconductor memory.

The information storage device 102 may for example be a hard disk drive, a semiconductor memory, or a magnetic tape.

The information processing unit 101, the information storage device 102, and the network interface 103 are connected to one another through a bus 106 or a signal line that is not illustrated.

A program to be executed by the CPU 111 may be stored in a computer-readable storage medium such as a magnetic storage medium (a magnetic tape, a magnetic disk, etc.), an optical storage medium (an optical disc etc.), a magneto-optical storage medium, or a semiconductor memory and provided for the external server 100. The program to be executed by the CPU 111 may be provided for the external server 100 using communication means such as the Internet, instead.

The external server 100 communicates with the terminal apparatuses 200 (refer to FIG. 1), which move together with the user.

The CPU 111 of the external server 100 controls information to present to the user. In an example, the external server 100 controls provision of information regarding peripheral objects around the user (hereinafter referred to as "peripheral object information").

The CPU 111 of the external server 100 identifies peripheral objects around the user based on an image obtained, for example, by a camera that moves together with the user (e.g., camera 214). The peripheral objects may be identified by an apparatus other than the external server 100, for example by any of the terminal apparatuses 200.

The CPU 111 of the external server 100 controls provision of the information regarding the identified peripheral objects.

More specifically, the CPU 111 of the external server 100 may control peripheral object information to display on displays 217 (refer to FIG. 1) of the terminal apparatus 200.

In an exemplary embodiment, the external server 100 may control provision of information to the terminal apparatuses 200. In another exemplary embodiment, the terminal apparatuses 200 may control the provision of the information without using the external server 100.

Various information regarding the user, such as schedule information of the user, may be stored in the terminal apparatuses 200 or other apparatuses such as the external server 100. The terminal apparatuses 200 may obtain the information regarding the user by accessing the external server 100 and determine information to present to the user based on the obtained information.

A method for presenting the information to the user is not limited to a visual method such as displaying the information on a display. For example, the information may be presented to the user by audio.

In an exemplary embodiment, the information storage device 102 (refer to FIG. 2) of the external server 100 stores schedule information of the user of the terminal apparatuses 200. The schedule information of the user includes information regarding one or more schedules of the user. The CPU 111 of the external server 100 determines information to present to the user based on the schedule information. The information determined to be presented to the user is transmitted to the terminal apparatuses 200 to be displayed on the terminal apparatuses 200.

"Schedules" herein refer to events scheduled to take place or scheduled to have taken place. Events scheduled to have taken place may include not only events that have actually taken place as scheduled but also events that have not taken place as scheduled. Examples include business meetings, business trips, classes, exams, leisure trips, meals, overnight stays, hanging out with someone, shopping, seeing a doctor, having a haircut, picking up a child from a kindergarten, and doing homework. Schedules may include special occasions and day-to-day activities.

Examples of information regarding a schedule include a name of the schedule, a type of the schedule, a place of the schedule, a scheduled time (a start time, an end time, a time limit, etc.), repetition settings, related people (organizer, attendees, etc.), notification settings, attached files, related unique resource locators (URLs), a map of the place, and a memo.

Schedule information may be obtained for example from (i) a calendar, (ii) a history of interpersonal communication, (iii) a history of service or system usage (e.g., reservation history and search history). Schedule information may be stored in the information storage device 102 or an information storage device other than the information storage device 102. The CPU 111 may obtain schedule information by requesting the schedule information from stored information or a stored history at appropriate times or obtain schedule information in advance at predetermined times.

Examples of the location of (i) the calendar include a calendar application installed on a terminal apparatus of a user and a cloud service. Examples of the calendar include an itinerary. A schedule of a user may be added to the calendar by having the user manually input a scheduled event or by automatically extracting events from other applications (e.g., email application) or any related services. When a user has published his/her calendar or is sharing his/her calendar with other people, schedules of the user may be added by other people. Furthermore, one calendar may be used to manage schedules of more than one user. For example, a facility like a healthcare center may have a calendar managing appointments with many different patients.

Examples of (ii) the interpersonal communication history include recorded telephone calls and video calls, received and sent emails, exchanged messages on conversational messaging or chat applications, and activities on social networking services (SNS). Interpersonal communication may include visual communication (e.g., communication using text, photos, graphics, moving images) and audio communication using sound (e.g., voice), and a combination thereof.

In order to obtain schedule information from an interpersonal communication history, techniques such as speech recognition, image analyses, and language analyses may be used. It is assumed, for example, that an information storage device of a smartphone owned by the user or an information storage device (not illustrated) owned by a provider of a conversational messaging or chat application stores a history indicating that there has been a following series of messages between the user and Mr. A on the application.
User: "I will be in Tokyo on July 5 for the first time in a while. Can we meet up if that works for you?"
Mr. A: "Yes, of course."
User: "Where and what time would you like to meet up?"
Mr. A: "I'll be arriving by Shinkansen, so Tokyo Station will be great. How about around 1 p.m.?"
User: "O.K., I will see you in Tokyo Station at 1 p.m."

Examples of (iii) the history of service or system usage include a search history of a route search system, a reservation history of a system for reserving hotels, restaurants, rental offices, meeting rooms, seminars, concert tickets, and transportation services. The search history of a route search service may provide a departure point, a departure time, a destination, an arrival time, and means of transportation (walk, train, automobile, etc.) as schedule information.

With respect to a method for obtaining schedule information, the information (i) to (iii) may be used as schedule information as is, or a result of processing, such as speech recognition, an image analysis, or a language analysis, of the information (i) to (iii) may be used to obtain the schedule information. For example, in the above example of the conversation between the user and Mr. A in the description of (ii), the conversation history may be analyzed to obtain "Schedule identifier (ID): 001 (may be any ID), Name: Meeting Mr. A, Start time: 1 p.m., Place: Tokyo Station, Attendee: Mr. A" as schedule information of the user.

In an exemplary embodiment, not only schedule information regarding the user but also actual information regarding the user may be tracked and recorded. Actual information regarding the user refers to information regarding actual activities of the user and actual states of the user.

The actual activities and actual states of the user may be managed in association with time, for example, by using timestamps.

Actual information regarding the user may be obtained from, for example, (a) positional information of the user, (b) a communication history of the user, (c) purchase and electronic payment histories of the user, (d) schedule completion information of the user, (e) vital information of the user, (f) a view of the user, (g) sound around the user, and (h) information managed by applications and services the user is using.

(a) Positional Information of the User

Positional information can be obtained from a global positioning system (GPS), a movement history, locations from which calls have been made or live videos have been broadcast, and positional information of posts and photos on social media. The movement history includes an entry history and an exit history. Examples of the movement history include a history of going through ticket gates of stations and a history of going through gates of facilities or rooms.

(b) Communication History of the User

The same communication history as (ii) may be used.

For example, when the user says, "I'm at the central ticket gate of Tokyo Station", during a call, actual information that the location of the user during at least part of this call is the central ticket gate of Tokyo Station can be obtained. For another example, the user transmits a message, "Now the baseball game is over. It was fun", using a conversational messaging or chat service, actual information that the user has been watching a baseball game can be obtained. For another example, when the user posts a picture of a hamburger and a text message "It was delicious", on a social medium, actual information that the user has eaten a hamburger can be obtained. For another example, online statuses or attendance records of meetings can provide actual information that a user is attending a meeting or actual information that a user has attended a meeting.

(c) Purchase and Payment Histories of the User

Examples of a use history of electronic payment include use histories of credit cards, prepaid cards, code payment (e.g., quick response (QR) code (registered trademark) payment or barcode payment), and other electronic or contactless payment (e.g., near-field communication (NFC)).

A purchase history can be obtained from sales history database of a store (a physical store or an online store), information registered in an accounting application, and results of reading of receipts and invoices.

(d) Schedule Completion Information of the User

Examples of schedule completion information include a completed state of an item on a to-do list or a shopping list.

When a status of each item registered on a to-do list is changed from "unfinished" to "finished", actual information that the item (e.g., "Send a Mother's Day gift to mom") has been completed can be obtained.

When a product on a shopping list has been checked, actual information that the product has been actually purchased can be obtained.

Furthermore, a calendar may provide a feature that manages whether a schedule registered on the calendar has actually taken place. In such case, actual information can be obtained based on schedule completion information managed by the calendar.

(e) Vital Information of the User

Examples of vital information include information regarding heartrate, blood pressure, respiration, body temperature, a blood sugar level, an oxygen level, a state of consciousness, brain waves, pupillary responses.

Vital information may be measured, for example, by sensors of apparatuses owned by the user (e.g., wearable device worn on the user) or devices sensors of other devices (e.g., a thermographic camera on the street or an entrance of a store and a sphygmomanometer at a medical facility). Vital information obtained from these sensors may be transmitted to other apparatuses for use and storage.

(f) View of the User

A view of the user includes objects that are being seen by the user.

Objects in a view of the user may be identified, for example, by analyzing image data (a still image or a moving image) capturing a view in front of the user. More specifically, objects in a view of the user may be identified by analyzing image data obtained, for example, by a camera of a vehicle (e.g., an automobile) the user is riding that captures a view in a direction the user is heading to. Objects in a view of the user may also be identified by analyzing image data obtained by a camera provided at an eye-wearable terminal apparatus so that the camera captures a view in a direction the user is facing.

Objects in a view of the user may also be identified by analyzing image data obtained by a camera on the street or in a store.

Objects in a view of the user may also be identified by analyzing image data obtained by a camera on a head-mounted device or a contact lens device.

Objects in a view of the user may also be identified by analyzing photos or videos captured by a camera of a smartphone carried by the user.

Objects in a view of the user may also be identified based on a current position of the user, a direction the user is facing, and an electronic map.

Objects in a view of the user may also be identified by tracking eye movements and objects that are present in the direction of eye gaze.

(g) Sound Around the User

Sound around the user may be obtained for example by a microphone provided at a current position of the user, a microphone provided at the terminal apparatuses 200 owned by a user.

(h) Information Managed by Applications and Services the User is Using

Actual information of the user may be obtained from information managed by applications installed on the terminal apparatuses 200 owned by the user and services used by the user.

For example, physical information managed by healthcare applications and services may provide information on actual activities or states of the user. Examples of the physical information include height, weight, body fat percentage, and body mass index (BMI). The physical information may be automatically collected at certain moments, for example, when the user stands on a weight scale, or the user may manually input the physical information.

For another example, records of exercise managed by exercise management applications and services may provide information on actual activities or states of the user. The user's exercises may be automatically detected and recorded or the user may manually keep records of his/her exercises.

For another example, meal information and nutrition information managed by meal management applications and services may provide information on actual activities or states of the user. Some meal management applications and services obtain information regarding calories and nutrients from photos of what the user has eaten (the user may take a photo of food that is served or a photo of ingredients). The user may manually input information regarding consumed meals and nutrition (calories, the amount of sugar, the amount of salt, etc.).

For another example, use histories of game, music, video, map, online meeting, electronic book reader, and other applications or services may provide information on actual activities or states of the user. More specifically, these applications or services may provide information on songs played back by the user, songs to which the user has given stars, visited websites, and viewing and revision histories of files.

In an exemplary embodiment, information regarding how much of a hurry the user is in (hereinafter also referred to as degree of hurry), the user's interest in peripheral objects, and a state of the user may be obtained.

In an exemplary embodiment, the user's degree of hurry may be determined based on schedule information, actual information, or a combination of these. For example, the user's degree of hurry can be determined based on how much time it will take to get to a location of a schedule (an example of schedule information) from a current location of the user (an example of actual information) and how much time currently remaining until a start time of the schedule (an example of schedule information).

In another exemplary embodiment, the user's degree of hurry may be determined based on movement speed of the user (an example of actual information) or vital information regarding the user (an example of actual information). For example, when the movement speed of the user is higher than usual or when heartrate or blood pressure of the user is higher than a predetermined threshold, it can be estimated that the user is in a hurry. In another exemplary embodiment, a user's degree of hurry may be determined by analyzing image data (an example of actual information) obtained by a camera on a wearable terminal apparatus worn by the user to capture a view of the user. When, for example, a frequency at which a user takes a look at a watch increases, it can be estimated that the user is worried about time and is likely to be in a hurry.

The user's interest in peripheral objects can be determined based, for example, on schedule information, actual information, or a combination of these.

In an example, when the user has a reservation (an example of schedule information) for a restaurant within a predetermined period of time from present, it can be estimated that the user's interest in having a meal at other restaurants on his/her way to the reserved restaurant is low.

In another example, when a calendar indicates that the user is scheduled to meet Mr. A (an example of schedule information), the user might want to give a gift to Mr. A. It can therefore be estimated that the user may be interested in stores that sell products that could be given to Mr. A as a gift. Once it is determined that the user has already purchased a gift to Mr. A (an example of actual information), it can be estimated that the user is no longer interested in other stores that sell products that could be given to Mr. A as a gift.

In another example, when a calendar includes the user's plan to have a meal at a certain time (an example of schedule information), it can be estimated that the user is unlikely to be interested in having another meal until a certain period of time passes after the planned time of the meal.

In another example, when the user had a tight schedule last week (an example of schedule information), it can be estimated that the user is likely to be tired.

In another example, when the user is scheduled to travel to a distant place by plane next week (an example of schedule information), it can be estimated that the user might be interested in travel goods.

In another example, when the user has a reservation for a hospital (an example of schedule information), it can be estimated that the user is likely to have a health problem before and/or after the reservation.

In another example, whether the user might be interested in something or what the user might be interested in can be determined based for example on actual information such as vital information including the user's heartrate, the number of times that the user has visited certain places, lengths of time for which the user has stayed at the certain places, a purchase history, a state of registration as favorites, remarks such as "I want XX", frequently used applications, frequently used websites, songs frequently played back, and responses on social media (giving high ratings to certain posts etc.).

In another example, a state of the user can be determined based for example on actual information such as whether the user is frequently listening to healing music, sleeping time, whether the user is falling asleep during the day, an intake of beverages containing caffeine, vital information, posts on social media about his/her health conditions, information obtained by exercise management applications, presence or absence of the user's appetite (e.g., information regarding appetite identified from information obtained by meal management applications), changes in weight, histories of visiting hospitals and pharmacies, or a drug prescription history.

In an exemplary embodiment, the information storage device 102 of the external server 100 may store the schedule information and the actual information. In another exemplary embodiment, information storage devices of the terminal apparatuses 200 or an information storage device of another system to which the external server 100 and the terminal apparatuses 200 can be connected may store the schedule information and the actual information, instead.

The schedule information and the actual information may be stored in one information storage device, or may be distributed to plural servers or terminal devices.

In an exemplary embodiment, the CPU 111 may present, to the user, information regarding all objects recognized to be in image data obtained from the camera 214. In another exemplary embodiment, using schedule information regarding the user, the CPU 111 may select, from among objects in image data being captured by the camera 214, one or more objects which the user of the terminal apparatuses 200 (refer to FIG. 1) will be informed of, and controls to present information regarding the selected object(s) to the user.

When the information regarding the selected object(s) is presented to the user, information regarding each selected object may be presented in association with the respective object. The association between the respective object and the information regarding the respective object may be indicated, for example, by displaying information regarding the object in close proximity to or superimposed on the object or by displaying an association indicator such as an arrow or a balloon indicating the association between the object and the information regarding the object. The information regarding each object may be displayed while the user's gaze is directed to the object, and the information regarding the object may be dismissed when the user's gaze is no longer directed to the object.

What is performed by the CPU 111 in any exemplary embodiments may be executed by a processor of any terminal apparatus 200 that moves together with the user. For example, a CPU 211A of a terminal apparatus 200 may execute the functions.

Figure 3:
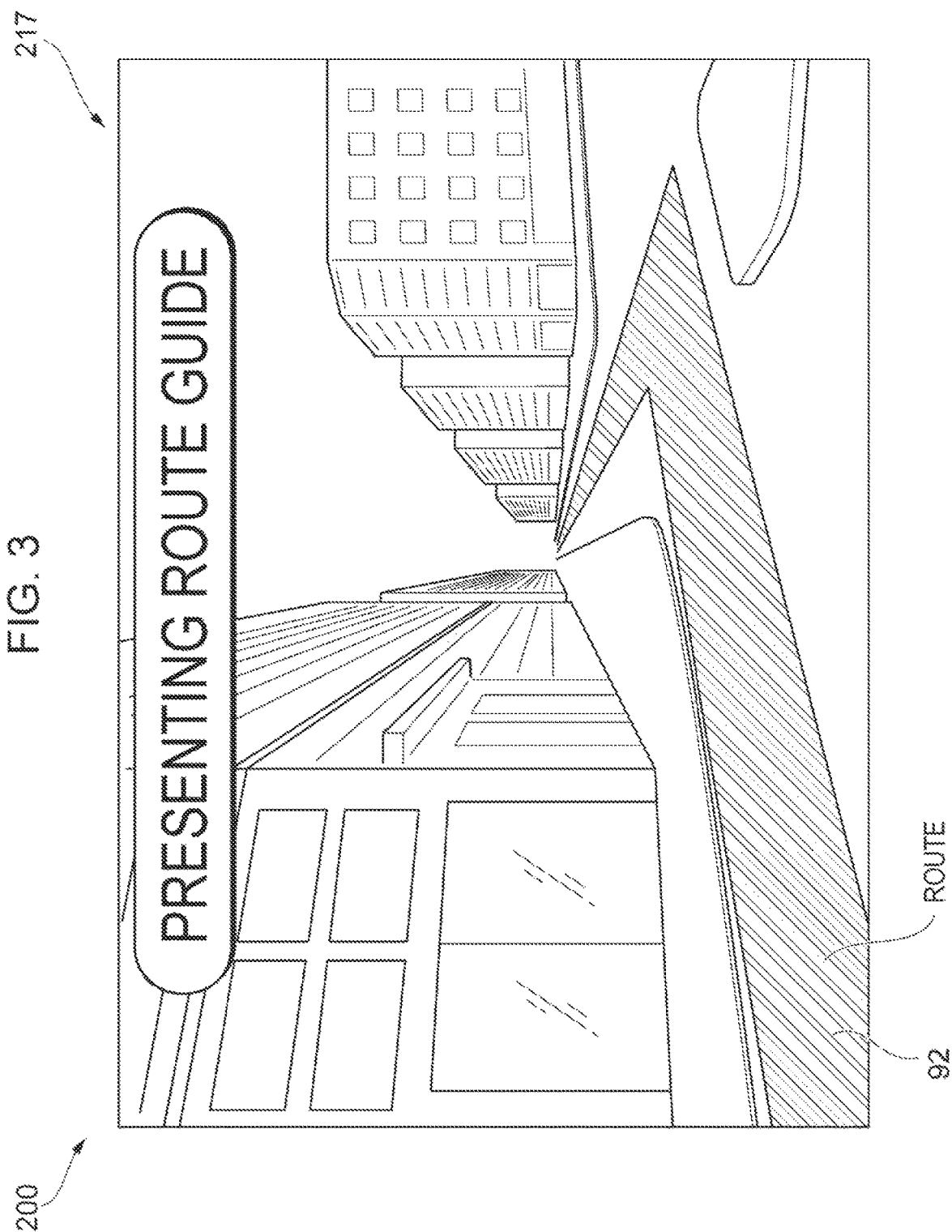
FIGS. 3 to 5 are diagrams illustrating exemplary screens displayed on a display of a terminal apparatus of a user.
Figure 4:
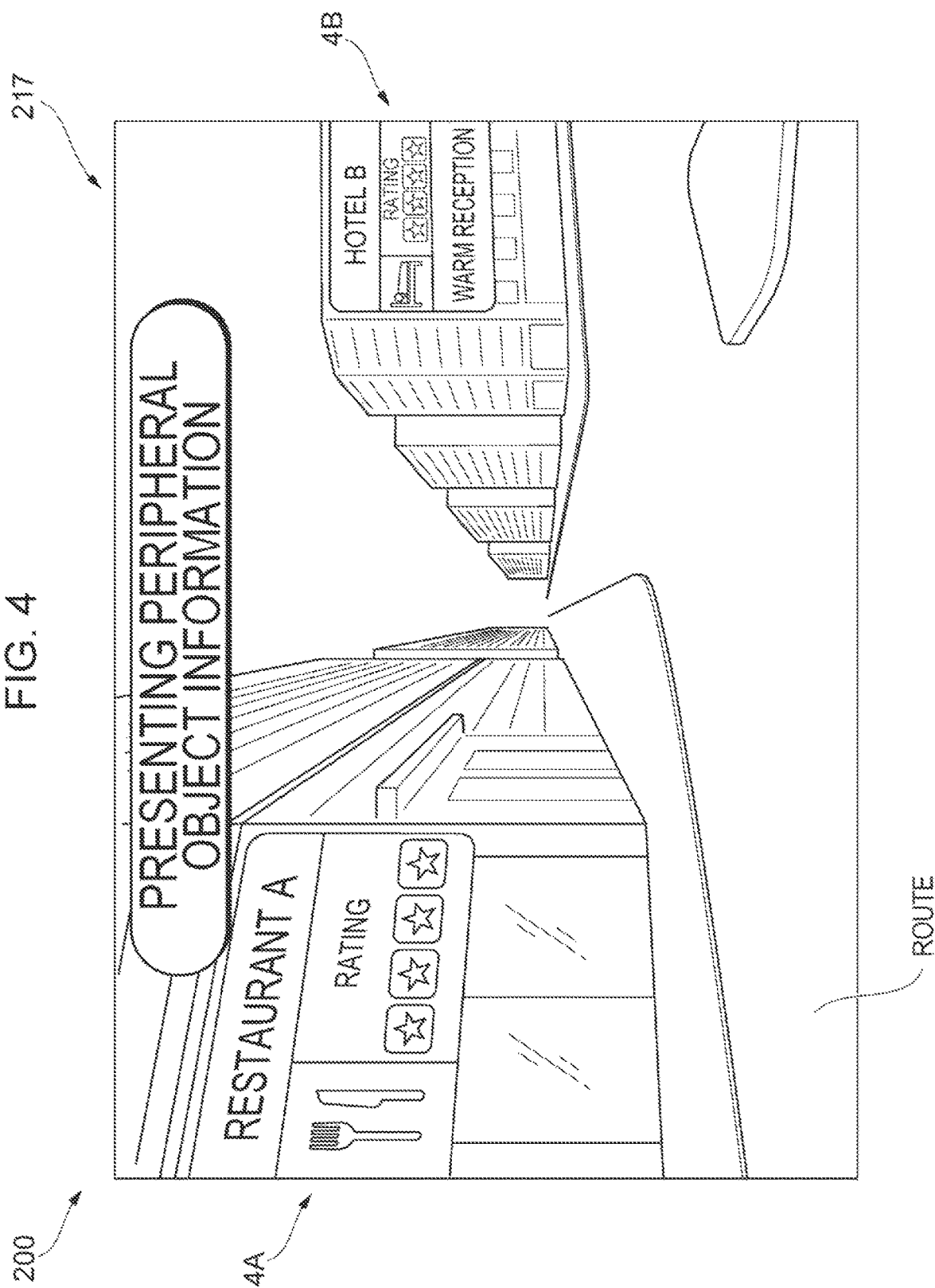
Figure 5:
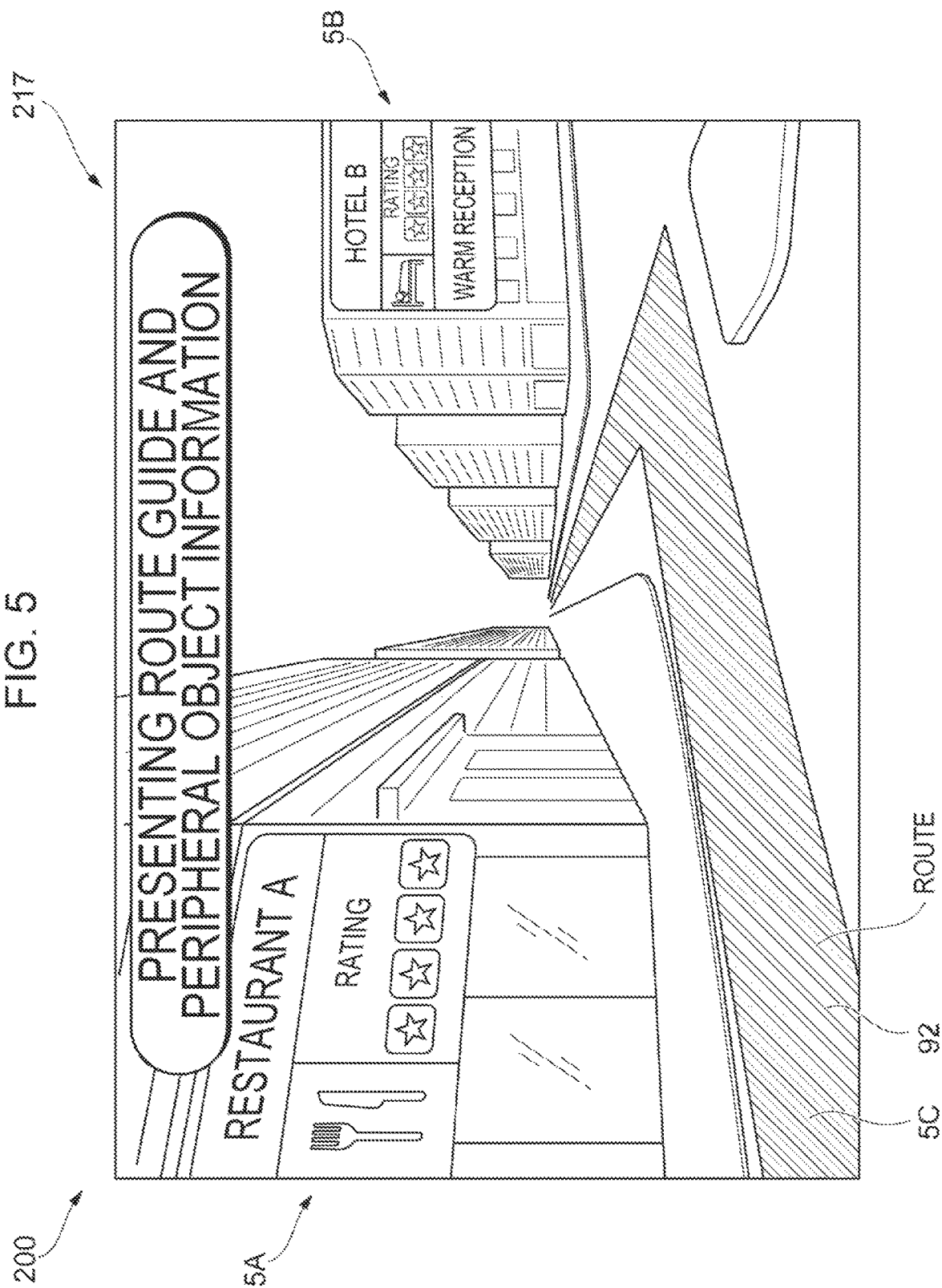

FIGS. 3 to 5 are diagrams illustrating exemplary display screens displayed on the display 217 of a terminal apparatus 200 of the user. The user is around a restaurant and a hotel (examples of peripheral objects). These screens illustrated in FIGS. 3 to 5 are displayed to the user at the same place under different conditions.

In an exemplary embodiment, the screen illustrated in FIG. 3 may be displayed if the user's degree of hurry satisfies a first condition and the user has taken a road ahead of him/her equally or less frequently than a predetermined number of times (e.g., if the user has never taken the road ahead of him/her). An example of a case where the user's degree of hurry satisfies the first condition may for example be when an indicator of the user's time availability satisfies a predetermined condition. The indicator of the user's time availability may for example be a difference between time currently remaining to a start time of a next schedule of the user and estimated time required for the user to get to a place of the next schedule of the user. The larger the difference, the larger the user's time availability. Another example of the case where the user's degree of hurry satisfies the first condition may for example be when the user is running to a place of a next schedule. Whether the user is running or not may be determined based, for example, on whether movement speed and heartrate of the user are higher than or equal to their respective predetermined thresholds. Whether the user is running or not may also be determined, for example, by analyzing an image obtained by the camera 214. When the user is moving faster than when he/she is walking, objects in a view captured by the camera 214 change faster than when he/she is walking. Whether the user is running may also be determined by an amount of camera shakes occurring in image data captured by the camera 214, as it can be assumed that shakes of the camera 214 becomes larger when the user is running than when he/she is walking. The first condition indicates a higher degree of hurry than a second condition, which will be described later. The user's degree of hurry may indicate whether the user is in a hurry or not, how hurried the user is, or how unhurried the user is (e.g., how much spare time the user has on hands).

In the screen illustrated in FIG. 3, information regarding peripheral objects around the user is not being displayed. That means the user is provided with no information regarding peripheral objects.

In an exemplary embodiment, if the user's degree of hurry satisfies the first condition, the CPU 111 may determine not to present any peripheral object information to the user.

In the screen illustrated in FIG. 3, a band-shaped color image 92 is displayed as a road to indicate a route that the user should follow. The route that the user should follow may for example be a route that the user should take in order to get to a destination.

In an exemplary embodiment, if the user has taken the road ahead of him/her equally or less frequently than a predetermined number of times before, the CPU 111 may determine to present route guidance information that guides the user from a current position to a destination. The route guidance information guides the user to follow the indicated route without detouring.

In another exemplar embodiment, if the user's degree of hurry satisfies the first condition, the CPU 111 may determine to present the route guidance information to the user regardless of how many times that the user has taken the road ahead of him/her.

In an exemplary embodiment, the screen illustrated in FIG. 4 may be displayed if the user's degree of hurry satisfies the second condition that is lower than the first condition, and the user has taken the road ahead of him/her equally or more frequently than a predetermined number of times.

In the screen illustrated in FIG. 4, no route guidance information is being displayed. In an exemplary embodiment, if the user has taken the road ahead of him/her equally or more frequently the predetermined number of times, the CPU 111 may determine to present the no route guidance information.

In the screen illustrated in FIG. 4, information 4A and 4B regarding peripheral objects around the user is being displayed to provide the user with explanation of the peripheral objects. In an exemplary embodiment, if the user's degree of hurry satisfies the second condition that is lower than the first condition, the CPU 111 may determine to present peripheral object information to the user.

The CPU 111 identifies peripheral objects around the user based on a current position of the user and a direction in which the user is facing. In an exemplary embodiment, the camera 214 (refer to FIG. 1) of the terminal apparatus 200 may be provided so that it captures a view of a direction the user wearing the terminal apparatus 200 is facing. The CPU 111 may identify one or more peripheral objects around the user based on image data obtained by the camera 214. An example of the peripheral object information is peripheral facility information, which is information regarding peripheral facilities around the user.

A camera need not necessarily be used to identify peripheral objects around the user. In another exemplary embodiment, peripheral objects may be identified based on a current position of the user, the direction in which the user is facing, and an electronic map.

The current position of the user may for example be identified by a GPS receiver on any terminal apparatus 200, and the direction in which the user is facing may be identified based, for example, on a direction sensor on any terminal apparatus 200.

In an exemplary embodiment, the screen illustrated in FIG. 5 may be displayed if the user's degree of hurry satisfies the second condition that is lower than the first condition and the user has not frequently taken the road ahead of him/her.

In the screen illustrated in FIG. 5, peripheral object information 5A and 5B regarding peripheral objects around the user, and the band-shaped image 92 for indicating a route 5C that the user should follow are being displayed.

Figure 6:
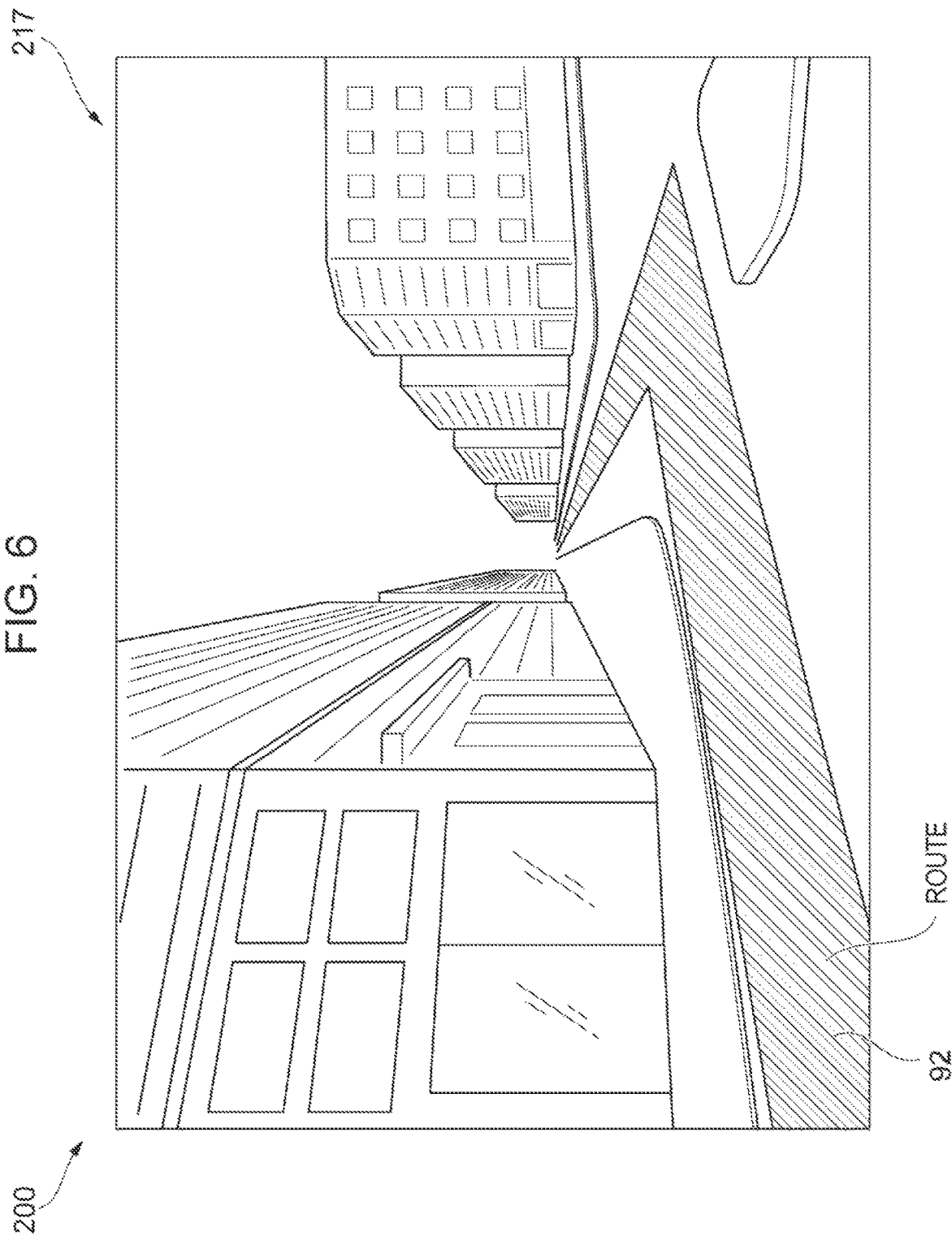
FIGS. 6 to 8 are diagrams illustrating exemplary screens displaying peripheral object information at different volumes.
Figure 7:
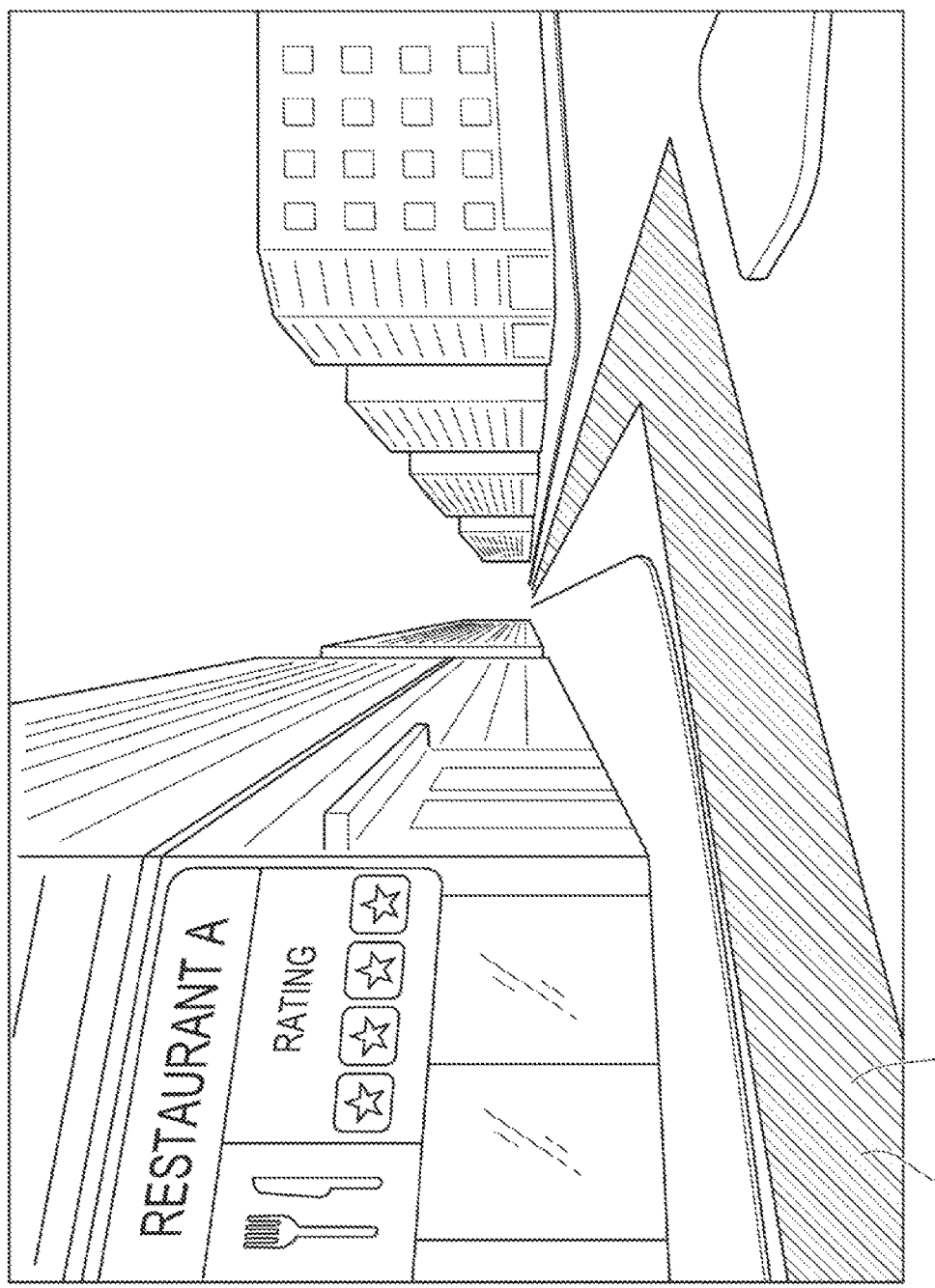
Figure 8:
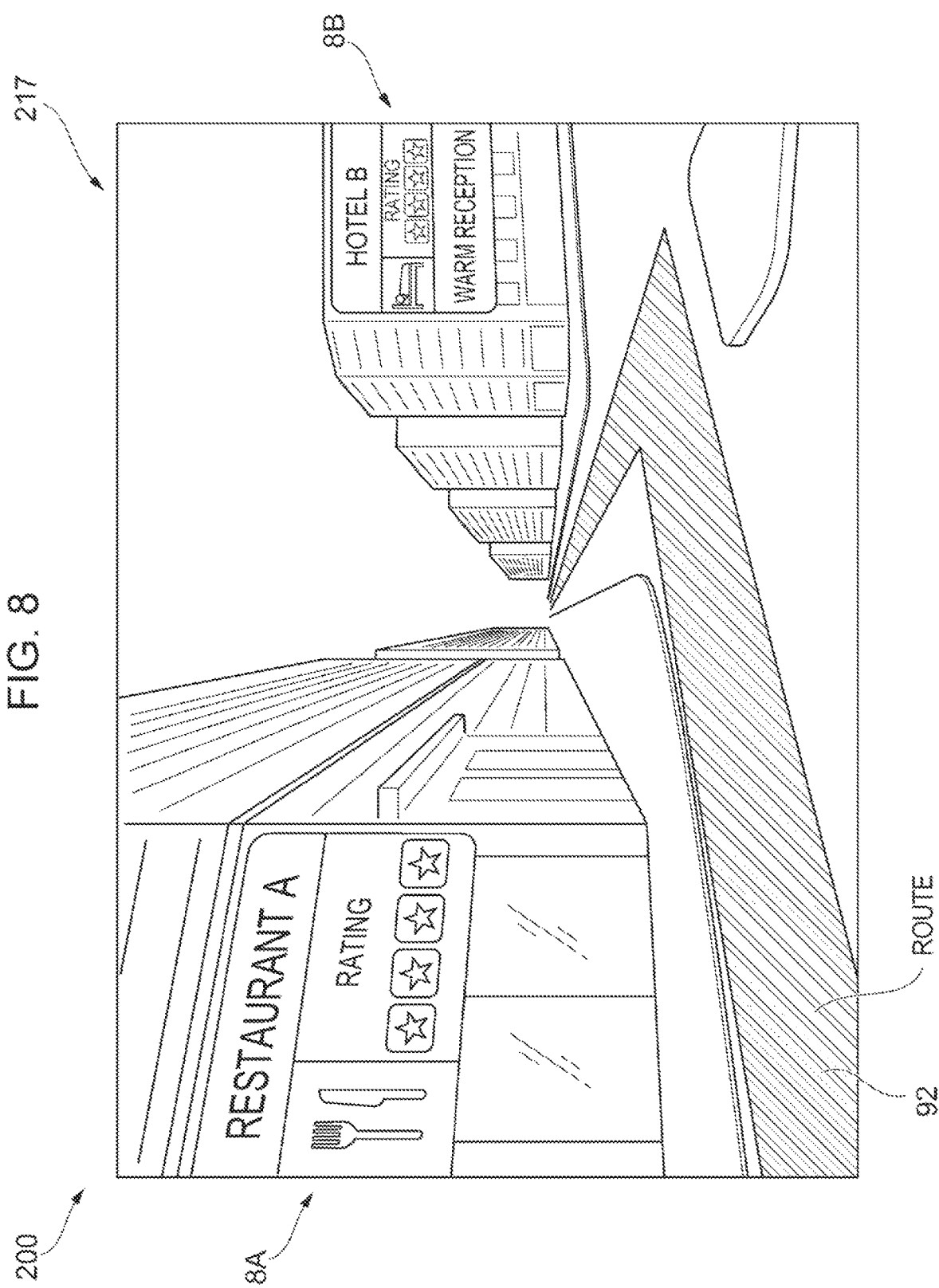

FIGS. 6 to 8 are diagrams illustrating exemplary screens displaying peripheral object information at different volumes.

In an exemplary embodiment, peripheral object information may be displayed at different volumes depending on conditions. In an exemplary embodiment, a level representing a volume of peripheral object information may be set based on schedule information, and an amount of peripheral object information to be presented to the user may be controlled in accordance with the set level.

In an exemplary embodiment, the screen illustrated in FIG. 6 may be displayed to a user with a degree of hurry satisfying a first condition that is higher than a second condition and a third conditions that will be described later. The CPU 111 may set the amount of peripheral object information to present to the user, for example, to level 0 when the user's degree of hurry satisfies the first condition. As in the screen illustrated in FIG. 6, route guidance information may be displayed along with the peripheral object information.

In an exemplary embodiment, the screen illustrated in FIG. 7 may be displayed to a user with a degree of hurry satisfying the second condition that is lower than the first condition and higher than the third condition.

The CPU 111 may set the amount of peripheral object information to present to the user, for example, to level 1, so that peripheral object information 7A that is not being displayed in the screen illustrated in FIG. 6 will be displayed.

In an exemplary embodiment, the screen illustrated in FIG. 8 may be displayed to a user with a degree of hurry satisfying the third condition that is lower than the second condition.

The CPU 111 may set the volume of peripheral object information to present to the user, for example, to level 2, so that the amount of peripheral object information presented to the user will be larger compared to FIG. 7. The screen illustrated in FIG. 8 includes two pieces of peripheral object information 8A and 8B.

In an exemplary embodiment, icons corresponding to peripheral objects for which the CPU 111 has determined to present may be presented first to allow the user to select the icons to present the pieces of peripheral object information 7A, 8A, and 8B in FIGS. 7 and 8.

Examples of the operation performed on an icon include an operation based on sound, an operation based on a line of sight, and an operation based on pointing of a finger.

A type of icon displayed on a screen may be changed in accordance with a type of peripheral object or a type of information presented when the user performs an operation on the icon.

In an exemplary embodiment, there may be a first mode in which the pieces of peripheral object information 7A, 8A, and 8B are automatically displayed and a second mode in which icons are displayed first may be prepared, for example, and a process for displaying peripheral object information from the start and a process for displaying only icons first, the icons indicating that there is peripheral object information that can be displayed, may be performed in accordance with selection by a user or a predetermined condition.

Alternatively, as for peripheral objects, a mode in which peripheral object information is displayed from the start, a mode in which icons are displayed first, and a mode in which not even icons are displayed, for example, may be prepared, and a process corresponding one of the modes may be performed.

Alternatively, even in the mode in which not even icons are displayed, if the user asks, "How has this coffeeshop been rated?", for example, information regarding the coffeeshop may be displayed.

Alternatively, even in the mode in which not even icons are displayed, if the user performs a certain operation on a peripheral object associated with peripheral object information (if the user looks at the peripheral object longer than a predetermined period of time), for example, the peripheral object information may be displayed.

In other words, even in the mode in which not even icons are displayed, for example, peripheral object information may be displayed if the user's interest in a peripheral object associated with the peripheral object information is detected.

Figure 9:
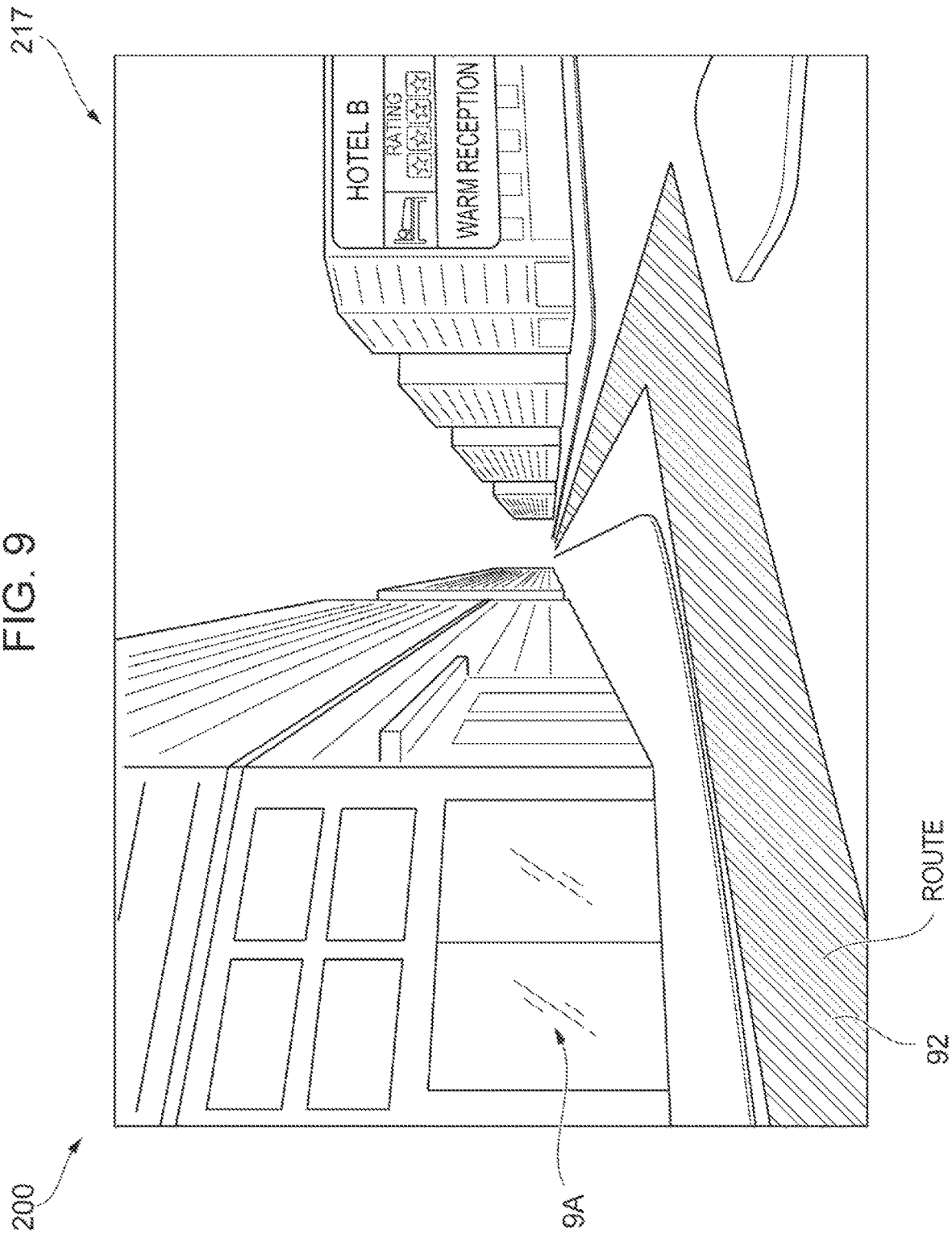
FIGS. 9 to 11 are diagrams illustrating exemplary screens displayed on the terminal apparatus.
Figure 10:
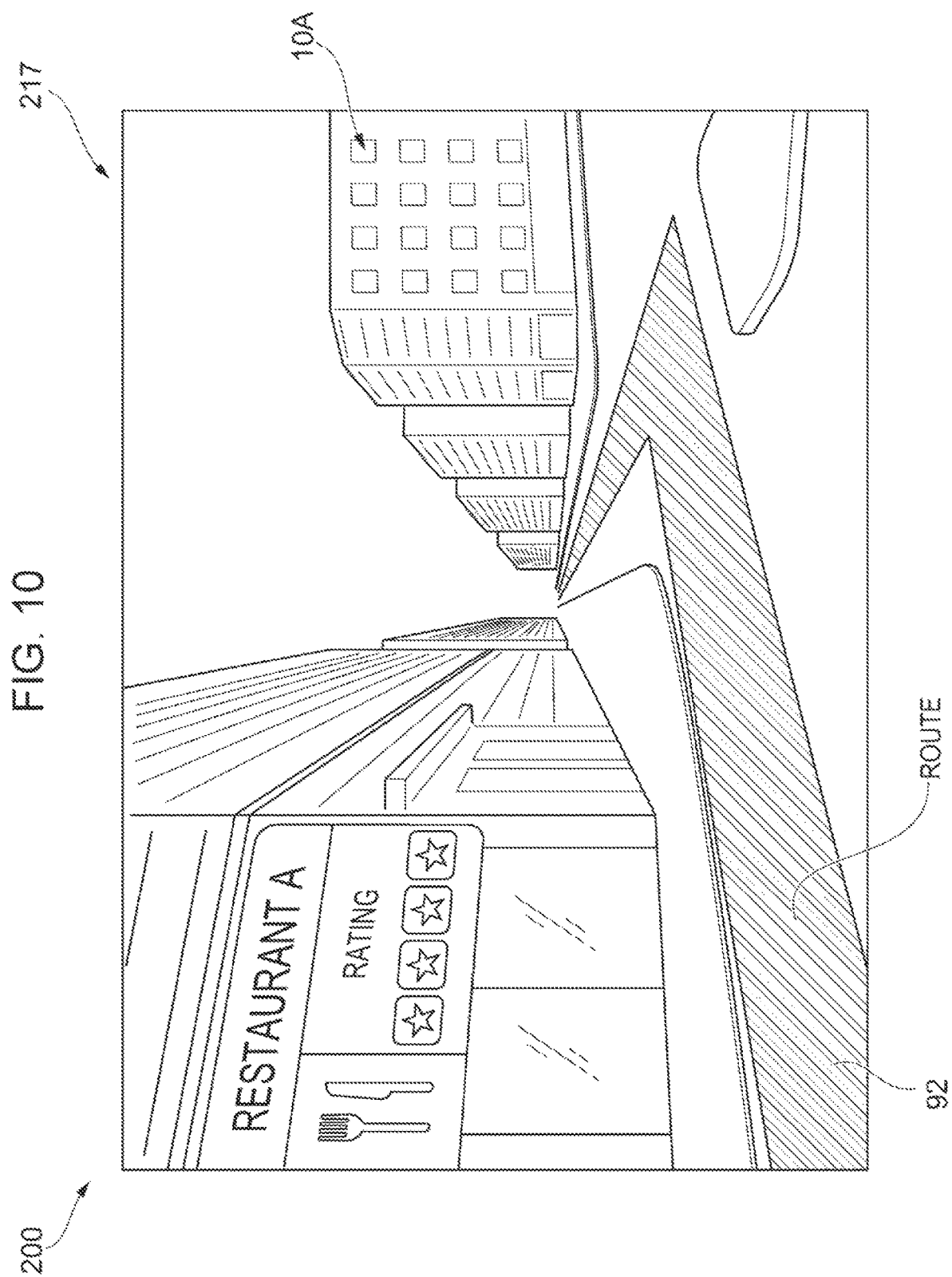
Figure 11:
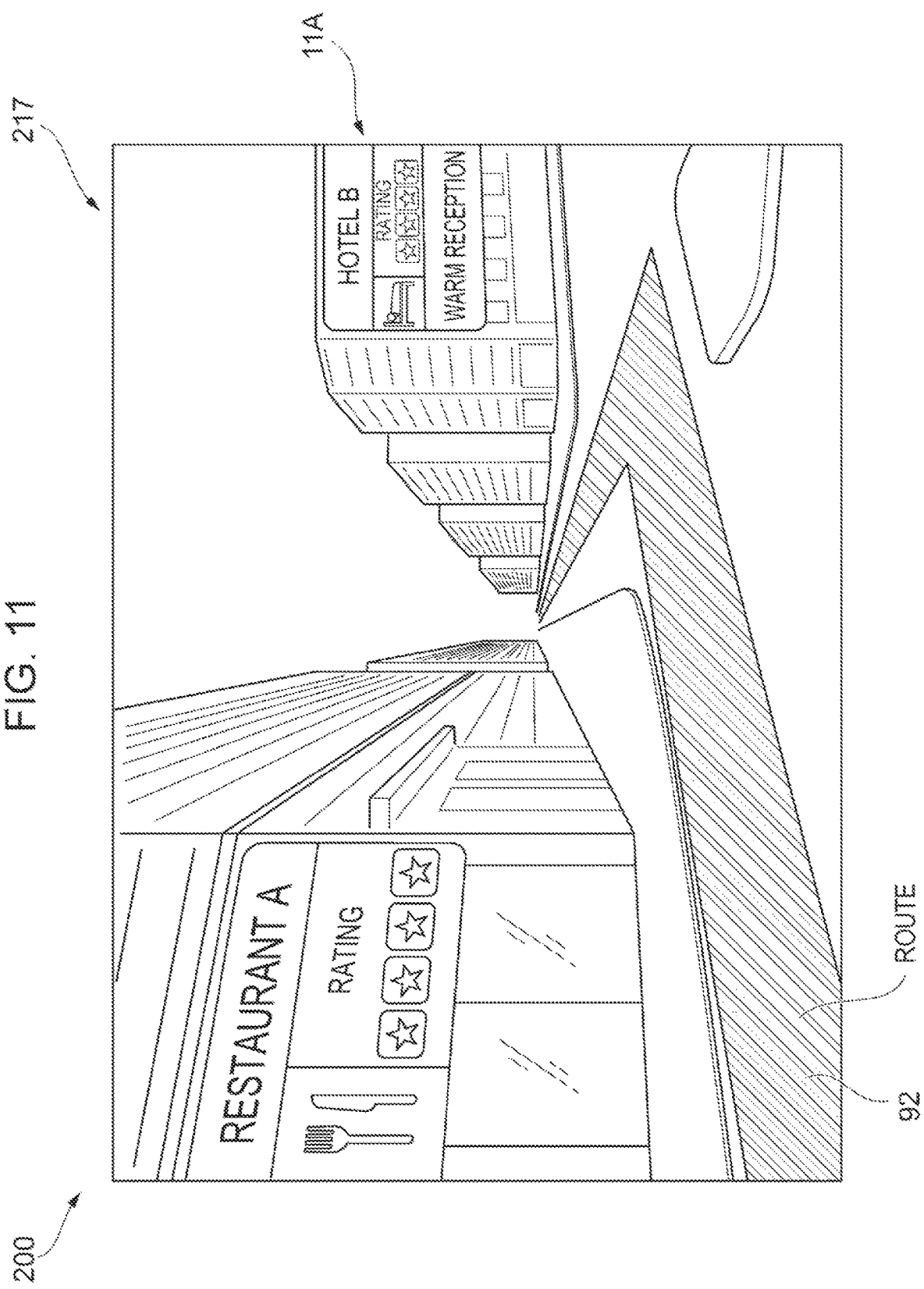

FIGS. 9 to 11 are diagrams illustrating exemplary screens displayed on the terminal apparatus 200 under different conditions.

In the exemplary screen illustrated in FIG. 9, note that no information about a restaurant at a position 9A is being displayed, although the restaurant is in the view of the user.

In an exemplary embodiment, the exemplary screen illustrated in FIG. 9 may be displayed on a terminal apparatus 200 when the user of the terminal apparatus 200 has a schedule (may be a past schedule or a future schedule) of a meal at a different place within a predetermined period of time from the present time.

More specifically, the exemplary screen illustrated in FIG. 9 may be displayed on a terminal apparatus 200 when the user of the terminal apparatus 200 has a reservation for a different restaurant within a predetermined period of time from the present time.

In an exemplary embodiment, the exemplary screen illustrated in FIG. 9 may be displayed on a terminal apparatus 200 when actual information indicates the user of the terminal apparatus 200 has gone to a different restaurant within a predetermined period of time from the present time.

In the exemplary screen illustrated in FIG. 10, note that information regarding a hotel present at a position 10A is not being displayed although the hotel is present in the view of the user. In an exemplary embodiment, the exemplary screen illustrated in FIG. 10 may be displayed on a terminal apparatus 200 when the user of the terminal apparatus is walking on a sidewalk on the side of the restaurant 9A in FIG. 9 with available time less than a predetermined condition.

The hotel 10A is an exemplary peripheral object that is across the street from the user's current route. The CPU 111 may determine not to inform or may determine to reduce the priority of informing the user of peripheral objects that are not on the user's current route when the user should avoid digressing from the user's current route (e.g., when the user does not have enough time before his/her next schedule).

In the exemplary screen illustrated in FIG. 11, note that information 11A regarding the hotel is being displayed. In an exemplary embodiment, the exemplary screen illustrated in FIG. 11 may be displayed to a terminal apparatus 200 when schedule information of the user includes, for example, a trip to London within a predetermined period of time. A hotel is an exemplary peripheral object that is relevant to someone who is on a trip or is scheduled to go on a trip.

In an exemplary embodiment, the exemplary screen illustrated in FIG. 11 may be displayed if the hotel has a better condition (e.g., more reasonable pricing, better reviews, more convenient location) than a hotel (not illustrated) at which the user is scheduled to stay.

The hotel at which the user is scheduled to stay is mentioned in the schedule information regarding the user, and information regarding the hotel is information regarding an object included in the schedule information regarding the user.

The hotel with better conditions, on the other hand, is not mentioned in the schedule information regarding the user, and information regarding the hotel with better conditions is information regarding a peripheral object that is not included in the schedule information regarding the user.

In an exemplary embodiment, the CPU 111 of the external server 100 obtains schedule information regarding the user when presenting peripheral object information.

The CPU 111 then determines information regarding peripheral objects around a current position of the user to be presented to the user based on schedule information regarding the user.

The fact that peripheral object information to be presented to the user is "information regarding a peripheral object that is not included in schedule information" means, for example, that information regarding a facility that is not registered in the user's calendar or information regarding a facility that is not described in the user's itinerary will be presented to the user when the user comes close to this facility.

Presentation of information (a name, a location, or a direction of a hotel, etc.) regarding a facility (e.g., a hotel) to the user based on schedule information regarding the user when the use comes close to the facility, on the other hand, is not presentation of information regarding a peripheral object that is not included in the schedule information regarding the user based on the schedule information.

Figure 12:
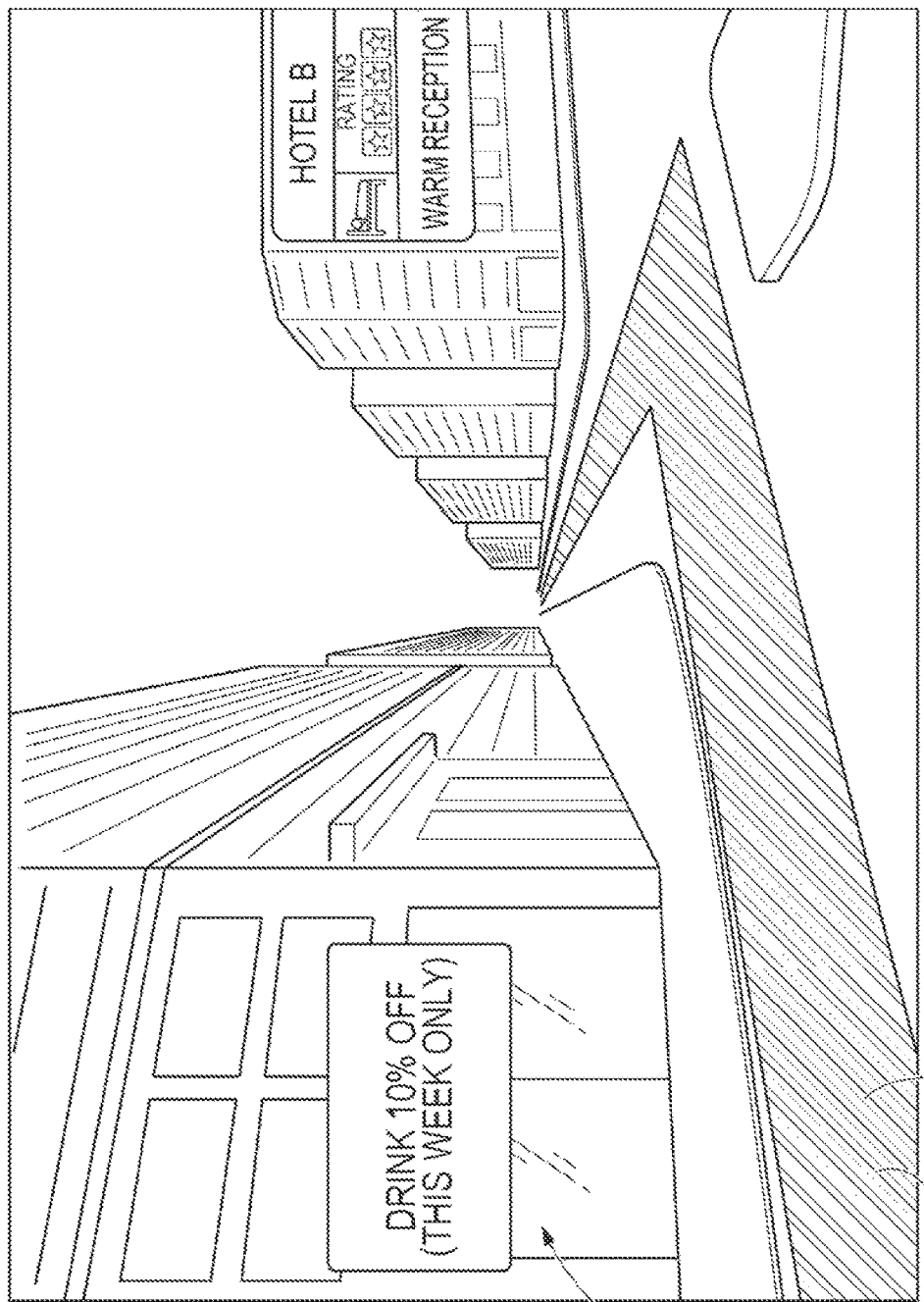
FIG. 12 is a diagram illustrating an exemplary screen displayed on the terminal apparatus.

FIG. 12 is a diagram illustrating another exemplary screen displayed on the terminal apparatus 200 of the user.

In the exemplary screen illustrated in FIG. 12, note that basic information (e.g., name, rating) about a store 12A is not being displayed (see FIG. 11 for comparison). On the other hand, limited-time information that is relevant to the time that the user passes by the store 12A. More specifically, in the exemplary screen illustrated in FIG. 12, information indicating that drinks are currently discounted by 10% is being displayed to the user as peripheral object information of the user. The discount is a limited-time offer that is currently available.

In an exemplary embodiment, the exemplary screen illustrated in FIG. 12 may be displayed on a terminal apparatus 200 if the user of the terminal apparatus 200 uses the store 12A more frequently than a threshold. A user who frequently uses the store 12A may not need basic information such as the name of the store 12A or the rating of the store 12A displayed on his/her device every time he/she passes by the restaurant, but may still want other information about the store 12A such as a limited-time offer or a temporary closure.

Figure 13:
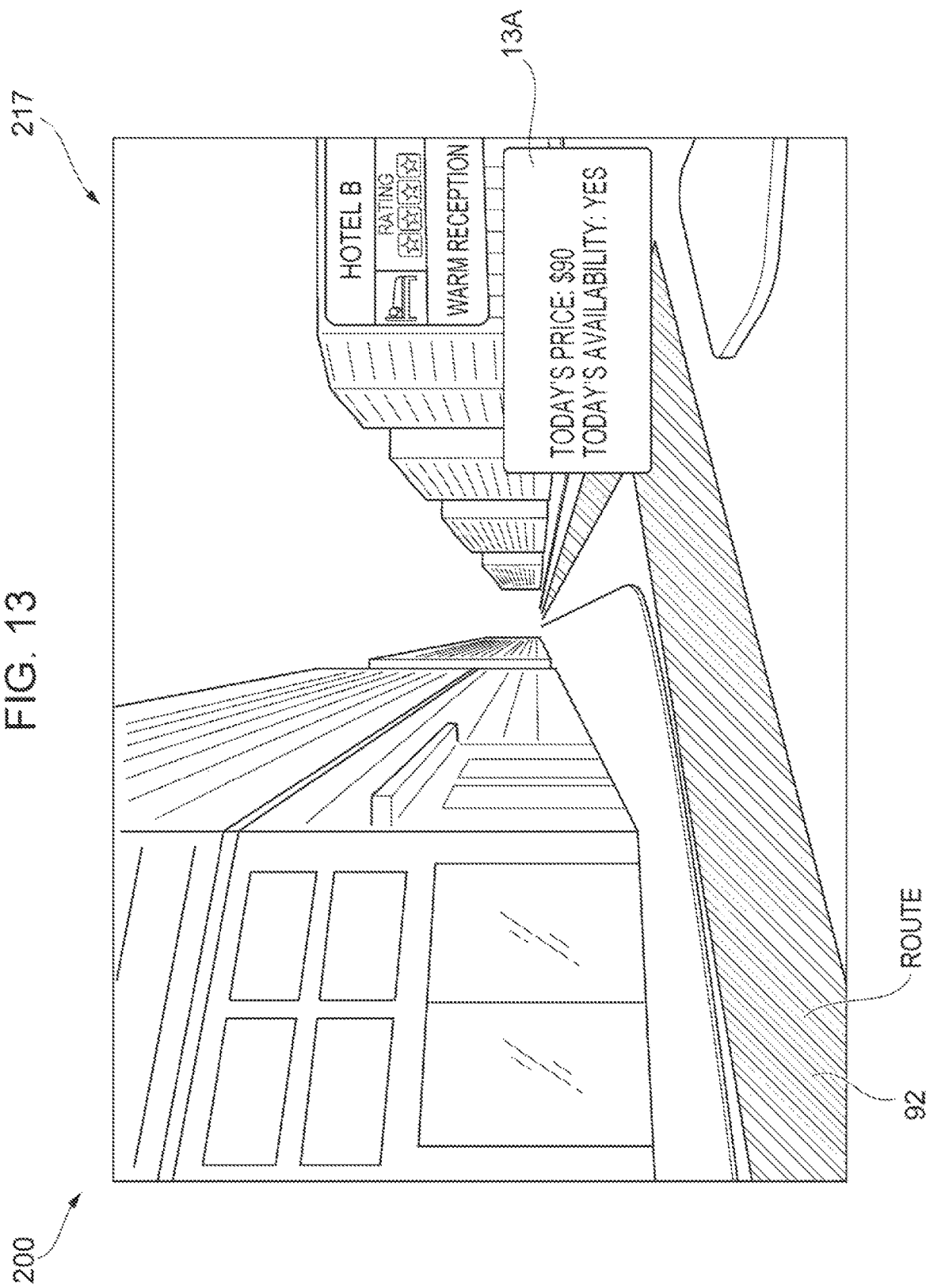
FIG. 13 is a diagram illustrating an exemplary screen displayed on the terminal apparatus.

FIG. 13 is a diagram illustrating another exemplary screen displayed on the terminal apparatus 200 of the user.

In the exemplary screen illustrated in FIG. 13, note that information regarding a hotel is displayed. More specifically, information 13A that is not being displayed in the exemplary screen illustrated in FIGS. 11 and 12 are being displayed. The information 13A includes an availability of the hotel of the day and a price of a stay at the hotel on the day.

In an exemplary embodiment, the exemplary screen illustrated in FIG. 13 may be displayed on a terminal apparatus 200 of the terminal apparatus 200 if schedule information of the user indicates the user is traveling but the schedule information does not include information about a hotel. If the user has not reserved a hotel, the user may find the information 13A useful.

Peripheral object information may be presented to the user for free or for a fee.

In an exemplary embodiment, an entity (e.g., person, corporate) who desires to have information (e.g., advertisement) on a particular object (e.g., their store) presented to users as peripheral object information may pay for their information to be presented to users. In another exemplary embodiment, a user may pay to have peripheral object information presented to the user. In another exemplary embodiment, both may be charged.

When an entity who desires to distribute their information is paying, the entity may be charged in accordance with the number of times that their information is presented.

The entity may want their information to be presented selectively to users who are likely to respond to the information. A user who desires to receive peripheral object information may want to obtain desired peripheral object information while avoiding to receive undesired peripheral object information. Furthermore, desired peripheral object information and undesired peripheral object may change from time to time.

Examples of information to be presented to the user as peripheral object information includes a name, business days, business hours, a congestion status, holidays, services provided (menus, products being sold, etc.), recommended services, coupons, ratings, interior and exterior photos, a location on a map, an address, a phone number, a URL of an official website, a URL of a social medium, and content posted on a social medium.

Information to be presented to the user as peripheral object information may be registered to the information processing system 1, for example, by a business operator who provides a service at a facility or by a user of the facility to the information processing system 1, may automatically be collected, for example, from users who have agreed to terms of use of personal information, may be generated based on registered or collected information.

Information regarding a congestion status of a facility may for example be information registered by a business operator to a database, information registered by a user of the facility to a database, or information generated based, for example, on the number of people staying at the facility, the number of terminal apparatuses 200 owned by persons staying at the facility, or the number of orders placed online.

A promotion feature may also be provided for a fee or for free for a business operator who wants information about their service or facility to be presented to users as peripheral object information at a priority higher than information about services or facilities of other business operators who do not use the promotion feature.

Terminal Apparatus 200

Figure 14:
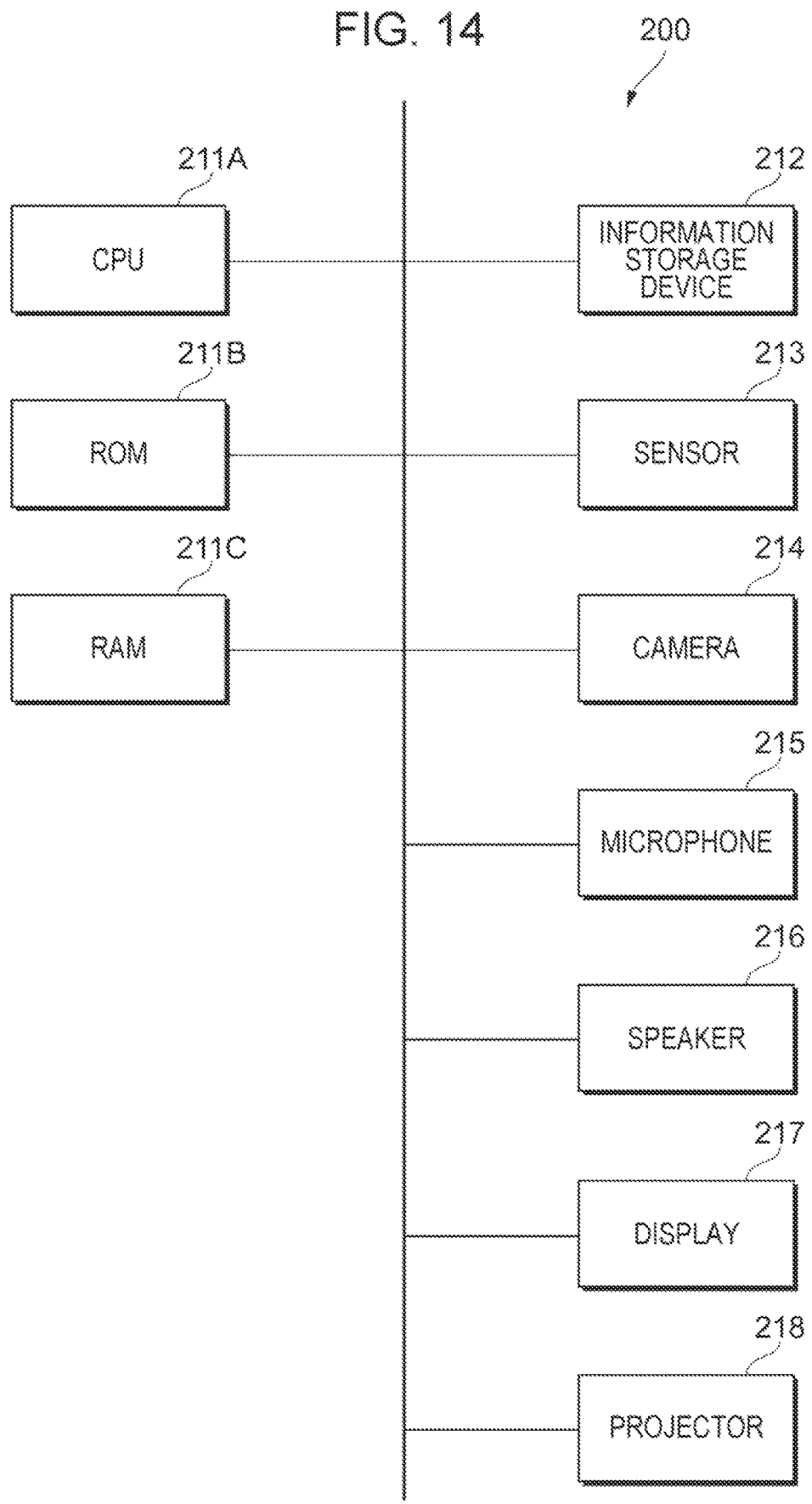
FIG. 14 is a diagram illustrating an exemplary hardware configuration of the terminal apparatus.

FIG. 14 is a diagram illustrating an exemplary hardware configuration of the terminal apparatus 200.

The terminal apparatus 200 is an example of an information processing apparatus.

The terminal apparatus 200 may for example be a smartphone, an eye-wearable apparatus, a wrist-wearable apparatus. The user can carry the terminal apparatus 200.

The exemplary terminal apparatus 200 includes hardware such as the CPU 211A, which is an example of a processor, a ROM 211B, a RAM 211C, an information storage device 212, a sensor 213, the camera 214 (an example of visual information input means), a microphone 215 (an example of audio information input means), a speaker 216 (an example of audio information output means), the display 217 (an example of visual information output means), and a projector 218 (an example of visual information output means). The terminal apparatus 200 need not include all of these components.

The sensor 213 may be a GPS sensor, a direction sensor, a sensor that obtains vital information of the wearer (e.g., heartrate, blood pressure, respiration, body temperature, a blood sugar level, an oxygen level, a state of consciousness, brain waves, pupillary responses), or the like. The sensor 213 may be a sensor that detects turning or a direction of the user's head, or a sensor that detects what the user is looking at.

The displays 217 may be transparent (the user can see through what is behind the display) or may not be transparent (the user cannot see through what is behind the display). The displays 217 may for example be a liquid crystal display.

A program to be executed by the CPU 211A may be stored in a computer-readable storage medium such as a magnetic storage medium (a magnetic tape, a magnetic disk, etc.), an optical storage medium (an optical disc etc.), a magneto-optical storage medium, or a semiconductor memory and provided for the terminal apparatus 200.

The program to be executed by the CPU 211A may be provided for the terminal apparatus 200 using communication means such as the Internet.

Various applications such as a mailing application and a calendar application may be pre-installed or user-installed on the terminal apparatus 200.

The exemplary terminal apparatus 200 also includes a communication interface (not illustrated) compatible with communication standards (Wi-Fi (registered trademark), 3G, 4G, 5G, Bluetooth (registered trademark), near-field communication (NFC), etc.). The terminal apparatus 200 is linked with external devices and networks and communicates data.

The terminal apparatus 200 need not include all of the above components.

The terminal apparatus 200 may or may not be wearable. FIG. 1 includes the eye-wearable terminal apparatus 200A and the wrist-wearable terminal apparatus 200B as examples. The eye-wearable terminal apparatus 200A is an example of an apparatus worn on a portion of the user's head. The terminal apparatus 200 may be an apparatus worn on other parts of the user or an apparatus worn in other manners: like a shoes, like a dress, like a ring, like a headset, like a contact lens, and more.

The exemplary terminal apparatus 200 can visually present information to the user by displaying information on the display 217.

When the terminal apparatus 200 is eye-wearable (e.g., glasses, contact lenses), the terminal apparatus 200 may include a transparent display as the display 217. The user can see through the transparent display. More specifically, the terminal apparatus 200 may include a transparent part, and the user can see a real-world space behind the transparent part through the transparent part.

When such a transparent display is provided as the display 217 of the terminal apparatus 200 and the display 217 displays information, the user can see both the information displayed on the display 217 and the real-world space. When information regarding a peripheral object around the user is displayed on a transparent display, the information regarding the peripheral object can be displayed in association with the peripheral object that is being seen by the user through the transparent display.

When information regarding a peripheral object around the user is displayed on a display that is not transparent (e.g., the display of the wrist-worn terminal apparatus 200B illustrated in FIG. 1 and a display of a smartphone are usually not transparent), image data of the camera 214 capturing the peripheral object can be displayed on the non-transparent display so that the information regarding the peripheral object can be displayed in association with the peripheral object in the displayed image data.

A terminal apparatus 200 that is eye-wearable (e.g., wearable like glasses or contact lenses) is an example of a terminal apparatus at least partially set in front of at least one of the user's eyeballs when the apparatus is worn by the user. More specifically, a transparent display 217 is set in front of at least one of the user's eyeballs. The display 217 of the apparatus may be controlled by an apparatus other than the terminal apparatus 200; for example, by a smartphone, a personal computer (PC) owned by the user, or the external server 100.

In an exemplary embodiment, peripheral objects around the user may be identified based on image data obtained by the camera 214 that is provided on the terminal apparatus 200. More specifically, the camera 214 may be provided to capture an image of the direction the user is facing. Facilities identified to be in the image data obtained from the camera 214 can be regarded as being in the user's view.

The image data obtained by the camera 214 of the terminal apparatus 200 may be analyzed by the CPU 211A of the terminal apparatus 200. Alternatively, the image data obtained by the camera 214 of the terminal apparatus 200 may be sent to a different apparatus to be analyzed at the different apparatus. For example, the image data may be sent to the external server 100 to be analyzed by the CPU 111 provided on the external server 100.

In another exemplary embodiment, peripheral objects around the user may be identified based on a current position of the user, a direction in which the user is facing, and an electronic map. More specifically, facilities in the user's view may be identified based on the current position of the user and the direction in which the user is facing with reference to the electronic map.

The image data obtained by the camera 214 of the terminal apparatus 200 may be saved to the information storage device 212 of the terminal apparatus 200 or an information storage device of another apparatus such as the external server 100 as one or plural image files (e.g., moving image file or still image file).

Peripheral object information is presented on the terminal apparatus 200. The peripheral object information may be presented to the user by, for example, an email or chat message, a notification function of a device such as a wearable device or a smartphone, or other services provided by applications that are capable of distributing information to their user (e.g., search, map, and route guidance functions).

In an exemplary embodiment, a navigation application installed on the terminal apparatus 200 may have a function to present peripheral object information about peripheral objects around the user (hereinafter may be referred to as "peripheral object information presentation function"). The navigation application may also have a function to present route guidance information for guiding the user to a destination (hereinafter may be referred to as "route guidance function").

The route guidance function is a function of presenting the user with routes and directions that the user should take. The peripheral object information presentation function is a function of presenting the user with peripheral object information, which is information regarding peripheral objects around a current position of the user. These functions may be achieved by cooperating with an external information distribution system provided separately from the information processing system 1.

The route guidance function and the peripheral object information presentation function may each be enabled or disabled in accordance with an instruction from the user. That is, both the route guidance function and the peripheral object information presentation function may be enabled, one of the route guidance function or the peripheral object information presentation function may be enabled, or both of the two functions may be disabled.

These two functions may each be enabled or disabled based on whether a predetermined condition other than an instruction from the user is satisfied.

When these functions are enabled or disabled, the user may be asked to approve the enabling or disabling of the functions.

More specifically, if the predetermined condition is satisfied, the user may be asked, for example, "Do you want route guidance?" or "Do you want to turn off the peripheral object information presentation function?", and the function is enabled or disabled upon an approval or disapproval of the user.

Examples of a peripheral object include artificial objects such as facilities and natural objects such as plants and trees. Examples of a facility include restaurants, hotels, supermarkets, museums, schools, and observatories.

Facilities may provide various services. For example, Restaurants provide food and drink as their services, and supermarkets sell food and daily necessities as their services.

Examples of peripheral object information presented by the peripheral object information presentation function include name of a peripheral object (e.g., Tokyo Tower), type the peripheral object (e.g., restaurant, hotel, park, school, sightseeing spot, etc.), and evaluation of the facility (e.g., ratings and reviews).

Information presented by the peripheral object information presentation function is not limited to these. When a peripheral object is a facility registered in an external information distribution system, information provided from the external information distribution system may be presented as peripheral object information.

In an exemplary embodiment, information regarding peripheral objects in the user's view may be presented on the displays 217 of the eye-wearable terminal apparatus 200 illustrated in FIG. 1 as the user moves around a town wearing the terminal apparatus 200. The displays 217 of the eye-wearable terminal apparatus 200 illustrated in FIG. 1 may be transparent like glasses and information about a peripheral object is displayed on the display 217 in association with the peripheral object in the user's view that is seen through the glasses-like terminal device. The peripheral object information may be presented on another terminal apparatus carried by the user (e.g., a smartphone or a wrist-wearable terminal apparatus) in addition to or instead of the eye-wearable terminal apparatus 200.

Figure 15:
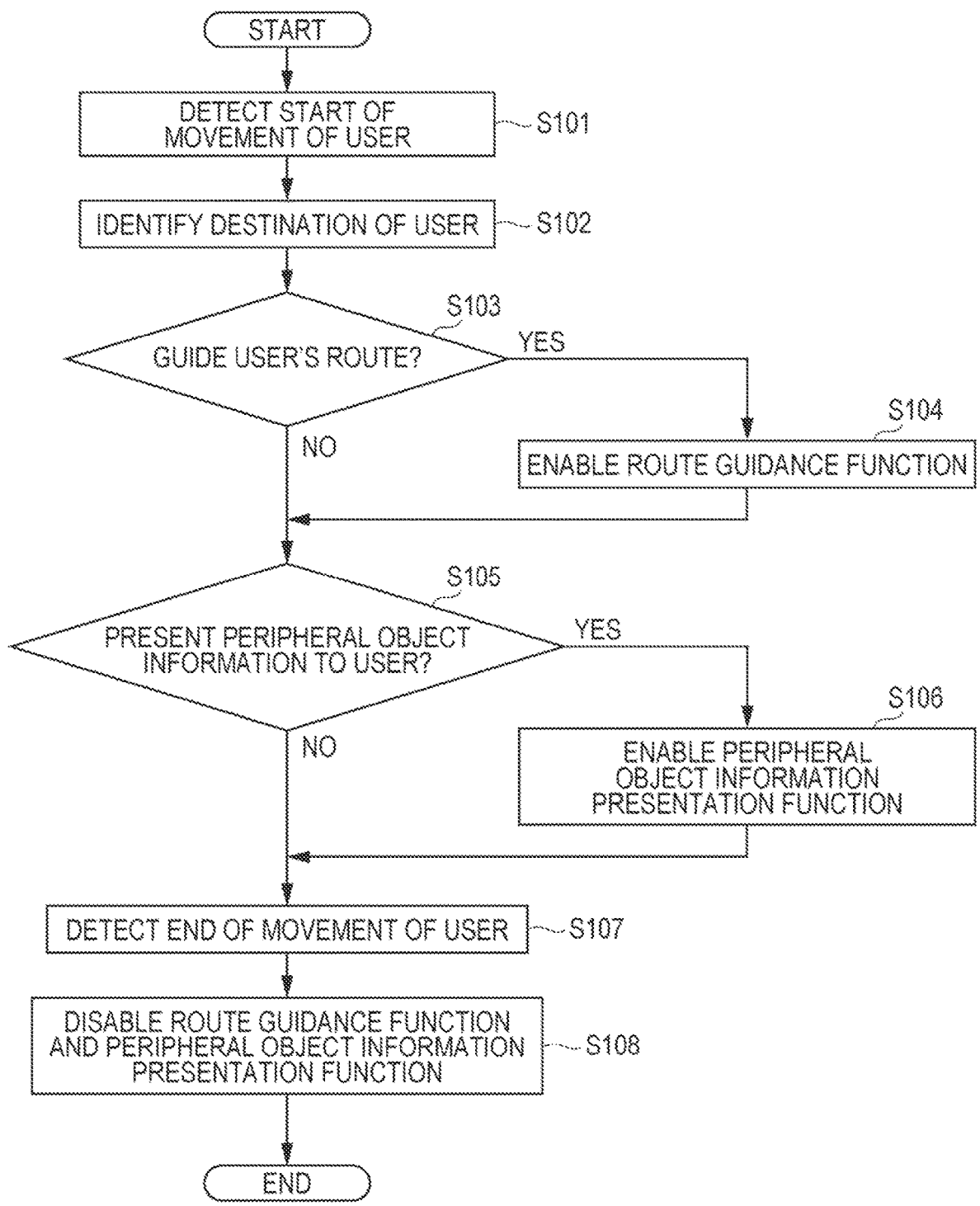
FIG. 15 is a flowchart illustrating an exemplary process to determine whether to guide the user's route and whether to present peripheral object information to the user.

FIG. 15 is a flowchart illustrating an exemplary process to determine whether to guide the user's route and whether to present peripheral object information to the user.

If a start of movement of the user wearing the eye-wearable terminal apparatus 200 is detected (step S101), a destination of the user is identified based on schedule information regarding the user (step S102).

Next, whether to guide the user's route is determined (step S103), and if a determination to guide the user's route is made, the route guidance function is enabled (step S104). The process then proceeds to step S105.

If a determination not to guide the user's route is made in step S103, the route guidance function is not enabled, and the process proceeds to step S105.

In step S105, whether to present peripheral object information to the user is determined (step S105).

If a determination to present peripheral object information is made, the peripheral object information presentation function is enabled (step S106), and the process proceeds to step S107.

If a determination not to present peripheral object information is made in step S105, the peripheral object information presentation function is not enabled, and the process proceeds to step S107.

If an end of the movement of the user is then detected (step S107), the route guidance function and the peripheral object information presentation function are disabled (step S108).

More specifically, if the route guidance function and the peripheral object information presentation function are enabled at a time of the detection of the end of the movement of the user, these functions are disabled.

Not to mention, the steps in the above exemplary process may not necessarily be in this order and may be changed.

Figure 16:
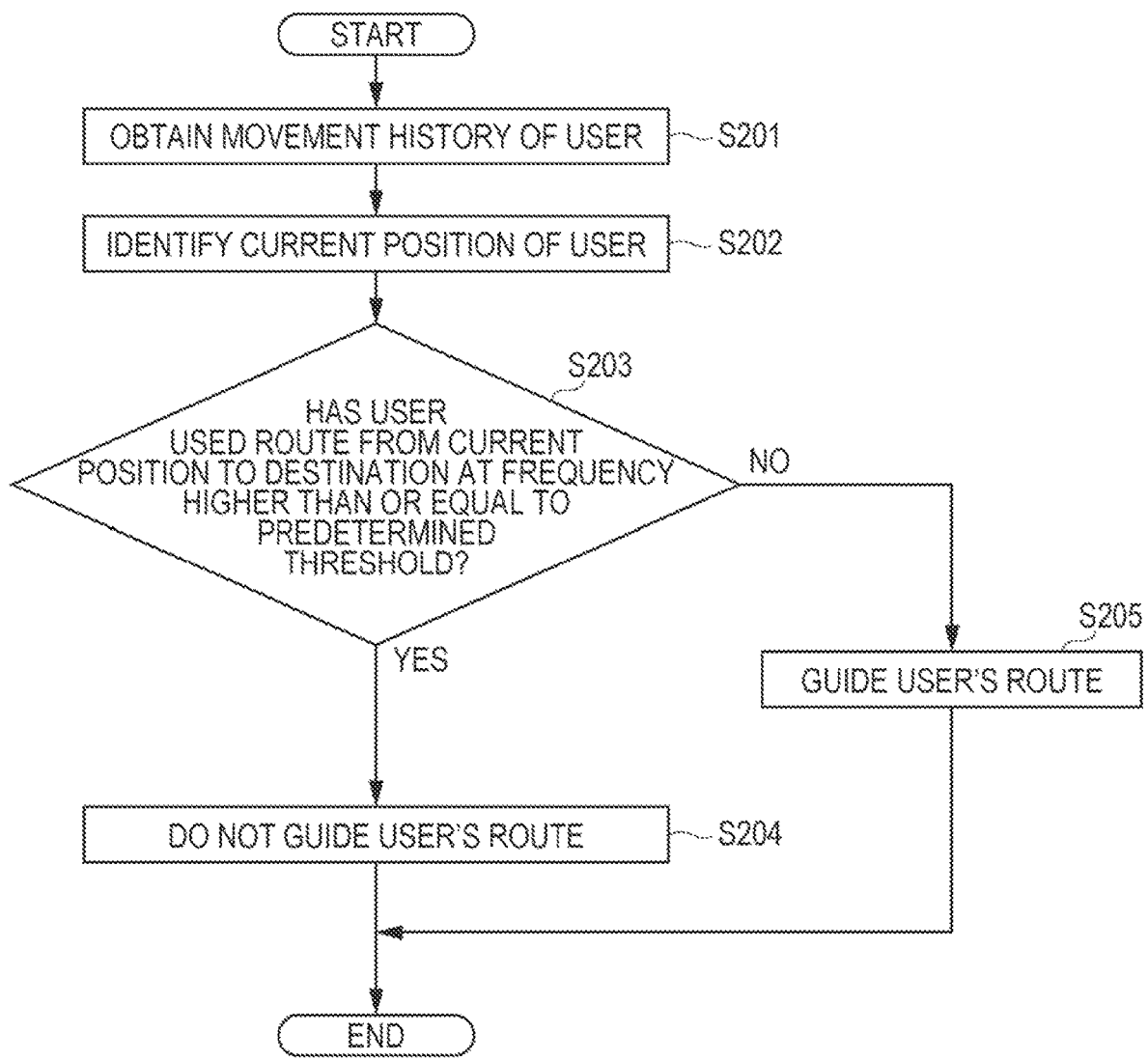
FIG. 16 is a flowchart illustrating an exemplary process to determine whether to guide the user's route.

FIG. 16 is a flowchart illustrating an exemplary process to determine whether to guide the user's route.

In the process illustrated in FIG. 16, first, information about a movement history of the user is obtained (step S201). For example, information obtained in the past by a GPS receiver on the terminal apparatus 200 may be used as information about the movement history of the user.

Next, a current position of the user is identified based on current information obtained by the GPS receiver on the eye-wearable terminal apparatus 200 (step S202).

In step S201, another piece of actual information may be obtained instead of, or in addition to, the movement history.

In step S203, whether the user has used a route from the current position to the destination at a frequency higher than or equal to a predetermined threshold is determined based on the information obtained at steps S201 and S202 (step S203).

If it is determined in step S203 that the user has used the route from the current position to the destination at a frequency higher than or equal to the predetermined threshold, a determination to guide the user's route is made (step S204).

If it is determined in step S203 that the user has not used the route from the current position to the destination at a frequency higher than or equal to the predetermined threshold, a determination not to guide the user's route is made (step S205). In this case, the route guidance function is enabled.

Not to mention, the steps in the above exemplary process may not necessarily be in this order. For example, the current position of the user may be identified first, and then the information regarding the movement history of the user may be obtained.

Figure 17:
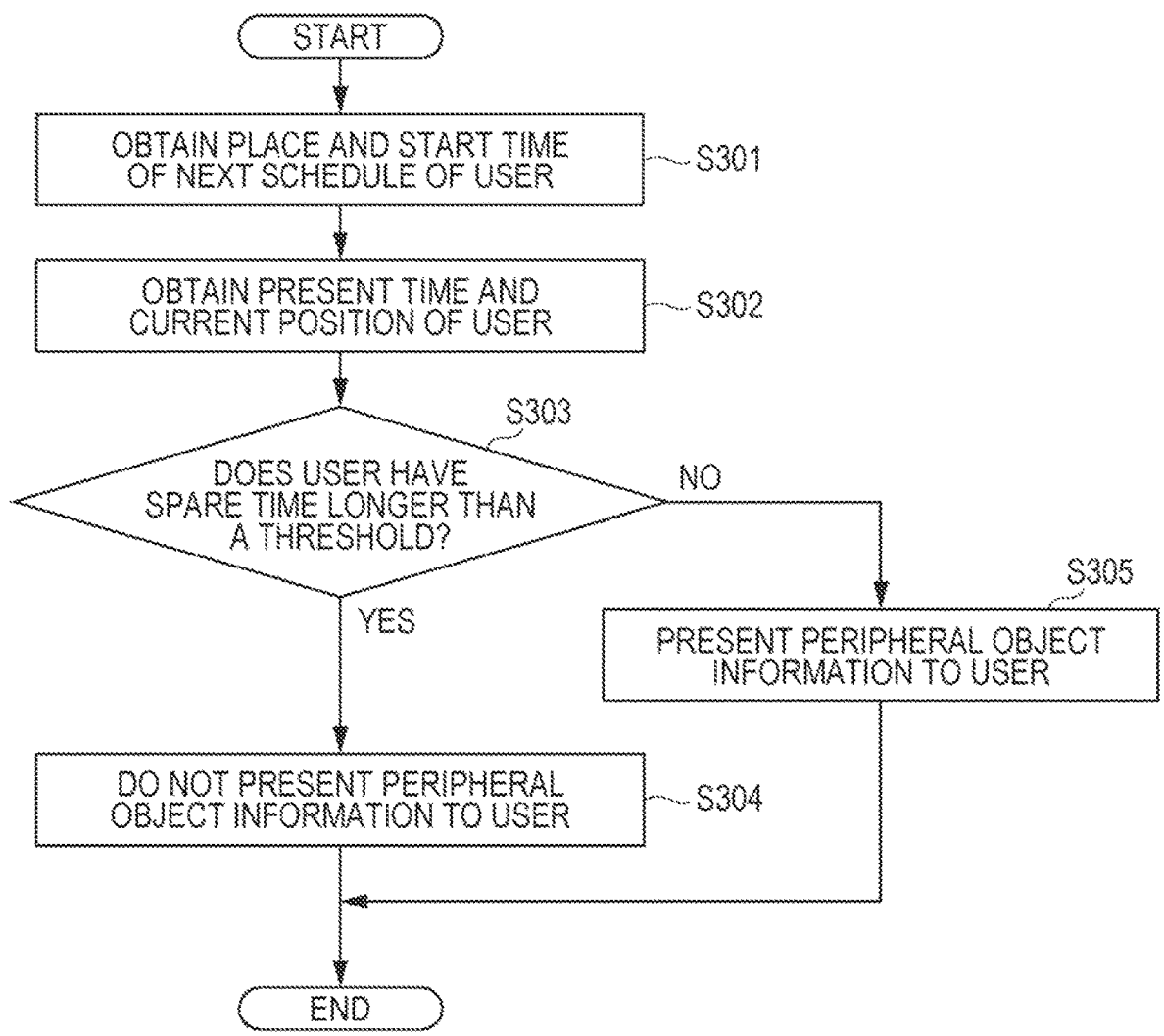
FIG. 17 is a flowchart illustrating an exemplary process to determine whether to present peripheral object information to the user.

FIG. 17 is a flowchart illustrating an exemplary process to determine whether to present peripheral object information to the user.

In this exemplary process, information regarding a place of a next schedule of the user and information regarding a start time of the next schedule are obtained based on schedule information regarding the user (step S301). Alternatively, information regarding an end time of the next schedule may be obtained instead of the information regarding the start time. Alternatively, both the information regarding the start time and the information regarding the end time may be obtained.

Next, information regarding the present time and information regarding a current position of the user are obtained (step S302).

Next, whether the user has spare time longer than a threshold is determined in step S303.

The "spare time" may be defined, for example, by the difference between the remaining time until the start time of the next schedule and an estimated time required to reach a place of the next schedule from the current position of the user.

If is determined in step S303 that the user has spare time longer than the threshold, the CPU 111 determines to present peripheral object information to the user (step S304).

In this case, the peripheral object information presentation function is enabled.

If it is determined in step S303 that the user does not have spare time longer than the threshold, the CPU 111 determines not to present peripheral object information to the user (step S305).

Not to mention, the steps in the above exemplary process may not necessarily be in this order. For example, the information regarding the present time and the current position may be obtained first, and then the information regarding the place and the start time of the next schedule may be obtained.

The CPU 111 may determine to reduce or increase the amount of peripheral object information displayed on a display screen according to predetermined conditions. In an exemplary embodiment, the amount of peripheral object information displayed on the display screen may be reduced as a ratio of the estimated time required to reach the place of the user's next schedule from the user's current position to the remaining time until the start time of the user's next schedule becomes higher.

When the CPU 111 controls to adjust the amount of peripheral information to display according to predetermined conditions, even if a large amount of information is being displayed to the user shortly after the user begins to move to a destination (e.g., volume of the peripheral object information is initially adjusted to be "large"), the amount of information displayed on the display screen may be decreased over time (e.g., volume of the peripheral object information is later switched to be "small"). Examples of such a case include a case where the user gets stuck at a lot of traffic lights and a case where the user makes a lot of detours during the movement. In these cases, the ratio of the estimated required time to the remaining time increases over time, so the amount of information displayed on the display screen may be controlled to decrease.

Similarly, when the CPU 111 controls to adjust the amount of peripheral information to display according to predetermined conditions, even if a small amount of information is being displayed to the user shortly after the user begins to move to a destination (e.g., volume of the peripheral object information is initially adjusted to be "small"), the amount of information displayed on the display screen may be increased over time (e.g., volume of the peripheral object information is later switched to be "large"). Examples of such a case include a case where a start time of a next schedule is delayed due to a friend's convenience and a case where the user has moved faster than a reference movement speed of the user used to obtain the estimated required time (e.g., when the reference movement speed has been calculated on the assumption that the user will walk to the destination but the user has actually run). In these cases, the ratio of the estimated required time to the remaining time decreases over time, so the amount of information displayed on the display screen may be controlled to increase.

The CPU 111 may repeatedly determine whether to present peripheral object information as time passes (e.g., at predetermined intervals).

Even if the user stays substantially the same place and is not moving, the determination as to whether to present peripheral object information may change as the user's spare time changes.

Figure 18:
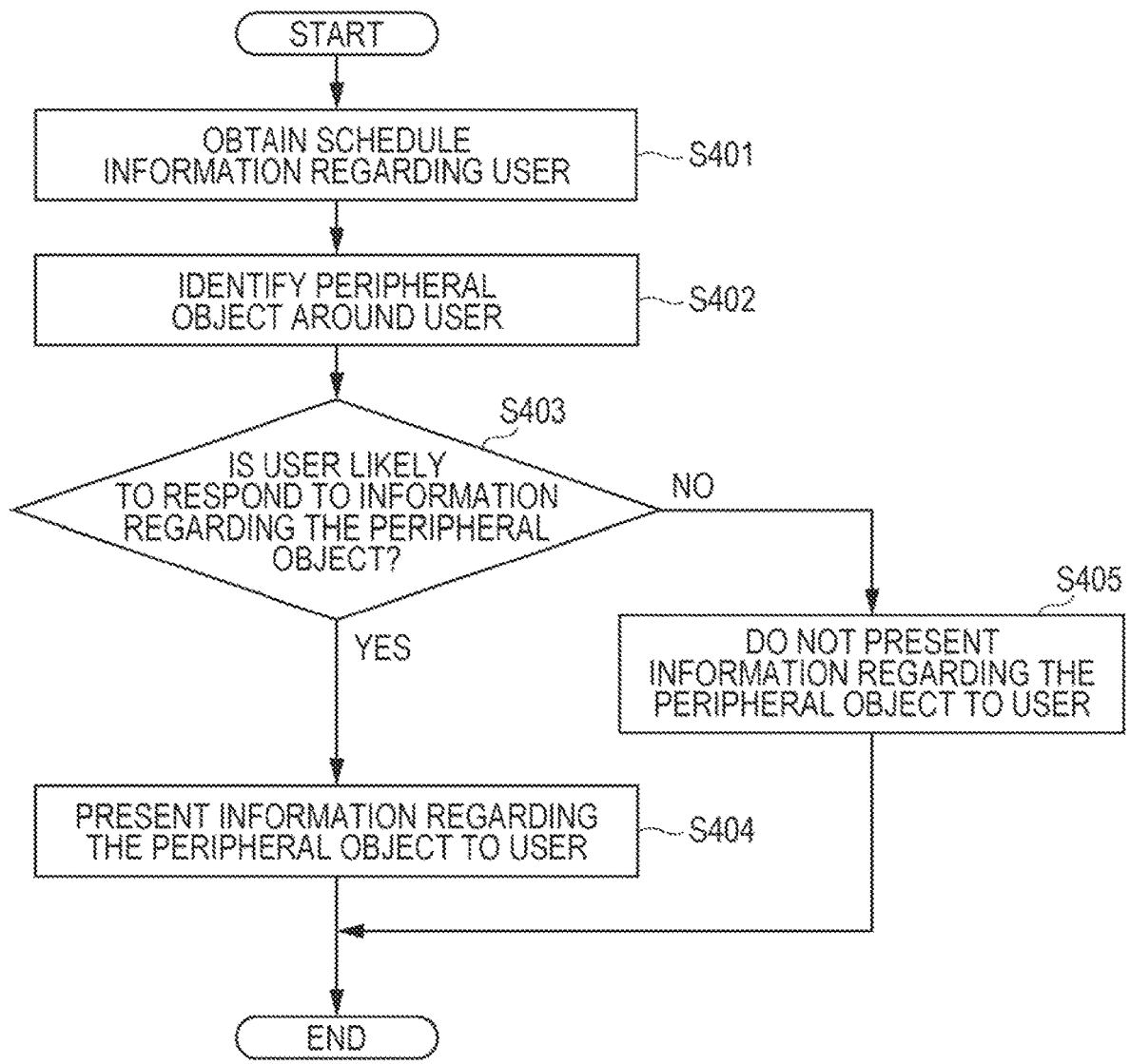
FIG. 18 is a flowchart illustrating an exemplary process to make a determination as to presentation of information on a peripheral object.

FIG. 18 is a flowchart illustrating an exemplary process to make a determination as to presentation of information on a peripheral object.

First, schedule information regarding the user is obtained (step S401). Next, a peripheral object around the user is identified (step S402). Plural peripheral objects may be identified to be around the user.

In step S401, actual information may be obtained instead of, or in addition to, the schedule information regarding the user.

Next, in step S403 of this process, a determination is made based on the information obtained in step S401 as to whether the user is likely to respond to information about the peripheral object if the information about the peripheral object identified in step S402 is presented to the user. Examples of a response to the presented information include clicking on a presented link, making a reservation for a presented facility, and visiting a presented facility.

If it is determined in step S403 that the user is likely to respond to the information about the identified peripheral object, a determination to present the information about the identified peripheral object to the user is made (step S404). In this case, the information about the identified peripheral object is displayed.

If it is determined in step S403 that the user is unlikely to respond to the information about the identified peripheral object, a determination not to present the information about the identified peripheral object to the user is made (step S405). In this case, the information about the identified peripheral object is not displayed.

Whether the user is likely to respond to information about a peripheral object information may be determined, for example, by estimating likelihood of the user to respond to the presented information based on information such as schedule information and actual information and determining whether the likelihood is higher than or equal to a threshold.

Not to mention, the steps in the above exemplary process may not necessarily be in this order and may be changed. For example, the peripheral object may be identified first, and then the schedule information regarding the user may be obtained.

Figure 19:
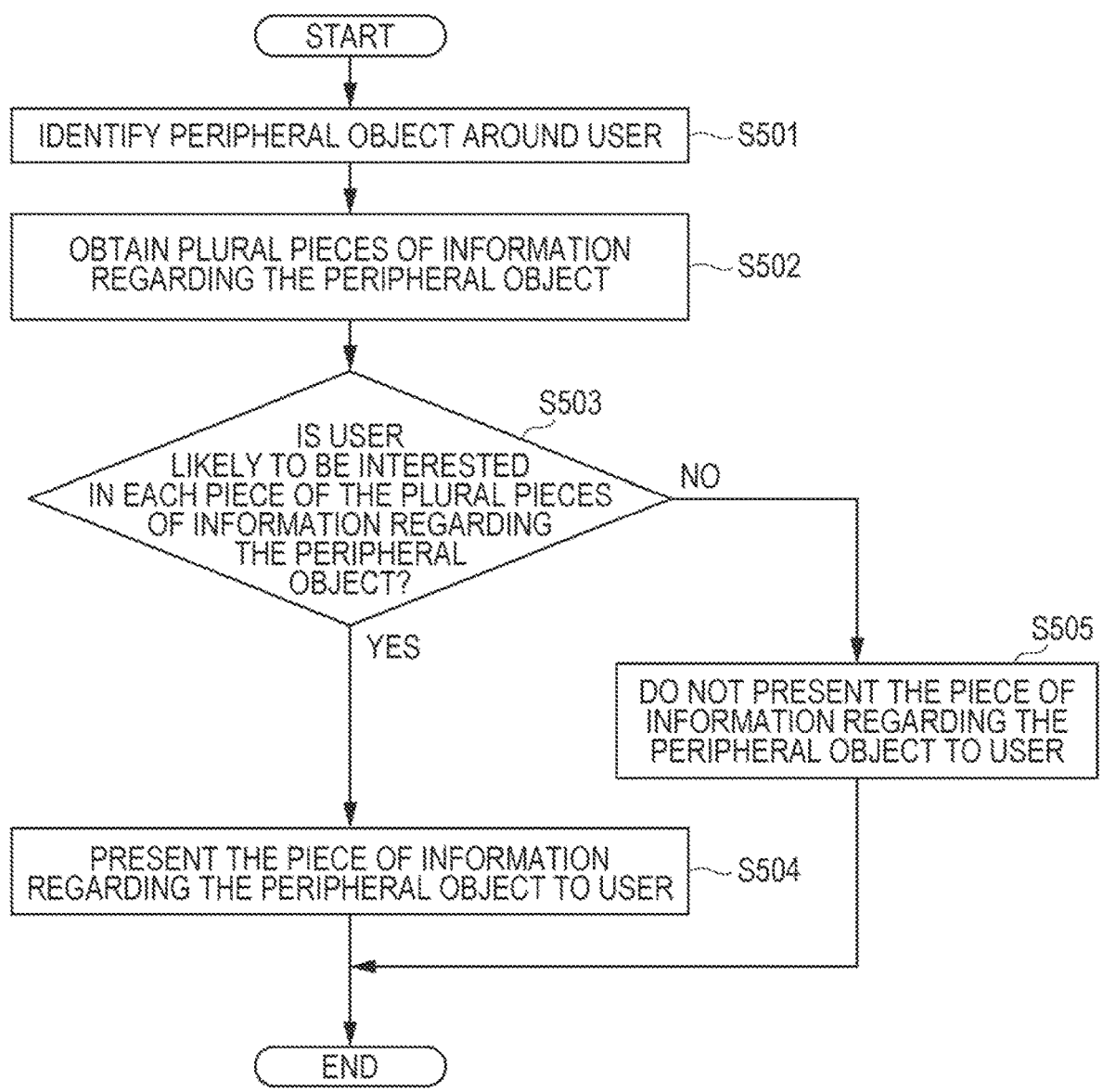
FIG. 19 is a flowchart illustrating an exemplary process to make a determination as to presentation of information on a peripheral object.

FIG. 19 is a flowchart illustrating an exemplary process to make a determination as to presentation of information on a peripheral object.

First, a peripheral object around the user is identified (step S501). Plural peripheral objects may be identified to be around the user. Next, plural pieces of information regarding the identified peripheral object are obtained (step S502).

Next, whether the user is likely to be interested in each piece of the obtained information regarding the identified peripheral object is determined (step S503). If it is determined that the user is likely to be interested in a particular piece of information about the identified peripheral object, a determination to present the piece of information about the peripheral object to the user is made (step S504). In this case, the piece of information about the peripheral object is presented to the user.

If it is determined that the user is not likely to be interested in a particular piece of information about the identified peripheral object, a determination to not to present the piece of information about the peripheral object to the user is made (step S505). In this case, the piece of information about the peripheral object is not presented to the user.

Not to mention, the steps in the above exemplary process may not necessarily be in this order and may be changed.

The CPU 111 may determine information to be presented to the user based on the user's interest information in combination with other information such as schedule information.

The user's interest may be interest in a particular facility (e.g., restaurant N) or a particular product (e.g., multi-course lunch A at restaurant N), or interest in a larger category (e.g., fine food)

FIGS. 17 to 19 illustrate flowcharts of exemplary processes concerning presentation of information about an object identified to be around the user. By modifying some of the steps in the processes illustrated in FIGS. 17 to 19, a determination as to whether to present a related object that is not around the user but is in a predetermined relationship with the object identified to be around the user may be made. Presentation of the information about the related object in addition to or instead of the information about the object identified to be around the user will be discussed later in more details.

From now on, the exemplary processes in the flowcharts will be elaborated by taking presentation of information to a user on a particular day as an example.

Figure 20:
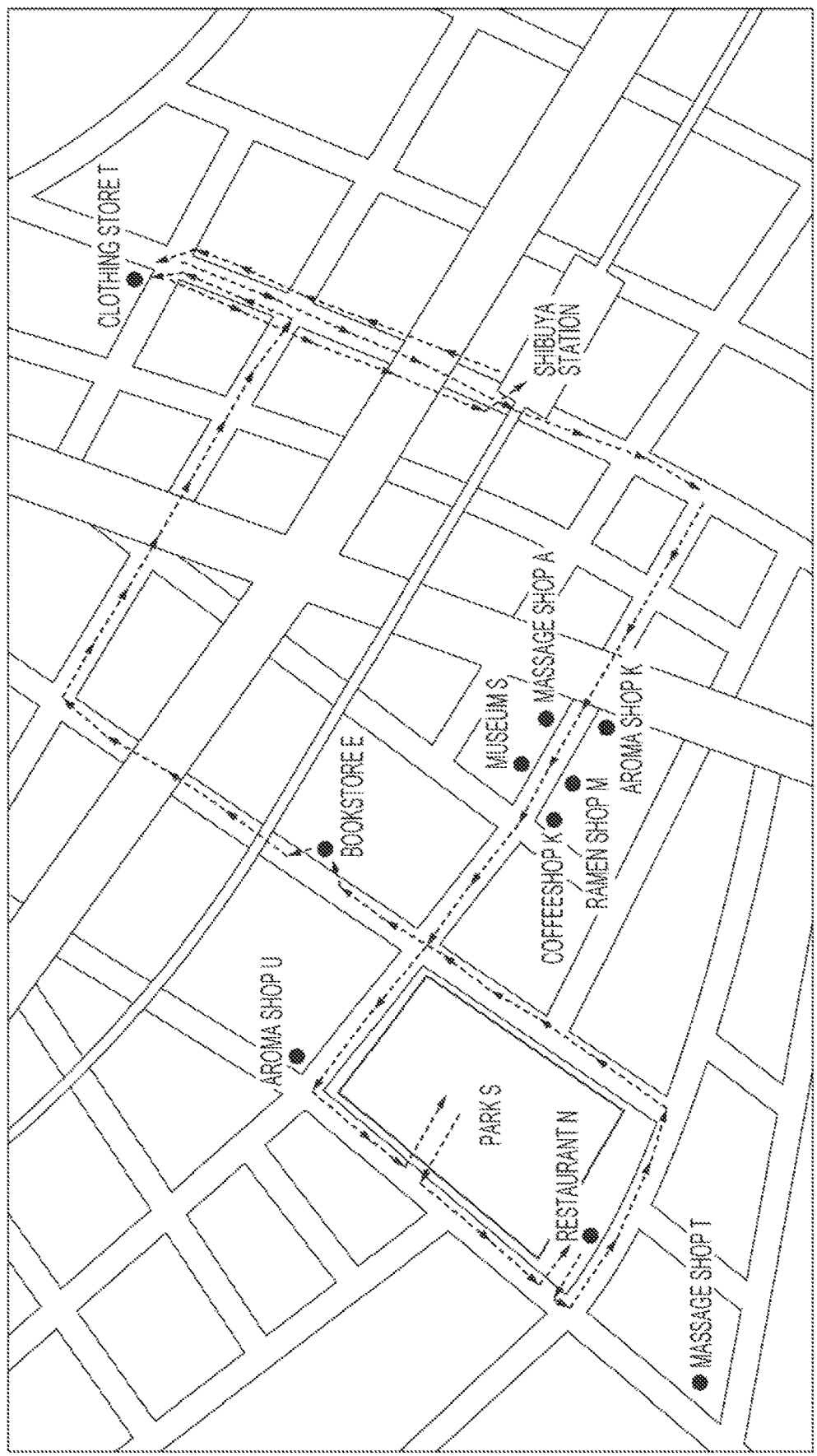
FIGS. 20 and 21 are diagrams illustrating actual movement of a user on a particular day.
Figure 21:
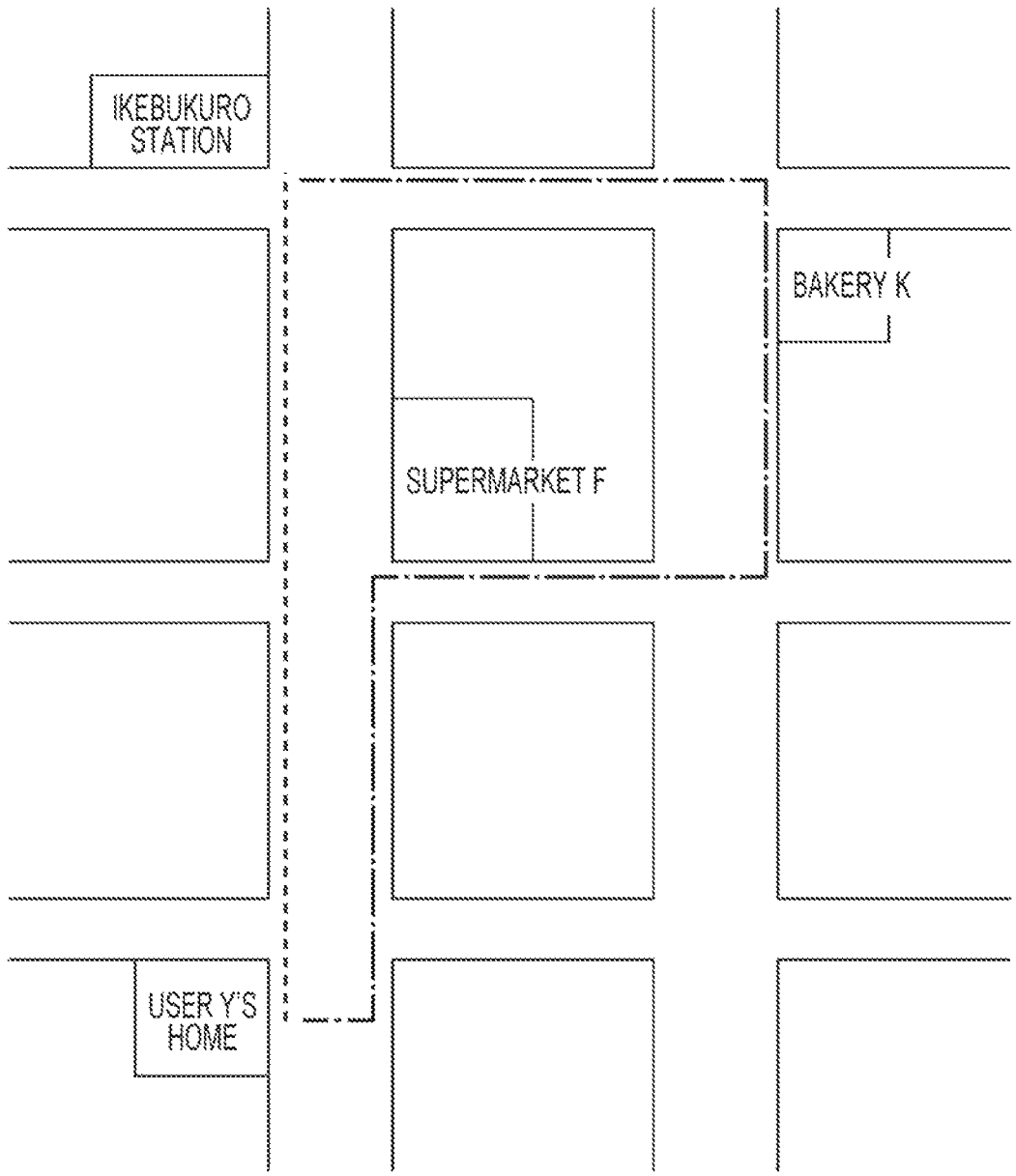

FIGS. 20 and 21 are diagrams illustrating actual movement of a user (user Y) on a particular day (March 14).

As user Y moves, one or more of the exemplary processes in the flowcharts may be executed.

According to a calendar (an example of schedule information) of user Y, user Y is scheduled to have a lunch (example of a meal) with friend S at restaurant N (refer to FIG. 20) from 12:00 to 14:30 on March 14 (Sun).

Restaurant N is a 5-minute walk from Shibuya Station. User Y lives an 8-minute walk from Ikebukuro Station (FIG. 21). Ikebukuro Station is a 10-minute train ride from Shibuya Station.

The actual activities of the user on March 14 (Sun) is as follows:

10:30 Left home.

10:40 Took a train to Shibuya Station at Ikebukuro Station, which was the nearest station.

10:50 Arrived at Shibuya Station (refer to FIG. 20). Headed toward clothing store T.

After getting off the train, user Y began to walk toward clothing store T that user Y had always desired to visit, although this was not a plan. As illustrated in FIG. 20, clothing store T is on an opposite side of Shibuya Station from restaurant N.

10:55 Arrived at clothing store T.

User Y purchased a suit at clothing store T and requested hemming.

User Y was told that the hemming would be completed by 15:00 on March 14 (Sun). User Y received a mail showing a name of clothing store T and a pick-up period. An end of the pick-up period (an example of a time limit) was one week later.

11:20 Left clothing store T. Walked toward restaurant N. Estimated time required to reach restaurant N from clothing store T was 15 minutes at the shortest.

11:35 Arrived at park S. Killed time.

11:55 Arrived at restaurant N.

14:30 Left restaurant N.

14:35 Stopped by bookstore E.

14:40 Left bookstore E.

15:00 Arrived at clothing store T. Received the hemmed suit.

15:05 Left clothing store T.

15:10 Arrived at Shibuya Station.

15:15 Took a train to Ikebukuro Station at Shibuya Station.

15:25 Arrived at Ikebukuro Station (refer to FIG. 21). Began to walk.

15:30 Arrived at bakery K. Purchased some bread.

15:45 Arrived at supermarket F. Purchased ingredients for dinner.

16:15 Arrived at home.

On the above assumption, details of the exemplary processes and their modifications will be described.

Checking with Route Search Application on Smartphone

User Y searches for routes from his/her home (refer to FIG. 21) to restaurant N using a route search application on his/her smartphone before leaving home.

User Y then selects a route "March 14 (Sun): Walk (8 minutes) Japan Railways (JR) Yamanote Line (10:40 Ikebukuro Station 10:50 Shibuya Station) Walk (5 minutes)" among results of the search.

User Y carries the smartphone with the route search application remaining active.

"JR Yamanote Line (10:40 Ikebukuro Station 10:50 Shibuya Station)" is an example of schedule information regarding user Y obtained from a selection history of user Y.

Wearing Wearable Terminal Apparatus

User Y spends the day carrying the smartphone (example of a terminal apparatus 200) and wearing a glasses-type wearable terminal device (example of the eye-wearable terminal apparatus 200A) and a smartwatch (example of the wrist-wearable terminal apparatus 200B) connected to the smartphone by wireless communication (e.g., Bluetooth (registered trademark)).

In this example, the camera 214 (refer to FIG. 1) of the eye-wearable terminal apparatus 200 obtains information regarding objects within user Y's view.

In this example, the camera 214 and the sensor 213 of the eye-wearable terminal apparatus 200 also obtain positional information regarding user Y, vital signs of user Y (heart rate, blood pressure, respiration, body temperature, a blood sugar level, an oxygen level, a state of consciousness, brain waves, pupillary responses, etc.), and the like.

The obtained information is stored, for example, in the information storage device 102 provided for the external server 100.

In this example, a sensor of the wrist-wearable terminal apparatus 200, too, obtains positional information regarding user Y and vital signs of user Y (heart rate, blood pressure, respiration, body temperature, a blood sugar level, an oxygen level, a state of consciousness, brain waves, pupillary responses, etc.).

The obtained information is similarly stored, for example, in the information storage device 102 of the external server 100.

In this example, the information storage device 102 also stores obtained past information regarding user Y.

A state of user Y and things that user Y is interested in may be identified based on the information stored in the information storage device 102. Information indicating user Y's interest in objects at times when the objects existed in user Y's view may be stored in the information storage device 102.

Information to be displayed on a display screen may be determined in consideration of interest information. Interest information indicates a user's interest in an object at a time when the object existed in the user's view.

In order to identify the state of user Y and things that user Y is interested in, a piece of the information stored in the information storage device 102 may be used, or plural pieces of the information stored in the independently information storage device 102 may be used together.

For example, when user Y is looking at a certain peripheral object longer than a predetermined period of time, information regarding the certain peripheral object and vital signs obtained from user Y's body while user Y is looking at the certain peripheral object may be stored in the information storage device 102 while being associated with each other.

More specifically, if heartrate included in the vital signs associated with the certain peripheral object is higher than an average, for example, it can be estimated that user Y is interested in the certain peripheral object.

The vital signs of user Y obtained may not necessarily be used as an indicator of the user's interest, but also as an indicator of the user's fatigue, hunger, or fever.

Tracking Positional Information

User Y activates a positional information function (e.g., GPS) on at least one of the terminal apparatuses 200 that move together therewith. User Y spends the day with the positional information function enabled.

The positional information regarding user Y is saved to the information storage device 102 provided for the external server 100.

The information storage device 102 also stores past positional information obtained for user Y.

In this example, past behavioral tendencies of user Y are analyzed, future behavior of user Y is predicted, and information regarding irregularity of current behavior of user Y is obtained based on the past positional information.

The irregularity of the current behavior of user Y may be obtained based, for example, on information indicating whether a road that user Y is on is the same as one that user Y usually uses and information indicating whether a current position of user Y is in a place that user Y often visits.

If a road that user Y is on is the same as one that user Y usually uses or if a current position of user Y is in a place that user Y often visits, the irregularity can be considered to be low.

If a road that user Y is on is not the same as one that user Y usually uses or if a current position of user Y is not in a place that user Y often visits, the irregularity can be considered to be high.

In this example, a routine of the user that may not necessarily be registered in a calendar of the user can be identified by referring to past positional information regarding the user.

More specifically, if, for example, the past positional information of the user indicates that the user is at a certain place at a certain time of the day regularly, it may be assumed that the user is scheduled to be at the certain place at the certain time regularly.

The past positional information regarding user Y is an example of a behavioral history of user Y.

If the past positional information regarding user Y indicates, for example, the user was in a restaurant at a certain time, it can be estimated that user Y was having a meal at the restaurant around that time.

Other examples of the behavioral history of user Y include a purchase history at stores, a payment history with an electronic payment system, a reservation history with reservation systems, and the like.

Leaving Home and Going to Ikebukuro Station

User Y uses a route connecting his/her home (refer to FIG. 21) and Ikebukuro Station, which is the nearest station, on a routine basis.

More specifically, because user Y often takes a train from Ikebukuro Station for communicating or to go to another station, user Y uses the route (paths between his/her home and Ikebukuro Station) connecting his/her home and Ikebukuro Station, which is the nearest station, on a routine basis.

If a user is on a route that the user frequently uses or in an area of his/her daily activities, a determination to not present peripheral object information to the user may be made.

Alternatively, if a user is on a route that the user frequently uses or in an area of his/her daily activities, a determination to present only peripheral object information of certain types to the user may be made. More specifically, for example, only information (promotion information etc.) that is valid only within a predetermined period of time including a time at which the user passes by a peripheral object may be presented to the user.

Here, even if information such as "Business hours: 9:00 to 20:00 (open seven days a week)" or "Rating: four stars" is presented to user Y for a store along a route that user Y uses almost daily, for example, such information is unlikely to be useful for user Y.

Examples of information that are likely to be useful for user Y include time-specific information or irregular information a store. Examples of such information include "Today only! A pack of eggs is 98 yen", "It's happy hour now", "Temporary closure on March 31 for the year-end settlement", or the like. Current special offer information, for example, is information that is valid only within a predetermined period of time including a time at which user Y passes by a corresponding store.

In view of the above circumstances, peripheral object information may be presented not uniformly to different users but differently depending on the individual users, more specifically depending on obtained information about the user. In an embodiment, when peripheral object information is presented to a particular user, a certain piece of peripheral object information may take priority over other pieces of peripheral object information depending on the user.

A route that a user frequently uses and an area of the user's daily activities may be input by the user, and the route that the user frequently uses and the area of the user's daily activities may be determined based on the input information. When a user is asked to input information regarding a route that the user frequently uses or an area of his/her daily activities, for example, the user may specify the route or the area. More specifically, for example, the user may be asked to set a nearest station and a location of his/her home, and a route connecting the nearest station and the user's home may be used as a route that the user frequently uses.

A certain area including the route connecting the nearest station and the user's home may be determined as an area of daily activities of the user.

A route that a user frequently uses and an area of a user's daily activities may be determined based on behavioral history of the user such as a past movement history of the user.

When peripheral object information is presented to a user, whether the user is going away from a particular place or coming back to the particular place may be determined. Whether to present peripheral object information to the user and/or whether to present a particular piece of peripheral object information may be determined based on a result of the determination.

When user Y is going to Ikebukuro Station from his/her home, for example, user Y is going away from his/her home to go to another place (in this case, Ikebukuro Station).

Generally speaking, people prefer to buy particular products on his/her way home rather than on his/her way to another place (it could be opposite). For example, it is reasonable to assume that people are more likely to buy fresh ingredients (e.g., raw fish, raw meat) for dinner at a supermarket on his/her way home than on his/her way to school or on his/her way to a concert.

Therefore, information regarding the fresh ingredients may be presented to user Y when user Y is determined to be on his/her way home, and not to present the information regarding the fresh ingredients to user Y when user Y is determined to be going away from his/her home.

Whether a user is going away from a particular place or coming back to a particular place may be determined based, for example, on a movement direction of the user, behavioral tendencies identified from a behavioral history of the user, schedule information regarding the user, and/or the like. One of these pieces of information may be independently used, or plural pieces of information may be used together.

When schedule information regarding a user is used, for example, whether the user has an upcoming schedule on the day later than the current time may be determined. If the user still has an upcoming schedule on the day, for example, it may be determined that the user is not on his/her way home yet. If the user has no more upcoming schedule on the day, it may be determined that the user is on his/her way home.

When peripheral object information is presented to a user, whether the user will pass by a target (e.g., any supermarket or a particular supermarket) within a predetermined time period (e.g., present to the end of the day, present to the next schedule) may be determined based on his/her schedule information. Whether to present peripheral object information to the user and/or whether to present a particular piece of peripheral object information to the user may be determined in accordance with a result of the determination.

For example, if it is determined that the user will not pass by an object (a particular store) identified to be currently around the user again within a predetermined period of time, a determination to present information about the object may be made. For another example, if it is determined that a convenience store identified to be currently around the user is the last convenience store the user will pass by within a predetermined time period, a determination to present information about the supermarket may be made. If a user who has no more upcoming schedule on the day is passing by the supermarket, it may be determined that the user will not pass by the supermarket again within a predetermined time period (e.g., by the end of the day).

If a user who is on his/her way to an upcoming schedule is passing a supermarket, it may be determined that the user will pass by the supermarket again within the predetermined time period (e.g., by the end of the day), when the user comes back home from the schedule. In this case, a determination to present the information regarding the supermarket may be made. In this case, a determination to not present the information regarding the supermarket at this point in time but to present the information regarding the supermarket when the user comes close to the supermarket next time or on his/her way home may be made.

Examples of information that may be presented to a user on his/her way to a particular place, home, for example, include information regarding heavy products, information regarding products that need to be refrigerated or frozen, information regarding products that are sold at any time and that have no specific sales hours, information regarding products that are not available for sale on his/her way from home to a schedule but will be available for sale when the user is coming back home, information regarding products whose prices will drop when the user is coming back home, information regarding products that the user purchase for himself/herself, and information regarding products that the user purchases for his/her family.

Examples of information that may be presented to a user when the user is going away from a particular place, home, for example, include information regarding limited-time offers that will not be available when the user is coming back home, information indicating that a store will be closed when the user is coming back home, and information regarding items that the user will use during a schedule on the day, information regarding stores that sell the items that the user will use during a schedule on the day, information regarding products that will not be available around places the user is scheduled to visit on the day, and information regarding stores that sell the products that will not be available around the places the user is scheduled to visit on the day.

Examples of the items that the user will use for a schedule on the day include items necessary for the schedule and gifts to be given to persons that the user is scheduled to meet on the day.

Back to the example of user Y, user Y leaves home at 10:30. To take "JR Yamanote Line (10:40 Ikebukuro Station 10:50 Shibuya Station)" which has been suggested by the selected route, user Y has little time to spare.

When user Y has no time to stop by a store along the route and make a purchase, the CPU 111 may determine not to present peripheral object information or may determine to reduce the amount of peripheral object information to present.

In an exemplary embodiment, an amount of spare time of user Y may be obtained based on a difference between estimated time required for user Y to reach a place of a next schedule (Ikebukuro Station here) from a current position and time currently remaining until a start time of the next schedule (10:40 here, when the train leaves).

Whether to present peripheral object information, content of the peripheral object information to present, and/or an amount of the peripheral object information to present may then be determined based on the amount of spare time of the user.

Taking Train to Shibuya Station at Ikebukuro Station

A movement route by train from Ikebukuro Station to Shibuya Station is one of common movement routes for user Y to go to restaurant N from home. A movement route from Ikebukuro Station to Shibuya Station is a movement route toward restaurant N.

This movement route from Ikebukuro Station to Shibuya Station is not a movement route on foot but a movement route using a vehicle, more specifically, a public transportation.

The train used for this movement route is an example of movement means that travels faster than walking. The train used for this movement route is an example of means of public transportation and an example of movement means that does not stop at the will of an individual.

Shinjuku Station (not illustrated) exists between Ikebukuro Station and Shibuya Station, and Department Store I Shinjuku Branch exists near Shinjuku Station.

When user Y is on the train and the train approaches Shinjuku Station, user Y sees a signboard "Department Store I" on a building of the Shinjuku Branch of the Department Store I.

In an exemplary embodiment, if movement means that is currently being used by a user is a predetermined movement means, the CPU 111 determine not to display peripheral object information the user. If the user starts to move by movement means other than the predetermined movement means, the CPU 111 may control to begin to display the peripheral object information to the user.

More specifically, if it is detected that a user has gotten on a train (example of a predetermined movement means), the peripheral object information presentation function may be disabled as it is difficult for a user to visit peripheral objects that the user passes by while on a train.

In an exemplary embodiment, if it is detected that a user has gotten off a train, the peripheral object information presentation function may be enabled.

In an exemplary embodiment, movement means used by a user is identified based, for example, on a current position of the user, movement speed of the user, positions that the user has passed, history information regarding electronic payment (information such as payment terminals, prices of payment, and places of payment), time information regarding movement means, a use condition of a route search application, a search history of the route search application, and a combination thereof.

Examples of movement means include walking, a private automobile, a taxi, a train, an airplane, and a ferry.

Movement means can be classified in various ways including "above or below a ground level", "land, water, or air", "personal or public movement means".

Movement means may be specific movement means such as "walking" or "JR Yamanote Line", or may be more general, such as "movement means that runs at XX km/h or faster".

In an exemplary embodiment, only some types of information regarding Department Store I Shinjuku Branch may be presented to the user on the move using certain movement means, and other types of information need not be presented. For example, even if information regarding Shinjuku Branch, such as "Current congestion level: Low" or "Parking lot available", is presented to a user while the user is on means of public transportation such as a train, it is difficult for the user to stop by the Shinjuku Branch immediately because the train does not stop at the user's will. That is, even if information regarding a current status of the Shinjuku Branch is presented, it is unlikely to be beneficial to the user. Even when the Shinjuku Branch is present in the user's view, therefore, information regarding the Shinjuku Branch need not be presented. General information describing the Shinjuku Branch, such as introduction of tenants in the Shinjuku Branch or evaluation of the Shinjuku Branch by users, on the other hand, can be beneficial to the user because the information will be useful when the user visits the Shinjuku Branch in the future. Such general information, therefore, may be presented to the user.

Alternatively, whether to display a certain type of information to the user identified to be around the Shinjuku Branch may be determined based on schedule information regarding the user.

For example, whether a user is scheduled to visit a place near a certain peripheral object within a certain period of time may be determined, and whether to display peripheral object information regarding the certain peripheral object may be determined based on a result of the determination.

More specifically, user Y who is viewing the Shibuya Branch may still find it beneficial to be provided with information regarding a limited-time offer "Coupon: You can get a reusable bag as a free gift for purchases of 3,000 yen or more (available at all branches of Department Store I until March 31)" which relates to a related object (e.g., Shibuya Branch of the Department Store I), which is in a predetermined relationship (in this case, in the same chain) with the Shinjuku Branch, located near a place user Y is scheduled to visit or along a route to the place.

In addition, if user Y is scheduled to come close to Department Store I Shibuya Branch within a valid period of the coupon, the coupon may be presented to user Y whose view includes Department Store I Shinjuku Branch.

Arriving at Shibuya Station and Heading Toward Clothing Store T

User Y gets off the train at Shibuya Station (refer to FIG. 20) and begins to walk toward clothing store T that user Y has not registered in a calendar as a schedule of the day, but has long wanted to visit.

As illustrated in FIG. 20, clothing store T is on the opposite side of Shibuya Station from restaurant N.

On the way to clothing store T, if user Y is provided with excessive information regarding stores that user Y is not scheduled to visit, user Y might stop by such stores too many times, making it difficult for user Y to get to the scheduled lunch at restaurant N on time.

In an exemplary embodiment, whether to present peripheral object information and/or how much peripheral object information to present to the user may be determined based on a current position of the user and (2) a place and a start time of a next schedule of the user.

More specifically, whether to present peripheral object information and how much peripheral object information is to be presented may be determined based on a difference between estimated time required to reach the place of the next schedule (here, restaurant N) from the current position and time currently remaining until the start time of the next schedule.

More specifically, if the difference is smaller than a threshold, for example, a determination not to present peripheral object information or a determination to reduce the amount of peripheral object information to present may be made.

In addition, as the difference becomes smaller, the amount of peripheral object information to be presented may be reduced.

In another embodiment, whether to present peripheral object information to the user and/or how much peripheral object information to present to the user may be determined based on a movement direction of the user.

More specifically, if the user is not on a route that is commonly used to get to the place of the next schedule or if the user is not moving toward the place of the next schedule, for example, a determination to not present peripheral object information to the user or a determination to reduce the amount of peripheral object information to present to the user may be made.

If the user is not on a route that is commonly used to get to the place of the next schedule or if the user is not moving toward the place of the next schedule, for example, the user might be moving in order to do something that is not scheduled (e.g., something that is not registered as a schedule in a calendar.) before the next schedule registered in the calendar.

In another exemplary embodiment, a determination as to presentation of present peripheral object information and/or route guidance information may be made based on a result of detection performed by the sensor 213 provided for the terminal apparatus 200 owned by the user or an image obtained by the camera 214 provided for the terminal apparatus 200 owned by the user.

For example, it may be detected based on information obtained by the sensor 213 or the camera 214 that the user is lost. For another example, it may be detected based on biological information regarding the user, such as heartrate, that the user is in a hurry.

If it is detected that the user is in such state, presentation of peripheral object information may be stopped, or the amount of peripheral object information to be presented may be reduced. If it is detected that the user is in such state, the route guidance function may be enabled in order to display route guidance information to the user.

The route guidance information may indicate a route to be followed by the user, may show an arrow indicating a direction in which the user should go, or may be a warning that the user is off his/her route.

In another exemplary embodiment, information regarding movement speed of the user may be obtained, for example, and the determination as to the presentation of peripheral object information and/or route guidance information may be made based on the information regarding the movement speed.

For example, if the movement speed of the user is lower than a predetermined threshold, for example, it may be estimated that the user is not in a hurry or that the user is making stops at facilities on a route the user moving along. If the user is determined to be in such state, a determination to present peripheral object information and not to present route guidance information may be made.

If the movement speed of the user is higher than or equal to the predetermined threshold, for example, it may be estimated that the user is moving toward a destination. In this case, for example, peripheral object information need not be presented, and route guidance information may be displayed.

When the movement speed of the user is low, the user might not be making stops at facilities on a route the user moving along the route, but be lost. The determination as to the presentation of peripheral object information and/or route guidance information, therefore, may be made based on information obtained by the sensor 213 or the camera 214 provided for the terminal apparatus 200 instead of, or in addition to, the information regarding the movement speed.

More specifically, when the user is lost, the user might be upset, look around frequently, or look at signs or maps. When the camera 214 is capturing what the user is looking at, it can be detected that the user is frequently looking around if, for example, objects captured by the camera 214 frequently move in a horizontal direction faster than a threshold. Whether the user is looking at signs or maps can be determined for example by measuring time for which an image captured by the camera 214 has included the signs or the maps. Whether the user is upset can be determined for example from vital information (e.g., heartrate) regarding the user.

If it is determined that the user is lost, presentation of peripheral object information may be stopped or the amount of peripheral object information presented to the user may be reduced. If it is determined that the user is lost, route guidance information may be presented.

If it is not determined that the user is lost, peripheral object information is presented or the amount of peripheral object information presented may be increased. If it is not determined that the user is lost, route guidance information may not be displayed or the amount of route guidance information displayed may be reduced.

The determination as to the presentation of peripheral object information and/or route guidance information may be based on whether the user is in a predetermined state (e.g., lost). The CPU 111 may determine that the user is in a predetermined state based on schedule information regarding the user. The CPU may determine the state of the user based further on at least one of vital information regarding the user, which is information obtained from the user's body, or an image obtained by the camera 214 that moves together with the user.

Arriving at Clothing Store T

User Y purchases a suit at clothing store T and requests hemming. The hemming will be completed by 15:00 on March 14 (Sun). User Y receives a mail showing a name of clothing store T and a pick-up period of the suit. An end of the pick-up period is one week later from the day.

Information included in the mail received by user Y, namely "Pick-up period: One week starting from 15:00 on March 14 (Sun)", may be an example of schedule information obtained from an email received by user Y. The information, therefore, is an example of schedule information regarding user Y.

A schedule "a lunch at restaurant N from 12:00 to 14:30 on March 14 (Sun)" is a restrictive schedule that restricts user Y's freedom from 12:00 to 14:30 on March 14 (Sun).

A schedule "Pick-up period: One week starting from 15:00 on March 14 (Sun)", on the other hand, is a non-restrictive schedule, for which a user may take a certain action at any time within a specified period of time.

Whether a schedule is restrictive or non-restrictive may be set by a user. Alternatively, whether a schedule is restrictive or non-restrictive may be automatically determined based on characteristics of the schedule or the like.

Whether a schedule is restrictive or non-restrictive may be automatically determined, for example, by whether the schedule accompanies a reservation or an appointment (if yes, the schedule can be considered as restrictive) or by whether the schedule has a set period of time within which a particular task can be completed anytime (e.g., if yes, the schedule can be considered as non-restrictive).

Leaving Clothing Store T

User Y leaves clothing store T and walks toward restaurant N. Estimated time required to reach restaurant N from clothing store T is 15 minutes at the shortest.

The present time is 11:20, and remaining time until 12:00, when the schedule at restaurant N starts, is 40 minutes.

The order of degrees of busyness around clothing store T, Shibuya Station, and restaurant N is "Shibuya Station>clothing store T>restaurant N". Restaurant N is in a quieter area compared to Shibuya Station and clothing store T.

In an exemplary embodiment, a degree of busyness around a certain spot may be determined based on the number of stores around the spot (e.g., within a radius of 50 m). The larger the number of stores, the higher the degree of busyness.

If the number of stores around restaurant N is smaller than a threshold, it may be determined that the degree of busyness around restaurant N is lower than a threshold.

If user Y arrives at restaurant N too early, user Y might not know what to do since there are only a few facilities around restaurant N where user Y can kill time.

In an exemplary embodiment, the CPU 111 may determine to present peripheral object information to user Y more actively when user Y is around clothing store T than when user Y is around restaurant N, and most actively when user Y is around Shibuya Station among these spots.

The CPU 111 of the external server 100 may determine content of peripheral object information to be presented to a user based on degrees of busyness at different areas along a route that will take the user to the place of his/her schedule. More specifically, the CPU 111 may determine information to be displayed on a display screen such that more information is presented to a user when the user is located in a place with a higher degree of busyness.

For example, when most of objects on a route of the user from his/her current position to the place of his/her next schedule, peripheral objects are selected such that more peripheral object information is presented to the user when the user is around his/her current position than later on his/her way to the place of his/her next schedule.

When most of objects to be passed by a user are located around a place of a next schedule, on the other hand, peripheral objects are selected such that less peripheral object information is presented to the user when the user is around his/her current position.

The remaining time until the time at which the schedule at restaurant N starts changes over time, and the estimated time required to reach restaurant N also changes in accordance with user Y's behavior.

For example, user Y might stop by a store along a route to restaurant N, be lost, or make a detour. In this case, a ratio of the remaining time to the estimated required time changes.

When user Y has spare time longer than a threshold, a larger amount of peripheral object information is presented or the amount of peripheral object information regarding each of peripheral objects is increased.

When user Y has spare time shorter than or equal to the threshold, on the other hand, a smaller amount of peripheral object information may be presented or the presentation of peripheral object information may be stopped.

When user Y has spare time shorter than a threshold, user Y's route may be guided to help him/her arrive at the place of the next schedule before a start time of the next schedule.

According to the schedule information regarding user Y, user Y is scheduled to meet friend S at restaurant N.

On his/her way to restaurant N, user Y may be presented with peripheral object information that suits user Y's interest.

On his/her way to restaurant N, user Y may be presented with peripheral object information that suits friend S's interest instead of or in addition to peripheral object information that suits user Y's interest, since user Y is scheduled to have a lunch with friend S in the next schedule.

An example of the peripheral object information that suits user Y's interest is information regarding a coupon of a store that user Y frequently visits, information regarding a store dealing with a brand that friend S is interested in.

When a store of brand G that friend S has indicated on a social medium as a favorite brand is in the view of user Y, for example, information regarding the store of brand G may be presented to user Y. More specifically, information regarding the store of brand G may be presented to user Y with information regarding friend S. For example, a message such as "Brand G is a favorite brand of your friend S you are going to meet" may be presented to user Y. To further encourage user Y to visit the store of brand G, a message such as "How about buying a gift set of brand G for your friend S using a coupon?" may be presented to the user, along with a 10% off coupon for the gift set.

A schedule of a user Y may include information about other related people related to the schedule, such as information about friend S. For example, the name of a schedule of user Y may be "Lunch with friends S".

The CPU 111 may present information regarding stores the related person is interested in or stores that sell products the related person is interested in, for example, to user Y as peripheral object information when the stores are identified to be around user Y.

In an exemplary embodiment, things that a certain person such as friend S is interested in and degrees of interest, for example, can be identified based on information registered as favorites of a social medium account of friend S.

In another exemplary embodiment, things that friend S is interested in and the degrees of interest may be identified based on friend S's activity on social media, a behavioral history of friend S, or the like. When things that friend S is interested in and the degree of interest are identified based on friend S's activity on social media, for example, things that friend S is interested in and the degree of interest may be identified based on text and pictures posted by friend S, articles shared by friend S, posts of other persons favorably evaluated by friend S (e.g., posts friend S has liked), and the like.

In another exemplary embodiment, things that friend S is interested in and the degree of interest may be identified based on positional information regarding friend S, purchase information regarding friend S, vital information obtained by a smart glasses worn by friend S, information regarding friend S's view obtained by the smart glasses, and the like.

The next schedule of user Y is a meal at restaurant N.

The next schedule of user Y can be identified, for example, by analyzing a character string "Lunch with friend S" registered in the calendar of user Y or from a fact that the place of the next schedule is restaurant N.

Peripheral object information to present to user Y may be determined based on the schedule information regarding user Y. More specifically, peripheral object information to present to user Y may be determined based on the schedule information regarding user Y and a service provided by each peripheral object.

When user Y is already scheduled to have lunch at restaurant N, it is reasonable to assume that the user is unlikely to stop by ramen shop M to have ramen even if information for recommending ramen shop M is presented to user Y on the way to restaurant N as peripheral object information.

Peripheral object information to present to user Y may be determined based on a current state of the user. For example, the CPU 111 may select a peripheral object that corresponds to a predetermined state of a user. Examples of predetermined state include fatigue and hunger. The current state of the user may be determined based on schedule information of the user, vital information of the user, a combination thereof. The current state of the user may be determined on other information as well.

For example, if the calendar of user Y (example of schedule information of user Y) indicates that user Y has just come back from a business trip the day before, it can be assumed that the user is probably tired. For another example, if there are a predetermined number or more schedules of meetings in a last week of the calendar of user Y (example of schedule information of user Y), it can be assumed that the user is probably tired. For another example, if sleep information of user Y (example of vital information of user Y) indicates that user Y was falling asleep during the day, for example, on the train from Ikebukuro Station to Shibuya Station, it can be assumed that user Y is tired. In an exemplary embodiment, if a user falls asleep at an unscheduled time, it may be determined that the degree of fatigue of the user is high. Information regarding a user's sleep may be obtained, for example, using a sleep analysis application installed on a smartphone or the like.

If it is estimated that a degree of fatigue of user Y is high, the CPU 111 select peripheral objects that present information for recommending stores that provide relaxation services (example of a service corresponding to a current state of the user), such as massage shop A (refer to FIG. 20) and aroma shop K that user Y is not scheduled to visit according to the schedule information of the user. Massage shop A provides a massage service. Aroma shop K sells relaxation products such as scented candles.

The CPU 111 may determine a degree of a state of a user based on schedule information. The CPU 111 may then control the amount of peripheral object information to be presented to the user in accordance with the identified degree of the state.

More specifically, for example, the CPU 111 may identify a degree of fatigue of a user based on the number of schedules of a particular type (e.g. business meetings) within a certain period.

According to the map illustrated in FIG. 20, massage shop A and aroma shop K are located close to each other and can be simultaneously included in a user's view. When there are plural facilities that provide relaxation services around the user, all of the facilities may be presented to the user, or only some of the facilities may be presented to the user. The CPU 111 may obtain status information of each peripheral object around the user and use the status information to determine whether to present information about the peripheral object.

In an exemplary embodiment, the CPU 111 may determine whether to present information regarding massage shop A and information regarding aroma shop K or change the priorities of presenting the information regarding massage shop A and presenting the information regarding aroma shop K based on congestion statuses of massage shop A and aroma shop K. A congestion status of a facility may be determined based, for example, on the current number of persons currently in the facility, the number of persons in the facility on the same day of the week in the past, the number of persons in the facility in the same time period in the past, or a reservation status of the facility.

In another exemplary embodiment, the CPU 111 may determine whether to present the information regarding massage shop A and the information regarding aroma shop K or change the priorities of presenting the information regarding massage shop A and presenting the information regarding aroma shop K based on estimated time to be spent at each shop. More specifically, the CPU 111 determines whether to include the information regarding each of the facilities in the peripheral object information based on schedule information and the status information. If the CPU 111 determines that user Y near massage shop A does not have enough time to use massage shop A, the CPU 111 may determine not to present information for recommending massage shop A or decrease the priority for presenting the information. In an example, if average time spent at massage shop A is calculated as 1 hour from a history of past users of the shop but schedule information of user Y indicates that user Y has time shorter than 1 hour, for example only 25 minutes, the CPU 111 determines that user Y does not have enough time to use massage shop A. In another example, if a menu of services provided by massage shop A, the menu being registered in the information processing system 1, includes "30-minute massage: 1,500 yen" and user Y has only 25 minutes, the CPU 111 determines that user Y, who has only 25 minutes, does not have enough time to use massage shop A. If user Y near aroma shop K has 25 minutes and average time spent at aroma shop K is 20 minutes, on the other hand, user Y has enough time to use aroma shop K. In this case, the CPU 111 determines to present information regarding aroma shop K to the user as peripheral object information, and determines not to present information regarding aroma shop A to the user as peripheral object information.

Arriving at Park S and Restaurant N

While user Y is going to restaurant N from clothing store T, peripheral object information is presented to user Y as described above. User Y, however, does not stop by any of presented stores.

User Y then takes a nap on a bench in park S next to restaurant N until a time of a meeting with friend S. The information regarding the nap may be registered to the information processing system 1 by a sleep management application.

Even if the peripheral object information presentation function of the terminal apparatus 200 owned by user Y is enabled, peripheral object information may not be presented to user Y. Examples of such a case include a case where there are no peripheral objects around user Y for which information can be presented and a case where there are no peripheral objects for which it has been determined that information is to be presented to user Y.

When the peripheral object information presentation function is enabled, the terminal apparatus 200 continuously looks for peripheral objects around the user. This may lead to battery consumption and data communication fees. The peripheral object information presentation function, therefore, may be disabled if a certain condition is satisfied.

More specifically, for example, the peripheral object information presentation function may be disabled if no peripheral object is recognized for a certain period of time or a user stays at the same place for a predetermined period of time or longer.

User Y then has a lunch with friend S at restaurant N.

It is assumed that user Y has installed a nutrition management application on his/her smartphone.

User Y records a meal during the lunch using the nutrition management application. More specifically, user Y records a time at which he/she has had the meal and what he/she has eaten.

User Y also takes pictures of food served. User Y also post a picture of a dessert with text "Lunch with friend S". At this time, positional information regarding user Y is added to the picture or the post.

The nutrition management application has a function of recording calories and nutrients taken by user Y.

Calories and nutrients taken may be identified, for example, by analyzing a picture of food (an example of an image) using a nutrition management application.

Information regarding calories and nutrients taken may be provided for the nutrition management application from a store or a database.

Leaving Restaurant N

When user Y leaves restaurant N, user Y is feeling full.

The degree of hunger of user Y can be determined based, for example, on one or more of the following pieces of information (a) to (g).

(a) User Y's degree of hunger may be determined based on the schedule information regarding user Y. For example, the schedule "Lunch with friend S at restaurant N" registered in the calendar of user Y often indicates that user Y is not hungry shortly after the schedule and his/her degree of hunger gradually increases as time passes until he/she has the next meal. If user Y cancels the schedule but forgets to remove the schedule from the calendar, however, user Y's degree of hunger will be incorrectly determined based on the schedule information regarding user Y.

(b) User Y's degree of hunger can also be determined based on positional information and stay time information indicating that use Y has stayed at restaurant N for 2 hours and 35 minutes. Here, user Y's degree of hunger is determined not based on schedule information but based on an actual event.

Even when user Y has stayed at restaurant N, however, user Y might have stayed restaurant N for purposes other than having a meal, such as for research, or restaurant N might be user Y's workplace.

When positional information and stay time information are used, user Y's degree of hunger is determined without considering a possibility that user Y has not actually had a meal.

(c) User Y's degree of hunger can be determined based on vital information relating to hunger, such as a blood sugar level. When vital information is used, a result of a determination of a degree of hunger can be affected by medication and health problems. In addition, when vital information is used, a change in a degree of hunger might not be observed as a change in the vital information for a while.

(d) User Y's degree of hunger can be determined based on a record of the meal in the nutrition management application. A record of the meal in the nutrition management application, however, might not be immediately available in determining user Y's degree of hunger, because user Y might forget to keep a record or might not leave a record immediately after having the meal.

(e) User Y's degree of hunger can be determined based on a post on a social medium by user Y (e.g., text "I had this" and a picture of food). In this case, user Y might not always use social media or might not post text and pictures during or immediately after having a meal.

(f) User Y's degree of hunger can be determined based on points given to user Y's membership card for restaurant N when user Y uses restaurant N. When points are used, it is difficult to determine user Y's degree of hunger at a store without a membership card. In addition, when user Y forgets to show his/her membership card, points are not given, and it is difficult to determine user Y's degree of hunger based on points.

(g) User Y's degree of hunger can be determined based on a record of payment to restaurant N. More specifically, user Y's degree of hunger can be determined based on, for example, information registered in a database managed by restaurant N, payment information regarding user Y, or information registered in a household account application.

In this case, if a person other than user Y, such as friend S, has made a payment or if user Y has paid by cash, it is difficult to determine user Y's degree of hunger.

User Y's degree of hunger may be determined based on only one of (a) to (g). When only one of (a) to (g) is used, however, accuracy of a determination of user Y's degree of hunger may be low. User Y's degree of hunger, therefore, may be determined based on two or more of (a) to (g) to increase the accuracy of the determination.

More specifically, user Y's degree of hunger may be determined based on schedule information as in (a) and at least one piece of actual information among (b) to (g).

User Y then leaves restaurant N and begins to walk.

If the peripheral object information presentation function and the route guidance function are disabled at this point, for example, the peripheral object information presentation function and the route guidance function may be enabled when it is detected that user Y has begun to walk.

A next schedule of user Y is "Clothing store T pick-up period: One week starting from 15:00 on March 14 (Sun)".

As described earlier, this schedule is a non-restrictive schedule. When user Y leaves restaurant N, user Y is close to a place of the next schedule, clothing store T.

In an exemplary embodiment, the CPU 111 searches for user Y's schedules between now and 15:00 on March 21 (Sun), which is the end of the pick-up period. If the search result indicates that user Y will not come closer to clothing store T than a current position between now and 15:00 on March 21 (Sun), the peripheral object information presentation function may ask user Y, "The pick-up period at clothing store T is one week from 15:00 today. You have no plans to come close to clothing store T after today, but would you like to pick up later today?"

If user Y answers "Yes", the peripheral object information presentation function asks user Y, "Is there anything else you would like to do around here?"

If user Y answers "No", the peripheral object information presentation function presents a message such as "Then let me present some information regarding your nearby facilities on your way to clothing store T", to user Y and begins to present peripheral object information.

If, for example, the start time of the next schedule is 15:00, a time at which user Y leaves restaurant N is 14:30, and estimated time required to reach clothing store T from restaurant N is 15 minutes, the peripheral object information presentation function is enabled and begins to present peripheral object information.

At this time, the peripheral object information presentation function may ask user Y about a time at which user Y wishes to arrive at clothing store T.

More specifically, the peripheral object information presentation function may ask user Y, "When would you like to arrive at clothing store T?", for example, to ask user Y about the time at which user Y wishes to arrive at clothing store T.

If user Y answers, "10 minutes earlier than 15:00" or "Around 16:00", for example, the peripheral object information presentation function presents peripheral object information in accordance with the answer.

A reference time that is used to determine whether to present peripheral object information need not be a start time of a next schedule. As described above, the reference time may be a desired time of a user. Some users might want to arrive at a place of a next schedule earlier than the start time of the schedule to do some preparation, so the reference time may be set to a time desired by a user by asking the user about his/her desired time, and may be set to a time earlier than the start time of the next schedule.

In the case of a non-restrictive schedule, a user need not be in time for the start of the next schedule. Therefore, when presenting peripheral object information to a user whose next schedule is a non-restrictive schedule, the user's interest in peripheral objects may be weighted heavier than his/her time availability to the start time of the next schedule. If the next schedule of a user is a non-restrictive schedule, more peripheral object information may be presented to the user than in the case of the next schedule being a restrictive schedule.

Stopping by Bookstore E

The CPU 111 may avoid presenting information regarding restaurants to user Y who is feeling full.

An area around Shibuya Station is not within an area of daily activities of user Y. Information regarding peripheral objects that do not exist in the area of daily activities of user Y may take priority in presentation to user Y over information regarding peripheral objects that exist in the area of daily activities of user Y.

The CPU 111 may present information regarding peripheral objects that user Y has shown interest in on the way to restaurant N. The CPU 111 may information regarding peripheral object that user Y has shown interest in not only on the way to restaurant N but also on the way back from restaurant N.

On the way to restaurant N, the CPU 111 may ask user Y, "Would you like to stop by at here (peripheral object) on the way back?", for peripheral objects in which user Y seems to be interested in order to check whether user Y is interested enough in the peripheral objects to stop by at the peripheral object. The CPU 111 may present information regarding peripheral objects that user Y has shown interest that is strong enough to stop by at the peripheral objects on the way back from restaurant N.

The CPU 111 may determine peripheral objects for which information is to be presented to user Y based on other information such as a purchase history, a payment history, or a sales history. If, for example, user Y likes automobiles and purchases a particular automobile magazine on the second Sunday of every month or within a few days after the second Sunday, the records of the purchases of the magazine by user Y may be accumulated as "payment history at bookstores" in a payment application, a purchase history in the household account application ("DD(date)/MM(month): Automobile magazine A (500 yen) at Bookstore M"), as a sales history at a bookstore (Customer ID: yamada, Time of sale: 15:34:50 on Feb. 14, 2020, Product purchased: Automobile magazine A).

If today is a second Sunday of a month, the CPU 111 may determine based on a past behavior pattern of user Y that it is likely that user Y will go to a bookstore and may present information regarding bookstores to user Y. More specifically, the CPU 111 searches for bookstores that have a purchase target (automobile magazine A in this example) of user Y in stock and presents the bookstores to user Y.

When user Y's view includes bookstore E that has the magazine in stock, for example, information "Automobile magazine A on sale" may be presented to user Y.

Leaving Bookstore E

User Y visits bookstore E and purchases automobile magazine A in response to the information. User Y also looks through other magazines at bookstore E, and then leaves bookstore E.

The CPU 111 may now lower the priority of presenting information on bookstores as peripheral object information, as it is reasonable to assume that user Y no longer needs to stop by a bookstore since user Y has already purchased the magazine (the target product). More specifically, the CPU 111 may lower the priority of presenting information on bookstores as peripheral object information based on the record of the purchase of the magazine at bookstore E. As a result, even when user Y passes by a bookstore other than bookstore E along his/her way, the bookstore will not be selected as a peripheral object for which peripheral object information is to be presented.

If it is detected that user Y has visited another bookstore after visiting bookstore E, the CPU 111 may increase the priority of presenting information on bookstores as peripheral object information again, assuming that user Y may be bookstore-hopping. If it is detected that a user is visiting plural stores of a certain type (bookstores, shoe stores, etc.) like this, a priority of the stores of that type may be increased.

Arriving at Clothing Store T and Picking up Hemmed Suit

User Y arrives at clothing store T and picks up the hemmed suit. User Y then receives a mail "Thank you for picking up".

Although an end time of the schedule "Pick-up period: One week starting from 15:00 on March 14 (Sun)" has not yet come, the schedule may now be regarded as having ended based on the email indicating the completion of the scheduled task.

Leaves Clothing Store T

User Y then walks toward Shibuya Station.

If no further schedule of user Y for the day is extracted from the calendar, mails, reservation systems, or the like, user Y need not kill time until a next schedule.

It is considered that there are two types of users: those who desire to go home early and those who do not desire to go home early.

Whether user Y desires to go home early may be determined based on what kind of store user Y is visiting. Users who desire to go home early tend to stop by at supermarkets and stores that sell daily necessities and other daily products. It is unlikely that users who desire to go home early stop by cafes, restaurants, brand-name stores, and the like.

Whether user Y desires to go home early may be also determined by analyzing past behavior information. More specifically, whether user Y desires to go home early can be determined based on, for example, whether user Y tends to make a detour after a last schedule of a day.

The CPU 111 may make a determination as to presentation of information to user Y, taking into consideration whether user Y is heading his/her home. The CPU 111 may determine that user Y is heading home if user Y is moving along a route in the direction towards his/her home.

In order to get home, user Y takes a train from Shibuya Station to Ikebukuro Station.

The CPU 111 may take into consideration that the user probably does not want to get on a train with his/her luggage or that the user probably wants to purchase ingredients and daily necessities after arriving at a station nearest to his/her home if possible.

When a user is returning home late, for example, a supermarket around a station nearest to the user's home might be closed before the user arrives at the supermarket. In such case, a closing time of a facility (e.g., the supermarket around the nearest station) that the user frequently visits and an estimated time at which the user will pass by the facility are compared with each other, and if the supermarket around the nearest station will be closed before the user arrives at the supermarket, information regarding a supermarket around Shibuya Station may be presented to the user as peripheral object information when the user passes by the supermarket.

When the user passes by a supermarket around Shibuya Station, for example, information such as "Do you need to buy some food? There are supermarkets closer to your home, but they will be closed when you get there. Maybe you might want to buy your food at the supermarket here" may be presented to the user.

Arriving at Shibuya Station and Taking Train to Ikebukuro Station

The peripheral object information presentation function may be disabled while the user is taking a train from Shibuya Station to Ikebukuro Station. More specifically, when it is detected that user Y has gotten on a train, the peripheral object information presentation function may be disabled.

Arriving at Ikebukuro Station and Beginning to Walk

User Y then arrives at Ikebukuro Station (refer to FIG. 21) and begins to walk. The peripheral object information presentation function may be enabled when it is detected that user Y has gotten off the train.

Since user Y frequently walks between the nearest station and his/her home, route guidance information need not usually be presented between the nearest home and user Y's home. The CPU 111 may determine not to present route guidance information to the user when the user is on a route that the user uses at a predetermined frequency or higher.

In an exemplary embodiment, the CPU 111 may present information when user Y passes by a store dealing with a product that user Y often purchases or a store that user Y often visits. More specifically, for example, the CPU 111 may present valuable information regarding such a store to user Y. The valuable information may be, for example, information regarding special offers of the store.

In an exemplary embodiment, if a certain condition is satisfied, the CPU 111 may present a route that user Y does not usually use. As a result, user Y's range of activity will increase.

When the last schedule of a user in a predetermined period of time has ended (e.g., when the last schedule of a day has ended), for example, the CPU 111 may determine to present a route that the user does not usually use.

More specifically, the CPU 111 may determine whether the present time is before the last schedule of the user in a predetermined period of time. The CPU 111 may present different routes to the user in accordance with a result of the determination. For example, if the present time is after the last schedule of the user in the predetermined period of time, the CPU 111 may determine to present a route that the user does not usually use. If, on the other hand, the present time is before the last schedule of the user in the predetermined period of time, the CPU 111 may determine not to present a route that the user does not usually use.

Even though user Y usually takes a shortest route from the nearest station (Ikebukuro Station) to his/her home, the CPU 111 may suggest user Y that user Y use a path that he/she does not usually use by presenting a message such as "Bakery K has opened yesterday at a place about a 2-minute walk from here. You can stop by bakery K with additional 5 minutes to time usually taken to go home. Would you like to go? Use your smartphone if you check its location" to user Y. The suggestion to use the unusual route to stop by at bakery K may be based on information that bakery K has recently opened on a street next to the route that user Y usually uses, or information such as a purchase history of user Y and his/her posts on social media indicating that user Y likes bread.

Since user Y does not usually use the route to bakery K, the CPU 111 may enable the route guidance function and present the route to bakery K if user Y desires to take the unusual route that has been suggested (e.g., if user Y answers, "I would like to go to bakery K"). The CPU 111 may also present information regarding stores along the route to bakery K to user Y as peripheral object information while presenting the route to bakery K.

The CPU 111 may present peripheral object information to user Y in various modes.

For example, if user Y is a 30-year-old married male with a child (e.g., 3-year-old son) and works at company X as a department manager, the CPU 111 may control information to be displayed on a display screen in a "thirty-something male" mode, for example, which informs user Y of what kind of peripheral objects other people of the same gender around the same age (for example other male people in their thirties in this case) look at while walking.

For another example, peripheral object information may be presented to user Y, for example, in a "user Y's wife" mode. In this case, information on objects that user Y's wife usually looks at may be presented to user Y. Information regarding the objects that user Y's wife usually looks at can be obtained, for example, by analyzing image data obtained by a camera 214 of a terminal apparatus 200 worn by user Y's wife.

The objects that user Y's wife usually looks at may be presented in accordance with an instruction from user Y or automatically when a certain condition is satisfied. If, for example, a birthday of user Y's wife may be identified based on information (an example of schedule information) registered in the calendar of user Y, peripheral object information may be presented to user Y in the "user Y's wife" mode during a month before the birthday of user Y's wife. This may help user Y to gather information regarding stores that user Y's wife is interested in and purchase a gift to his/her wife from the stores.

For another example, a "president" mode may be prepared, and if the "president" mode is selected, information regarding peripheral objects that persons with a title of president are interested in may be presented to user Y.

Arriving at Bakery K and Purchasing Bread

User Y then arrives at bakery K and purchases some bread.

The CPU 111 may ask user Y, "Why don't you tell everyone about bakery K?", to prompt user Y to post to social media. More specifically, the CPU 111 may prompt user Y to post to social media when user Y comes out of the store. In an exemplary embodiment, after user Y comes out of bakery K, the CPU 111 may ask user Y to speak in order to create text to be posted on a social medium based on the user's speech. In another exemplary embodiment, the CPU 111 may process (e.g., cropping, blurring, etc.) image data obtained by the camera 214 of the terminal apparatus 200 and prompt user Y to post a photo or a video.

In an embodiment, the CPU 111 may identify a product included in image data captured by the camera 214 of the terminal apparatus 200 for longer than a predetermined time period and cut out a portion of the image including the product as a photo or a video. It can be considered that user Y is interested in such a product.

In order to protect privacy, a photo or a video may be processed such that the photo or video does not include people other than user Y or voice of people other than user Y.

In an exemplary embodiment, the CPU 111 may ask user Y, "Would you like to rate bakery K?", to prompt user Y to give a rating.

The CPU 111 may ask user Y, "Are you going home?", after user Y goes out of bakery K. If user Y answers "Yes", user Y may be guided to the street that user Y usually takes to go home. The route guidance may automatically end when user Y has meet the street he/she usually takes to go home.

Depending on a type of store or a type of service offered at the store, it might be difficult for user Y to rate a store or a service immediately after coming out of the store. The CPU 111 may control when to ask the user to provide a rating.

When user Y purchases some bread at bakery K to go, user Y can rate a customer service or atmosphere of the store immediately after user Y comes out of the store, but it will be difficult for user Y to rate the taste of the bread immediately after user Y comes out of the store. The CPU 111 may ask the user Y to rate the bread a predetermined time after the visit to bakery K (e.g., three days or one week later), so that user Y can rate the taste of the bread when user Y has actually eaten the bread.

On the other hand, user Y may be requested to rate the customer service or the atmosphere of the store immediately after the visit, as the memory of user Y might fade away and it might be difficult for the user to provide a rating for the customer service or the atmosphere of the store if the user is not asked to rate the customer service or the atmosphere of the store within a fairly short time from the visit.

Generally speaking, not all ratings may be genuine. Examples of non-genuine ratings include a rating of a place that a user has never actually visited, a rating of a product by a user who has never used or eaten the product, and a rating of a customer service by a user who has not received the customer service.

Whether a rating given by a user is genuine may be determined by determining, based on information regarding visual or audio information obtained by a terminal apparatus 200 owned by the user, whether the user has actually seen a product or whether the user has actually communicated with a salesperson or a person at the customer support desk.

The visual information obtained by the terminal apparatus 200 owned by the user may for example be image data obtained by the camera 214 of the terminal apparatus 200. Objects included in the user's view may be checked based on the image data, and whether a rating given by the user is genuine may be determined.

The audio information obtained by the terminal apparatus 200 owned by the user is, for example, a sound obtained by the microphone 215 of the terminal apparatus 200. By analyzing the sound, for example, a conversation between the user and a person from the store can be identified, and whether a rating given by the user is genuine may be determined based on a result of the determination.

The CPU 111 may determine what a particular user should be asked to rate. In an exemplary embodiment, a user who has certainly seen a product or a user who has communicated with a person from the store may be identified based on information regarding visual or audio information obtained by a terminal apparatus 200 owned by the user, and the identified user may be requested to give a rating to what the user can rate, in order to avoid non-genuine ratings.

More specifically, in response to a determination that a user who has communicated with a person from the store, the user may be asked, "How was the customer service?". In response to a determination that a user who has look around products at the store may be asked, "How was the product lineup?" or "Did you find what you wanted?"

Whether a user has actually visited a store may be determined, for example, based on how long the user has stayed at the store. If further precision is desired, an actual visit may be distinguished from just sitting on a chair around the store or just passing through the store.

When visual or audio information may be helpful in make a more reasonable determination as to whether a user has seen products at the store or has communicated with a person from the store, and may be helpful in requesting the user to provide a rating on a particular aspect.

Determination as to which user to request to rate what may be determined based on the user's behavior in a store. More specifically, for example, a user who has used a self-checkout and has not receive a customer service may be requested to give a rating to an aspect other than the customer service. In this case, a user who has not received an in-person customer service will not give a rating of the customer service to maintain reliability of ratings.

In another exemplary embodiment, whether a rating that has been given by a user is genuine may be determined based on data obtained by a terminal apparatus 200 of the user. If a user has left a comment, "I felt terrible when a person from your store said to me, 'XXX'", for example, whether this comment is genuine may be determined based on audio information obtained by a terminal apparatus 200 owned by the user. If a user leaves a comment, "When I got home, I noticed that there is a scratch on the product", for example, whether this comment is genuine may be determined based on visual information or acceleration information obtained by a terminal apparatus 200 owned by the user. More specifically, the user's behavior after the user left a store is analyzed based on the visual information or the acceleration information obtained by the terminal apparatus 200 owned by the user. If the user's behavior after the user left the store included movement so violent that it could damage the product, for example, it may be determined that the user's rating is non-genuine.

Entering Supermarket F and Purchasing Ingredients for Dinner

User Y enters supermarket F and purchases ingredients for dinner. As described earlier, information regarding fresh ingredients may be presented while user Y is going home. For example, information regarding fresh ingredients for dinner may be presented to user Y when user Y's view includes supermarket F on user Y's way home.

Arriving Home

User Y arrives home. The CPU 111 may control to display information, "Welcome back!", on the terminal apparatus 200 and disable the route guidance function and the peripheral object information presentation function.

The CPU 111 may ask user Y about a degree of satisfaction with the navigation. More specifically, the CPU 111 may user Y, "How satisfied are you with the navigation?" or "Was the amount of information appropriate?".

If user Y answers that he/she is not satisfied with the navigation or that the amount of information presented to the user was not appropriate, the CPU 111 may adjust a determination process related to content of the navigation in accordance with the answer.

The CPU 111 may also ask user Y, "Was the information accurate?". If user Y answers that the information was not accurate, the CPU 111 may correct the information for future presentation.

The CPU 111 may also ask user Y, "Was necessary information provided?". If user Y answers that necessary information was not provided, the CPU 111 may adjust a determination process relating to provision of information in accordance with the answer.

Modifications

So far, presentation of peripheral object information regarding peripheral objects around a current position of user Y has been discussed. Now, presentation of related object information regarding related objects that have a predetermined relationship with the peripheral objects will be discussed. In an exemplary embodiment, a similar object that has a feature that is common with a peripheral object may be identified, and information regarding the similar object may be presented as related object information.

Back to FIG. 20, aroma shop U, which provides substantially the same service as aroma shop K, exists 30 m ahead of aroma shop K. When user Y is in front of aroma shop K, user Y's view does not include aroma shop U. Aroma shop U is along a route used when user Y goes to restaurant N (an example of a place of a next schedule). Aroma shop U and aroma shop K are service facilities having a common feature, since both stores provide services relating to aroma.

In an exemplary embodiment, determination as to whether to present information on aroma shop U to user Y when aroma shop K is in the view of user Y may be based, for example, on whether a fee is paid by the two stores to promote the respective stores. If, for example, aroma shop K is not paying a promotion fee to a provider of the information processing system 1, whereas aroma shop U is paying a promotion fee to the provider, a determination may be made to present information on aroma shop U to user Y when aroma shop K is in the view of user Y. In another exemplary embodiment, information on aroma shop U may be presented to user Y when aroma shop K is in the view of user Y, regardless of whether such fee is paid or not.

In a case where user Y passes by aroma shop K earlier than aroma shop U, if user Y purchases aroma products he/she wants at aroma shop K, it will be likely that user Y stops by aroma shop U. Presenting the information regarding aroma shop U to user Y when he/she is around aroma shop K informs user Y that there is an aroma shop other than aroma shop K and may bring user Y to aroma shop U.

Examples of the information regarding aroma shop U to be presented to user Y include information regarding a location of aroma shop U (e.g., information "30 m ahead") and information for prompting user Y to use aroma shop U, such as a coupon.

When such information is presented, the user Y may be more likely to purchase products at aroma shop U instead of aroma shop K. In addition, when such information is presented, user Y might check prices and a product lineup at aroma shop K first but also go to aroma shop U to check their products and prices before making an actual purchase at aroma shop K.

Whether to present the information regarding aroma shop U to user Y may be determined taking schedule information regarding user Y into account. For example, whether to present the information regarding aroma shop U to user Y may be determined based on information regarding places of schedules of user Y and the information being included in the schedule information regarding user Y. In an exemplary embodiment, objects that are similar to peripheral objects around the user and on the route of user Y to his/her destination may be selected as related objects that are in a predetermined relationship with peripheral objects around the user. The route of user Y to a place of a schedule may be predicted based, for example, on the schedule information of user Y. In an exemplary embodiment, related objects that have a predetermined relationship with a peripheral object may be determined based on information registered in the database. For example, if the types of business of aroma shops K and U registered in the database are substantially the same, when user Y sees aroma shop K, aroma shop U may be selected. In an exemplary embodiment, a similar object located within a predetermined distance from a peripheral object may be presented as related object.

The information regarding aroma shop K (peripheral object information) and the information regarding aroma shop U (related object information) may be simultaneously presented to user Y who is seeing aroma shop K. In an exemplary embodiment a determination as to whether to present information on aroma ship K, information on aroma shop U, or both may be made. For example, a price (e.g., an approximate price (e.g., an average price) paid when aroma shop U is used or a price of a certain product) at aroma shop U and a comparable price at aroma shop K may be compared, and only information about the store that has the lower price may be presented to user Y. If, for example, a price of a product wanted by user Y at aroma shop U is lower than a price of the product at aroma shop K, the information regarding aroma shop U may be presented to user Y. For another example, a rating of aroma shop U and a rating of aroma shop K may be compared with each other, and if the rating of aroma shop U is higher, for example, the information regarding aroma shop U may be presented to user Y.

The function to present information regarding related objects may be enabled or disabled, and if the function is enabled, information regarding related objects, such as the information regarding aroma shop U, may be presented. The user may be allowed to set a condition under which information regarding related objects are presented. More specifically, a user may be allowed to set a condition, for example, "Display information about a related object if a rating of the related object is higher than a peripheral object".

Cooperation Between Apparatuses

Information regarding a coupon available at a peripheral object, the information being displayed on an eye-wearable terminal apparatus 200, for example, may be transmitted to another terminal apparatus 200 (e.g., a smartphone-type terminal apparatus 200 or a wrist-wearable terminal apparatus 200) by mail or the like. In such case, the coupon or the like displayed on the eye-wearable terminal apparatus 200 may be displayed on or saved to the other terminal apparatus 200.

Information regarding a peripheral object may be transmitted to, displayed on, or saved to another terminal apparatus 200 in response to an instruction from a user by voice or gestures, or a user selection of a hardware button or a software button.

If a user responds to presented peripheral object information, for example, information regarding a coupon or the like corresponding to the peripheral object information to which the user has responded is transmitted to a smartphone-type terminal apparatus 200 or a wrist-wearable terminal apparatus 200. More specifically, if a user views the presented peripheral object information or a peripheral object indicated by the presented peripheral object information for a certain period of time or longer, or if it is detected that the user has visited the peripheral object, for example, a coupon that can be used at the peripheral object may be transmitted to the smartphone-type terminal apparatus 200 or the wrist-wearable terminal apparatus 200. In such case, the smartphone-type terminal apparatus 200 or the wrist-wearable terminal apparatus 200 may display the coupon or information indicating presence of the coupon. Displaying the coupon on the smartphone-type terminal apparatus 200 or the wrist-wearable terminal apparatus 200 may make it easier for the coupon to be scanned by a code reader when the coupon has a barcode or a QR code (registered trademark) to be scanned.

When a user makes an electronic payment, a terminal apparatus 200 used for the payment or another terminal apparatus 200 may display information "You have a coupon" in order to remind the user of the coupon.

Examples for Further Elaboration

Next, an exemplary process for presenting peripheral object information and related object information will be described using a private booth, which is an example of a rental space, as an example of a facility.

The booth is installed in town and includes an entrance and a box into which a user can enter through the entrance. The user can work in spare time using the booth. The user can reserve this space in advance. A usage fee is set, for example, for certain unit time (e.g., 300 yen for every 15 minutes).

A determination as to presentation of information regarding the booth may be made based on schedule information regarding a user. More specifically, whether to suggest a certain user the booth may be determined based on a next schedule of the certain user. More specifically, whether to suggest a certain user the booth may be determined using a start time of the next schedule of the user. In an exemplary embodiment, whether to suggest a certain user the booth may be determined based on a degree of hurry of the user using the present time, a start time of a next schedule of the user, and a place of the next schedule.

A determination may be made so that a person who has time to use a service (the booth in this case) receives a suggestion of the service, and a person who does not have time to use a service does not receive a suggestion of the service. Examples of the person who has time to use a service include a person whose next schedule is within a predetermined period of time (e.g., from the present time to an end of the day) and a person who has a certain period of time or longer in relation to a place and a start time of his/her next schedule. Examples of the person who does not have time to use the service include a person whose next schedule is not within a predetermined period of time and a person who does not have a certain period of time or longer in relation to a place and a start time of his/her next schedule.

Whether to suggest a particular user to use the booth may be determined based on the type of his/her next schedule. For example, if the next schedule of a user is a leisure schedule (e.g., a lunch with a friend), for example, a determination may be made not to suggest the user to use the booth. If a next schedule of the user is business (e.g., a meeting), a determination may be made to suggest the user to use the booth.

Whether a user brings a gain or a loss to a peripheral object when the user uses the peripheral object may be determined based on schedule information regarding the user, and a determination as to presentation of information regarding the peripheral object to the user may be made based on the gain or the loss. More specifically, whether a user who has come close to the booth brings a gain or a loss to the booth when the user uses the booth may be determined based, for example, on a start time of the next reservation for the booth and a place and a start time of the next schedule of the user, and a determination as to presentation of information regarding the booth to the user may be made based on the gain or the loss. More specifically, a usage fee (an example of a gain) at a time when a user who has come close to the booth uses the booth may be estimated based on the start time of the next reservation for the booth and the place and the start time of the next schedule of the user. Whether to suggest the user the booth may be determined based on the estimated usage fee.

If a determination is made to suggest a particular user the booth, information on the booth is presented to the user. More specifically, if, for example, the estimated usage fee exceeds a predetermined threshold, a determination to present information on the booth to the user may be made. If, on the other hand, the usage fee does not exceed the predetermined threshold, a determination not to present the information on the booth to the user may be made.

If the suggestion presented to the user fails to make the user use the booth, a new user may be searched. For example, if the view of the user who received the suggestion no longer includes the booth, a new user may be searched.

In order to increase an income from booth rentals, for example, a person who is likely to use the booth continuously for a long time may be preferentially selected as a target user to suggest the booth. When start times of next schedules of users and time taken to reach places of the next schedules are taken into consideration, the income from the booth is likely to increase when suggesting the booth to a user who can use the booth for 30 minutes than when suggesting the booth to a user who can only use the booth for 15 minutes at most.

In addition, a profit may be estimated by predicting, for each of the users, a service that is likely to be used by the user among services provided at a certain facility. In addition, the amount of money (an example of a gain or a loss to a service provision facility) paid by the user to a service provision facility may be estimated by estimating a cost for providing the service.

For example, it can be predicted that a user who has just have a lunch will probably purchase only a drink. For example, if a user says, "I want to have my hair permed", on a social medium, for example, it can be predicted that the user will probably have his/her hair permed. For another example, if a user who says, "I want to have my hair cut", on a social medium, it can be predicted that the user will probably have his/her hair cut.

When a gain or a loss to a service provision facility is determined, a cost for providing a service may be taken into consideration. Examples of the cost for providing a service includes a cost for laying in products or ingredients, a labor cost at the service provision facility, and a cost of a space for providing the service. Generally speaking, a haircut has a higher profit margin because a haircut can be given in a shorter time than a perm, which results in a lower labor cost, and there are no costs for chemicals and the like. When determining which user to select as a target user to whom information on a peripheral object, for example a hair salon, is presented, a determination may be made so that a user who is wanting to have their hair cut is selected over a user who is wanting to have their hair permed.

When a peripheral object is a service provision facility such as a restaurant, encouraging users who is likely to finish eating and drinking in a short period of time and users who is likely to take away food and drink will contribute to an increased turnover rate of the restaurant, allow the restaurant to serve more customers to make more profits (example of a gain).

If schedule information of multiple users is obtained and the next schedules of the users indicate, for example, that there are a first user who can stay at a restaurant for 2 hours at most and a second user who can stay at the restaurant for 1 hour at most, a determination may be made so that the second user is selected over the first user as a target user to suggest the restaurant. There is a risk with the first user, if comes to the restaurant, that the user might occupy a seat for 2 hours, decreasing a turnover rate of the restaurant (example of a loss). The risk, however, can be avoided by selecting the second user over the former user as a target user to whom information of the restaurant is presented.

A determination as to which user to select as a target user to suggest a peripheral object may be based on the number of other people the user is together with. For example, information regarding the peripheral object may be presented to the user who is around the peripheral object and who is with other people. If a user who is identified to be with other people is suggested to visit a peripheral object, it is likely that more than one person will use a service provided by the peripheral object (an example of a gain). More specifically, a user who is identified to be moving with other people, such as a user who is on a date, may be searched, and such a user may be more preferentially selected as a target user to whom information about the peripheral object is presented over other users identified to be moving without any companion. Whether a user is with other people can be determined, for example, from a schedule registered in a calendar of the user.

Encouraging users who are with other people to use a service may increase an occupancy rate of tables that can accommodate a group of people (example of a gain). When a user comes to the restaurant on his/her own and uses a table for a group of people (e.g., tables for two, four, etc.), some seat will have to remain empty, decreasing the occupancy rate. In contrast, if a user with other people, especially a user in a group of even numbers of people (e.g., groups of two, four, etc.) comes to the restaurant, the occupancy rate of seats is likely to decrease. The number of people the manager wants to come to the restaurant may depend on the table availability of the restaurant. Individuals or groups of odd numbers of people may be also welcome depending on the availability. For example, if there is a table for three people that is empty, encouraging groups of three people may increase an occupancy rate of seats.

In an exemplary embodiment, the CPU 111 may determine, based on schedule information regarding a user, a gain or a loss that could be brought by the user to a facility. For example, the CPU 111 may estimate a duration for which the user could use the facility based on schedule of information of the user. The CPU 111 may then make, based on the estimated duration, a determination as to presentation of information regarding the facility to the user.

In an exemplary embodiment, the CPU 111 may make the determination as to the presentation of the information regarding the facility to the user based on persons relating to a schedule of the user. More specifically, when an even number of persons relate to a schedule of a user, for example, the CPU 111 may present information regarding a certain facility to the user. If only one person relates to a schedule of a user, the CPU 111 may avoid presenting information regarding a certain facility to the user.

In an exemplary embodiment, the CPU 111 may determine to present a coupon that can be used at an affiliated store that is located between a user and the booth when the user passes the affiliated store. More specifically, the CPU 111 may determine to present a coupon that could be used by the user at an affiliated store on the condition that the user would use the booth.

In an exemplary embodiment, the CPU 111 may determine to present information to encourage the user to reserve a booth and information that helps the user to kill time until the booth becomes available if the booth is being used by another user at the time the user passes the booth.

In an exemplary embodiment, a determination as to presentation of information on the booth to encourage the user to use the booth may be determined based on a level of interest of the user in the booth. Whether to present information about the booth to the user and/or content of the information about the booth to be presented to the user may be determined on the basis a level of interest of the user in the booth. For example, if the level of interest of the user in the booth is high, a reservation status of the booth, information for recommending reservation, and explanation of the booth may be presented to the user.

First Example about Booth

A process performed for the booth will be described using an example. User B, who is scheduled to attend a meeting at a customer's site from 13:00, is passing by booth X. The present time is 12:35. Time estimated to take to reach a place where the meeting will be held, which is a place of a next schedule, from a current position (in front of booth X) of user B on foot is slightly less than 5 minutes. In this case, a period of time for which user B can use booth X is 20 minutes at most, namely from 12:35 to 12:55. Booth X is currently unoccupied. There is no reservation for booth X until 15:00. The next schedule of user B is the meeting, which is a business schedule. A service provided with booth X is provision of a workspace.

The schedule information of the user does not include a schedule to use booth X. However, booth X may be used by user B to prepare or rehearse for his/her meeting. The service provided with booth X and the next schedule of user B are in a predetermined relationship that the service provided with booth X is likely to be suitable for the next schedule of user B. In this case, the CPU 111 may determine to suggest user B booth X that user B is not scheduled to visit. This is an example of the CPU 111 detecting presence of booth X around the user and making a determination as to presentation of information regarding booth X to the user based on schedule information of the user.

If a determination to present information regarding booth X to the user is made, the CPU 111 performs control such that the information regarding booth X is presented to the user. If determining that the information regarding booth X is not to be presented to the user, the CPU 111 performs control such that the information regarding booth X is not presented to the user.

The CPU 111 may make the determination as to the presentation of the information regarding booth X to the user based on a type of the next schedule of the user (e.g., meeting, date, etc.). If the next schedule of user B is a date, the CPU 111 may determine not to suggest user B booth X.

In an exemplary embodiment, as described later, information regarding related objects, which relate to peripheral objects around the user, may also be presented to the user. A determination as to the presentation of the information regarding the related objects may be made based, for example, on a type of schedule of the user or other information.

If there is user E, who can use booth X for 40 minutes, is around booth X, user E may be selected as a target user to suggest booth X more preferentially than user B.

Whether to suggest booth X to user B may be determined based on a past use tendency of booth X by user B. A case will be assumed, for example, where the past use tendency of booth X by user B has been referred to and it has been found that user B has almost never reserved for booth X in unit of less than 1 hour. The period of time for which user B can use booth X is 20 minutes as described above, which is different from the past use tendency of booth X by user B. In this case, a determination not to suggest booth X to user B at the moment may be made.

A case will be assumed where a person who manages hair salon H suggests his/her hair salon to a user around hair salon H.

Even if hair salon H is suggested to a user whose next schedule is to go to a different hair salon that is a competitor, a response from the user will not be one desired by the manager.

A user whose next schedule is "hair salon" is likely to have reserved his/her favorite hair salon. Since it is unlikely that a user whose next schedule is "hair salon" will go to a new hair salon after canceling a current reservation and/or paying a cancelation fee, a determination not to suggest hair salon H to a user with an appointment with a different hair salon.

A determination may be made to suggest hair salon H to a user with a strong motivation to go to a hair salon, such as a user who has enough time to make a visit to a hair salon and who has a date, lunch with friends, or another schedule that can motivate the user to dress up, a user who has not gone to a hair salon for a long time, and the like.

Second Example about Booth

User N, who is scheduled to attend a meeting at a customer's site from 17:00, is passing by booth X.

The present time is 15:50. Time estimated to take to reach a place where the meeting will be held, which is a place of a next schedule, from a current position of user N is 10 minutes. In this case, a period of time for which user N can use booth X is 60 minutes at most, namely from 15:50 to 16:50.

Booth X will be occupied until 16:00. Booth X, therefore, is not immediately available to user N.

In this case, the CPU 111 according to the present exemplary embodiment presents information for recommending user N who is passing by booth X to reserve booth X from 16:00, for example, as information regarding booth X, which is a peripheral object, and also presents a coupon of a service provision facility near booth B as information regarding a related object relating to booth X.

More specifically, in this example, the CPU 111 makes the determination as to the presentation of the information regarding booth X to the user based on schedule information (e.g., a place, a start time, and a type of a next schedule of the user) obtained for the user and booth status information (a reservation status and a use status of the booth), which is information indicating statuses of the booth. The CPU 111 also makes the determination as to the presentation of the information regarding the service provision facility near booth X based on the schedule information obtained for the user and the booth status information, which is the information indicating the statuses of the booth.

In this example, the CPU 111 determines that the information for recommending user N to reserve booth X from 16:00 and the coupon of the service provision facility near booth X are to be presented to user N.

When a service provision facility near booth X is selected in this case, a length of time from the present time to 16:00, when booth X becomes available to user N, and time taken to move back-and-forth between a location of user N (i.e., a position of booth X) and each of service provision facilities may be taken into consideration.

In this case, the service provision facility near booth X may be, for example, a convenience store. The coupon of the service provision facility near booth X may be, for example, a free coffee coupon.

Third Example about Booth

User N, who is scheduled to attend a meeting at a customer's site from 17:00, is passing by a service facility affiliated with booth X. The service facility is a 1-minute walk from booth X.

The present time is 15:47. Estimated time required to reach a place where the meeting will be held, which is a place of a next schedule of user H, from booth X is 10 minutes. In this case, a period of time for which user H can use booth X is 62 minutes at most, namely from 15:48 to 16:50.

Booth X will be occupied until 16:00. If user H keeps walking without stopping by any place, user H will pass by booth X at 15:48. In this case, booth X will still be being used by another user.

In this case, the CPU 111 presents information for recommending user H to use the service facility affiliated with booth X and information for recommending user H to reserve booth X from 16:00, for example, to user H.

If there are plural facilities affiliated with booth X, a facility to be suggested to user H is selected from the plural facilities.

More specifically, when one of the plural facilities is selected, a facility at which user H can kill time is selected from the plural facilities based on estimated time required to receive a service at each of the facilities (time calculated from stay time, wait time, treatment time, and the like) and time currently remaining until a start time of the reservation for booth X.

In addition, a facility to be combined with the reservation for booth X may be selected also based on a level of interest of user H in each of the facilities.

Figure 22:
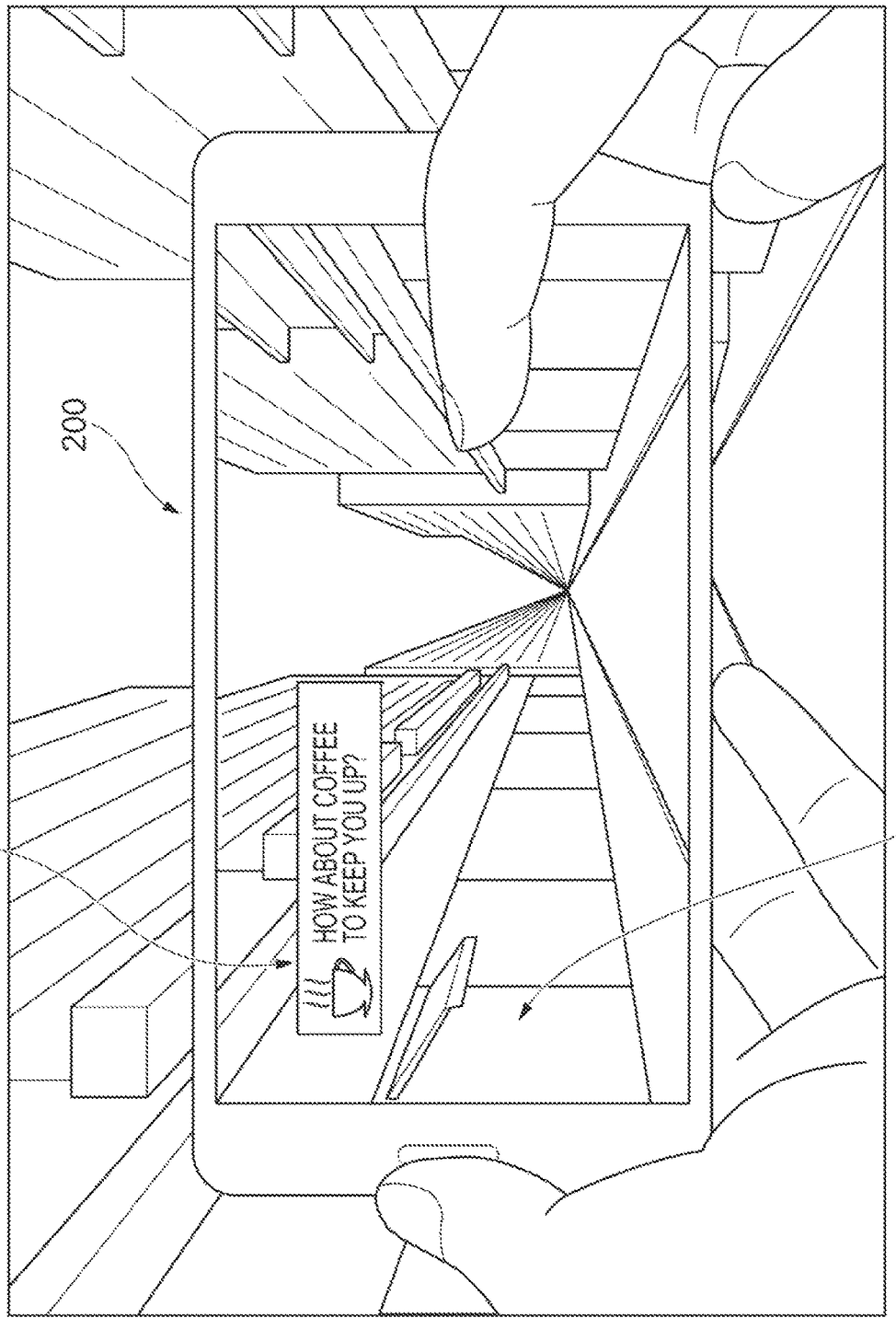
FIG. 22 is a diagram illustrating a user holding a terminal apparatus that is displaying information on a peripheral object around the user.

FIG. 22 is a diagram illustrating a user holding a terminal apparatus 200 that is displaying information on a peripheral object around the user. In this example, the terminal apparatus is smartphone-type.

In this example, a display screen on the terminal apparatus 200 at a time when the user's view includes coffeeshop S is assumed. Schedule information of the user does not include a schedule to visit Coffeeshop S.

The CPU 111 detects presence of coffeeshop S around the user as described earlier.

The CPU 111 makes a determination as to presentation of information regarding coffeeshop S to the user based on schedule information of the user. For example, the CPU 111 may determine content of information to be presented to the user as the information regarding coffeeshop S based on the schedule information regarding the user. More specifically, when the user is going to a meeting, the CPU 111 displays information, "How about coffee to keep you up?", for example, on the terminal apparatus 200 as the information regarding coffeeshop S.

If the user is identified to be on a trip, for example, the CPU 111 displays information, "Local coffee available!", on the terminal apparatus 200 as the information regarding coffeeshop S.

When this information is displayed on the terminal apparatus 200, the CPU 111 may perform control such that the information does not overlap coffeeshop S in the user's view.

In addition, if the schedule information regarding the user satisfies a predetermined condition, the CPU 111 performs control such that the information regarding coffeeshop S to be presented to the user includes promotion information regarding coffeeshop S.

If the user's time availability identified based on the schedule information regarding the user is higher than a predetermined threshold, for example, the CPU 111 performs control such that the information regarding coffeeshop S to be presented to the user includes the promotion information regarding coffeeshop S, such as "Coffee 10% off".

Examples of promotion information includes a coupon, a discount code, special price information, special offer information, or information regarding a free gift (e.g., a novelty gift or a free drink) or the like.

In addition, the CPU 111 performs control such that the information regarding coffeeshop S to be presented to a user who is likely to take away a product, such as a user with an immediate plan, includes the promotion information such as "Coffee 10% off".

A user who is likely to take away a product does not reduce a turnover rate of seats in a store. Such a user, therefore, contributes to sales when coming to a store.

A user without an immediate plan may be presented with only a congestion status and a rating of a store, and a discount coupon need not be presented.

If schedule information satisfies the predetermined condition, the CPU 111 performs control such that the information regarding coffeeshop S includes the promotion information regarding coffeeshop S.

If schedule information does not satisfy the predetermined condition, the CPU 111 performs control such that the information regarding coffeeshop S does not include the promotion information regarding coffeeshop S.

In an exemplary embodiment, information regarding a current schedule and a next schedule of a user (e.g., a place, a start time) may be obtained to determine information to be presented to the user.

In an exemplary embodiment, if it is found as a result of an analysis of schedule information regarding a user that the user is likely to be with persons relating to a current schedule or a next schedule, for example, the CPU 111 performs control such that the promotion information regarding coffeeshop S, such as "Coffee 10% off", is included.

In this case, it becomes more likely that products will be purchased not only for the user but also the persons relating to the current schedule or the next schedule.

When an object around a user is a hair salon, for example, a determination as to presentation of information regarding the hair salon to the user may be made based on schedule information regarding the user.

More specifically, when schedule information regarding a user is referred to and a date of the user's last scheduled haircut appointment is 3 months ago, for example, information for recommending a haircut is presented to the user. The information also includes promotion information such as "Haircut 30% off today only".

When schedule information regarding a user is referred to and a date of a last scheduled haircut appointment is 3 weeks ago, for example, information for recommending hair treatment is presented to the user. The information also includes promotion information such as "Hair treatment 30% off today only".

In an exemplary embodiment, the information regarding coffeeshop S or the hair salon to be presented to the user may be information that encourages the user to reserve a service provided at coffeeshop S or the hair salon.

In an exemplary embodiment, the CPU 111 may obtain information regarding schedules of each of plural users around a certain facility as schedule information.

The CPU 111 may then determine, based on the obtained schedule information, users to whom information regarding the facility is to be presented.

The information regarding the facility may be presented to not all the users around the facility but only users who satisfy a certain condition.

The certain condition may be, for example, a likelihood of visiting the facility. In this case, the information regarding the facility is presented to only users whose likelihood of visiting the facility exceeds a threshold.

The likelihood can be determined, for example, based on remaining time until a start time of a next schedule of each of the users. If, for example, the remaining time is a predetermined threshold or longer, it may be determined that the likelihood of visiting the facility is high. If the remaining time is shorter than the threshold, it may be determined that the likelihood of visiting the facility is low.

FIG. 23 is a diagram illustrating the terminal apparatus 200 displaying information on a peripheral object around the user and information on a related object related to the peripheral object.

In this example, a case will be described where a user whose view includes coffeeshop S is presented with information regarding another coffeeshop D, which is not included in the user's view (or is included in the user's view but not so near that the user can recognize).

In the example illustrated in FIG. 23, a display screen when a capture range of the camera 214 (not illustrated in FIG. 23) of the terminal apparatus 200 owned by the user includes coffeeshop S is described.

In this example, the information regarding coffeeshop D, which is not included in the capture range, is displayed in addition to the information regarding coffeeshop S.

Although coffeeshop S and coffeeshop D are managed by different managers, types of business of coffeeshop S and coffeeshop D are the same. That is, coffeeshop D is a related object that is in a predetermined relationship with coffeeshop S.

In this example, there are currently no empty seats in coffeeshop S, and customers are forming a long line to check out. Time taken for the user to purchase food and drink at coffeeshop S is estimated to be about 15 minutes based on the number of customers in the line. In this example, information indicating that wait time at coffeeshop S is 15 minutes is displayed.

In addition, in this example, information indicating that coffeeshop D is 50 m away from a current position and information indicating that wait time at coffeeshop D is 3 minutes are displayed as the information regarding coffeeshop D.

According to information (an example of schedule information) registered in a calendar of the user whose view includes coffeeshop S, a destination (a place of a next schedule) of the user is a concert hall (not illustrated) at an end of a road in front of the user.

Coffeeshop D, which has been presented to the user, is located between the current position of the user and the concert hall (an example of a place of a next schedule).

Coffeeshop D is located at such a position that the user can arrive in time for a start of a concert even if the user stops by coffeeshop D.

Alternatively, the information regarding coffeeshop D may be presented to the user if it is determined, based on not only time taken to reach the concert hall but also the wait time at coffeeshop D, that the user can arrive in time for the start of the concert.

In this example, first, the CPU 111 identifies presence of coffeeshop S around the user.

The CPU 111 then makes, based on the schedule information regarding the user, the determination as to the presentation of the information regarding coffeeshop D located at a place different from coffeeshop S around the user. More specifically, the CPU 111 makes the determination as to the presentation of the information regarding coffeeshop D, which is a related object that is in a predetermined relationship with coffeeshop S located around the user, to the user.

Here, coffeeshop D is not described in the schedule information regarding the user.

In an exemplary embodiment, a facility affiliated with coffeeshop S is identified using a database, which will be described later. A facility included in a user's view is identified. The database is then referred to find a related facility that is in a predetermined relationship with the facility.

There might be a case where there are plural related facilities relating to a single facility.

When there are plural related facilities relating to a peripheral facility identified to be around a user, for example, the CPU 111 determines, among the plural related facilities, a related facility for which information is to be presented to the user based on status information regarding the peripheral facility.

More specifically, when coffeeshop S identified to be around the user is crowded as described above, for example, the CPU 111 determines a related facility for which information is to be presented to the user based on a congestion status of each of the plural related facilities. For example, a related facility that is less crowded than coffeeshop S may be selected, or a least crowded related facility may be selected from among the plural related facilities.

In an exemplary embodiment, if there are plural related facilities for coffeeshop S, the CPU 111 may determine, among the plural related facilities, a related facility for which information is to be presented to the user based on status information regarding each of the plural related facilities.

In an exemplary embodiment, if there are plural related facilities for coffeeshop S, a related facility for which information is to be presented to the user may be determined among the plural related facilities based on a level of interest of the user in each of the plural related facilities.

In an exemplary embodiment, the CPU 111 may make the determination as to the presentation of the information regarding the related facilities relating to coffeeshop S based on status information regarding coffeeshop S around the user.

More specifically, if a congestion level of coffeeshop S is low, for example, the CPU 111 may keep from presenting the information regarding the related facilities. If the congestion level of coffeeshop S is high, the CPU 111 may present the information regarding the related facilities.

In an exemplary embodiment, the CPU 111 may change the amount of information regarding the related facilities to be presented in accordance with the congestion level of coffeeshop S. More specifically, as the congestion level of coffeeshop S becomes higher, the amount of information regarding the related facilities to be presented may be increased.

In an exemplary embodiment, at least one of following conditions may be used as a condition for presenting the information regarding coffeeshop D, which is a related facility relating to coffeeshop S around the user, to the user.

(1) The user prefers coffeeshop D to coffeeshop S.
(2) It is estimated that the user is interested in coffeeshops in general, such as when the user has kept looking at coffeeshop S for a certain period of time or longer.
(3) Coffeeshop D has an advantage over coffeeshop S. Specific examples of the condition (3) include a case where coffeeshop D provides a service in a shorter period of time than coffeeshop S, a case where coffeeshop D is more reasonable than coffeeshop S, and a case where there is currently a special offer at coffeeshop D.

(4) Coffeeshop D has a contract where information regarding coffeeshop D is presented to the user even when the user is not around coffeeshop D, and settings have been made accordingly.

(5) The user has made settings indicating that the user desires to receive information regarding coffeeshop D.

(6) It is difficult for the user to stop by coffeeshop S in consideration of a place and a start time of a next schedule but the user can stop by coffeeshop D.

The above-described presentation of the information regarding aroma shop U (refer to FIG. 20) to user Y around aroma shop K, too, can be regarded as an example of presentation of a related object that is in a predetermined relationship with a peripheral object around a user.

Whether a user desires presentation of a related object can be determined, for example, based on information indicating whether the user has enabled a function of presenting related object information or whether the user has paid for presentation of related object information.

In addition, one of following conditions may be used as a condition for keeping from presenting the information regarding coffeeshop D, which is a related facility relating to coffeeshop S around the user.

(1) The user dislikes coffeeshop D.
(2) The user is not interested in coffeeshops in general.
(3) The user has disabled the function of presenting related object information.
(4) A condition at coffeeshop D is worse than one at coffeeshop S.

Examples of a case where a condition at coffeeshop D is worse than that at coffeeshop S include a case where coffeeshop D takes more time to provide a service than coffeeshop S, a case where coffeeshop D is more expensive than coffeeshop S, and a case where there is a special offer at coffeeshop S.

(5) The manager of the information processing system 1 and coffeeshop S have a contract where the information regarding coffeeshop D is not displayed while the user is around coffeeshop S, and settings have been made accordingly.

More specifically, for example, such a case may be a case where there is a contract where a user who is passing by coffeeshop S is not presented with information regarding other stores of the same type of business, and settings have been made accordingly.

In order to directly place an advertisement on a brick-and-mortar store or display an advertisement or the like on a brick-and-mortar store using signage, for example, a person who desires to place the advertisement needs to get permission from the store or pay an advertising fee.

When information is displayed on a terminal apparatus 200, which is a user's personal belonging, however, even information regarding a competitor of a store in a view of the user can be displayed on the store. Depending on how the information is displayed, an exterior of the store may become hard to see.

This can lead to obstruction of business, destruction of scenery or the like.

When information regarding a related object relating to a peripheral object in a view of the user is displayed, the information regarding the related object may be displayed such that the information regarding the related object does not overlap the peripheral object in the user's view as much as possible.

In other words, the information regarding coffeeshop D may be presented to the user such that the information regarding coffeeshop D does not overlap coffeeshop S in the user's view.

The information regarding coffeeshop S may be displayed over coffeeshop S, and the information regarding coffeeshop D may avoid coffeeshop S and be displayed such that the information regarding coffeeshop D does not overlap coffeeshop S as much as possible.

The information regarding coffeeshop S need not be displayed over coffeeshop S, either. In this case, the CPU 111 recognizes coffeeshop S and displays the information regarding coffeeshop S such that the information regarding coffeeshop S does not overlap coffeeshop S in the user's view as much as possible.

FIG. 24A is a diagram illustrating another exemplary position to display the information on the related object.

As an example of a process for displaying the information regarding coffeeshop D such that the information regarding coffeeshop D does not overlap coffeeshop S in the user's view as much as possible, the information regarding coffeeshop D may be displayed, as indicated by a position 24A in FIG. 24A, at an edge or in a corner of the display screen of the terminal apparatus 200.

In another example, the CPU 111 may recognize coffeeshop S and display the information regarding coffeeshop D while avoiding coffeeshop S.

The CPU 111 may recognize a part where there are no other facilities and display the information regarding coffeeshop D in the part. More specifically, the CPU 111 may recognize a sky or a ground, more specifically a road, and display, as indicated by a position 24B or 24C in FIG. 24B, the information regarding coffeeshop D on the sky or the ground.

The CPU 111 may recognize road signs, passersby, bicycles, automobiles, and the like around the user and perform control such that the information regarding coffeeshop D does not overlap these. In an example, if an automobile approaches the user while the information regarding coffeeshop D is displayed, the information regarding coffeeshop D may be removed and, when the automobiles has passed, displayed again. In another example, as the automobile moves, the information regarding coffeeshop D may be moved such that the information regarding coffeeshop D avoids the automobile.

In addition, the CPU 111 may adjust the information regarding coffeeshop D in accordance with the size of an area where the information regarding coffeeshop D may be displayed. For example, the CPU 111 may adjust a position at which each of lines of text in the information regarding coffeeshop D ends, text size of the information regarding coffeeshop D, or a direction in which character strings in the information regarding coffeeshop D are displayed (e.g., when the character strings are usually displayed in a horizontal direction, the character strings are displayed in a vertical direction or a diagonal direction as a result of the adjustment) or simplify the information regarding coffeeshop D (e.g., make an excerpt of the information regarding coffeeshop D, express the information regarding coffeeshop D with words suitable for the size of the area, or replace some or all of the character strings in the information regarding coffeeshop D with abbreviations, signs, pictorial symbols, icons, or the like).

When the information regarding coffeeshop S identified to be located around the user is displayed such that the information regarding coffeeshop S does not overlap coffeeshop in the user's view, too, the same process as that performed when the information regarding coffeeshop D is displayed such that the information regarding coffeeshop D does not overlap coffeeshop S in the user's view may be performed.

That is, as an example of a process for displaying the information regarding coffeeshop S such that the information regarding coffeeshop S does not overlap coffeeshop S recognized by the user as much as possible, the information regarding coffeeshop S may be displayed at an edge or in a corner of the display screen of the terminal apparatus 200.

In another example, the CPU 111 may recognize coffeeshop S and display the information regarding coffeeshop S while avoiding coffeeshop S.

In another example, the CPU 111 may recognize a part where there are no other facilities and display the information regarding coffeeshop S in the part.

When the CPU 111 displays the information regarding coffeeshop S such that the information regarding coffeeshop S does not overlap coffeeshop S in the user's view, too, the CPU 111 may recognize road signs, passersby, bicycles, automobiles, and the like and perform control such that the information regarding coffeeshop S does not overlap these. In this case, as described above, if an automobile approaches the user while the information regarding coffeeshop S is displayed, the information regarding coffeeshop S may be removed and, when the automobiles has passed, displayed again. In another example, as the automobile moves, the information regarding coffeeshop S may be moved such that the information regarding coffeeshop S avoids the automobile.

When the CPU 111 displays the information regarding coffeeshop S such that the information regarding coffeeshop S does not overlap coffeeshop S, the information regarding coffeeshop S may be adjusted in accordance with the size of an area where the information regarding coffeeshop S may be displayed, as in the process for displaying the information regarding coffeeshop D.

The CPU 111 may obtain information regarding schedules of each of plural users around coffeeshop S as schedule information.

The CPU 111 may then determine, among the plural users based on the schedule information, users to whom the information regarding coffeeshop D is to be presented.

In this case, the information regarding coffeeshop D is presented to not all the plural users around coffeeshop S but only users who satisfy a certain condition.

The certain condition may be, for example, a likelihood of visiting coffeeshop D, that is, a likelihood of a user visiting coffeeshop D if the coffeeshop D were suggested to the user may be used as the certain condition. In this case, the information regarding coffeeshop D is presented to only users whose likelihood exceeds a threshold.

The likelihood may be obtained, for example, based on remaining time until a next schedule of a user. Alternatively, the likelihood may be obtained, for example, based on a level of interest of a user in coffeeshop D.

Figure 24B:
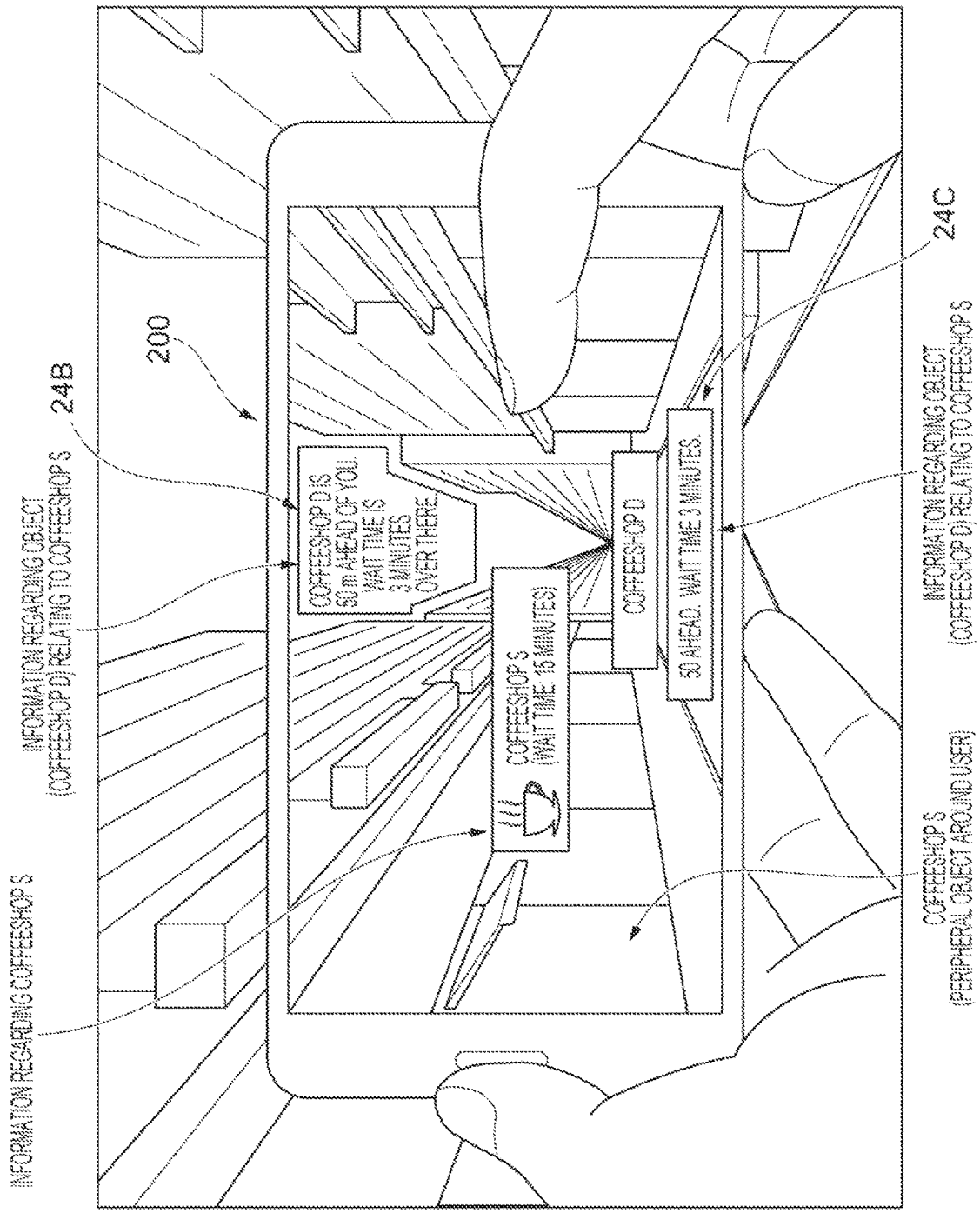
FIG. 24B is a diagram illustrating other exemplary positions to display the information on the related object.

Although a distance to coffeeshop D and wait time at coffeeshop D are displayed as the information regarding coffeeshop D in the examples illustrated in FIGS. 23, 24A, and 24B, information to be displayed is not limited to these.

For example, information for prompting a user to reserve a service, such as "There is coffeeshop D 50 m ahead. If you place your order now, you can get it fast" or "There is coffeeshop D 50 m ahead. Would you like to order now so that you can get it when you arrive at the shop?", may be presented to a user.

In other words, the information regarding coffeeshop D to be presented to a user may be information for prompting the user to reserve a service provided at coffeeshop D.

Modes of displaying the information for prompting the user to reserve the service may include a mode in which only a reservation button or a link to a reservation website is displayed.

The user prompted to reserve the service provided at coffeeshop D can reserve the service, for example, by using an application for coffeeshop D installed on the terminal apparatus 200.

When the reservation button or the link to the reservation website is displayed as described above, the user can reserve the service provided at coffeeshop D by using the reservation button or the link to the reservation website.

Alternatively, the information regarding coffeeshop S need not be displayed, and only the information regarding coffeeshop D may be displayed as illustrated in FIG. 25 (a diagram illustrating another example of the display screen on the terminal apparatus 200).

In the example illustrated in FIG. 25, the CPU 111 recognizes presence of coffeeshop S around the user, and the information regarding coffeeshop D identified as a related object relating to coffeeshop S is displayed. The information regarding coffeeshop S, however, is not displayed.

Although the information regarding coffeeshop S is displayed in the examples illustrated in FIGS. 22, 23, 24A, and 24B, coffeeshop S is located near the user, and the user sees coffeeshop S.

In this case, even if the information regarding coffeeshop S is not presented, the user can recognize a name and a congestion status of coffeeshop S just by looking at coffeeshop S.

When information regarding a peripheral object around a user is not presented to the user and only information regarding a related object relating to the peripheral object is presented as illustrated in FIG. 25, the amount of information displayed on a display screen is reduced, and the user can easily see the display screen.

Figure 26:
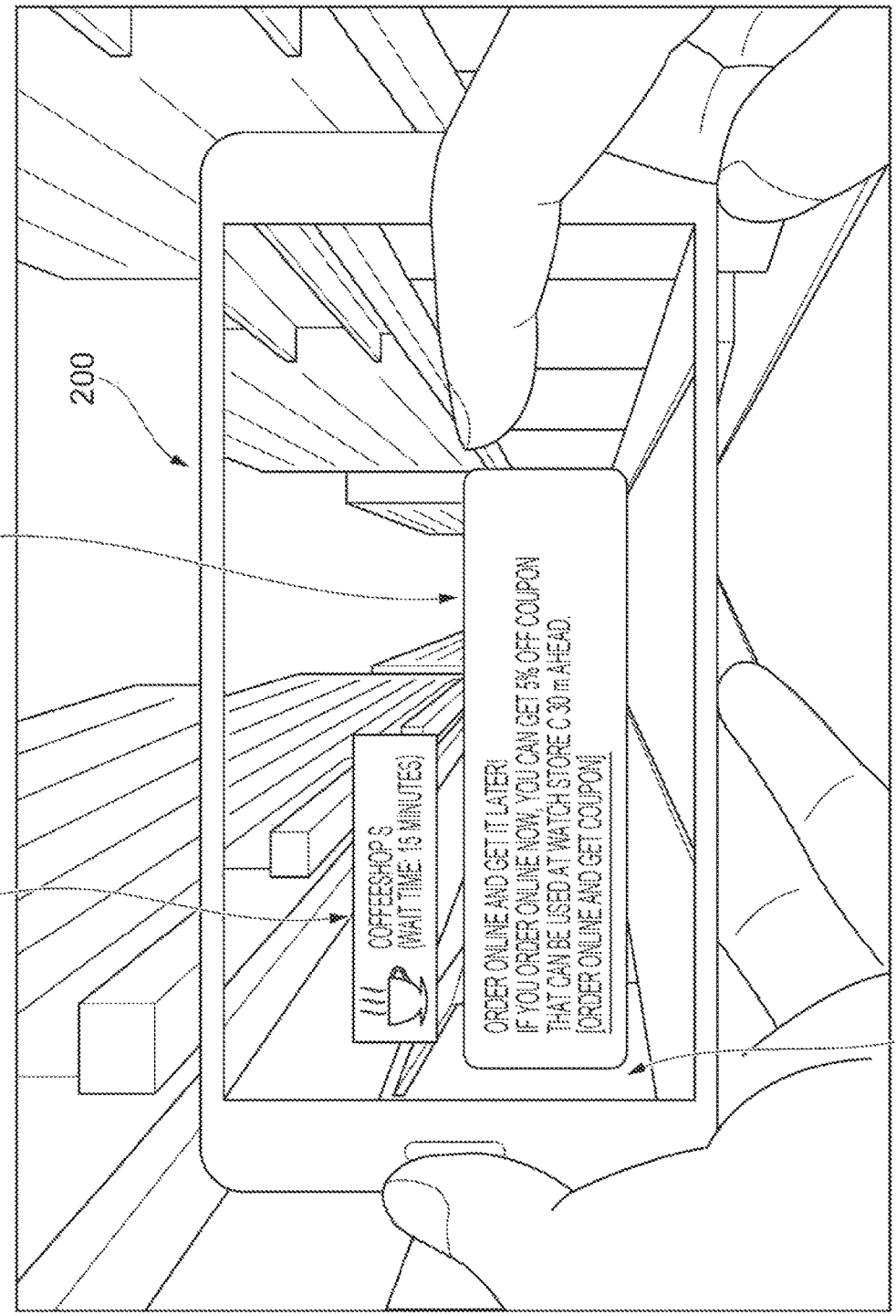
FIG. 26 is a diagram illustrating the terminal apparatus displaying information on a peripheral object around the user and exemplary information on a related object related to the peripheral object.

FIG. 26 is a diagram illustrating the terminal apparatus displaying information on a peripheral object around the user and exemplary information on a related object related to the peripheral object. This is an example of a display screen at a time when a user who has time longer than or equal to a predetermined threshold until a next schedule has walked to coffeeshop S. That is, coffeeshop S is a peripheral object around the user at this time.

In this example, the user who has walked to coffeeshop S likes coffeeshop S. In addition, coffeeshop S is crowed in this example.

In this example, a case is assumed where information regarding watch store C is displayed as related object information regarding a related object that is in a predetermined relationship with coffeeshop S.

In this example, information indicating that if the user orders a product sold at coffeeshop S, the user can receive a discount coupon that can be used at watch store C is displayed.

More specifically, in this example, information indicating that if the user orders a product sold at a coffeeshop S online, the user can receive a 5% off coupon that can be used at watch store C is displayed.

In this example, the CPU 111 displays promotion information regarding watch store C as information regarding a related object that is in a predetermined relationship with coffeeshop S recognized as a peripheral object around the user.

More specifically, in this example, the CPU 111 displays the promotion information regarding watch store C, which is conditional on use of coffeeshop S, which is a peripheral object around the user, as information regarding a relating object relating to coffeeshop S.

In this example, the user's wait time at coffeeshop S is 15 minutes. Even if the user orders a product sold at coffeeshop S online, therefore, the user will not be able to receive the product for at least the next 15 minutes or longer, and the user has to time to kill before he/she receives the product.

If the user is given the 5% off coupon that can be used at watch store C, it becomes more likely that the user will go to watch store C using the time.

When plural candidates for a related object relating to a peripheral object (here, coffeeshop S), a better candidate may be selected from among the candidates. More specifically, a related object for which information is to be presented to the user may be selected, for example, based on the wait time at coffeeshop S, a distance between coffeeshop S and each of the candidates, time taken to move between coffeeshop S and each of the candidates, time taken to receive a service at each of the candidates, the user's interest, or any selective combination of two or more of these.

Time taken to move between coffeeshop S and watch store C is 2.5 minutes in this example. Average stay time at watch store C is 9.5 minutes.

In this case, if the user returns to coffeeshop S after staying at watch store C for the average stay time, the user can receive the ordered product at coffeeshop S in a timely manner.

Figure 27:
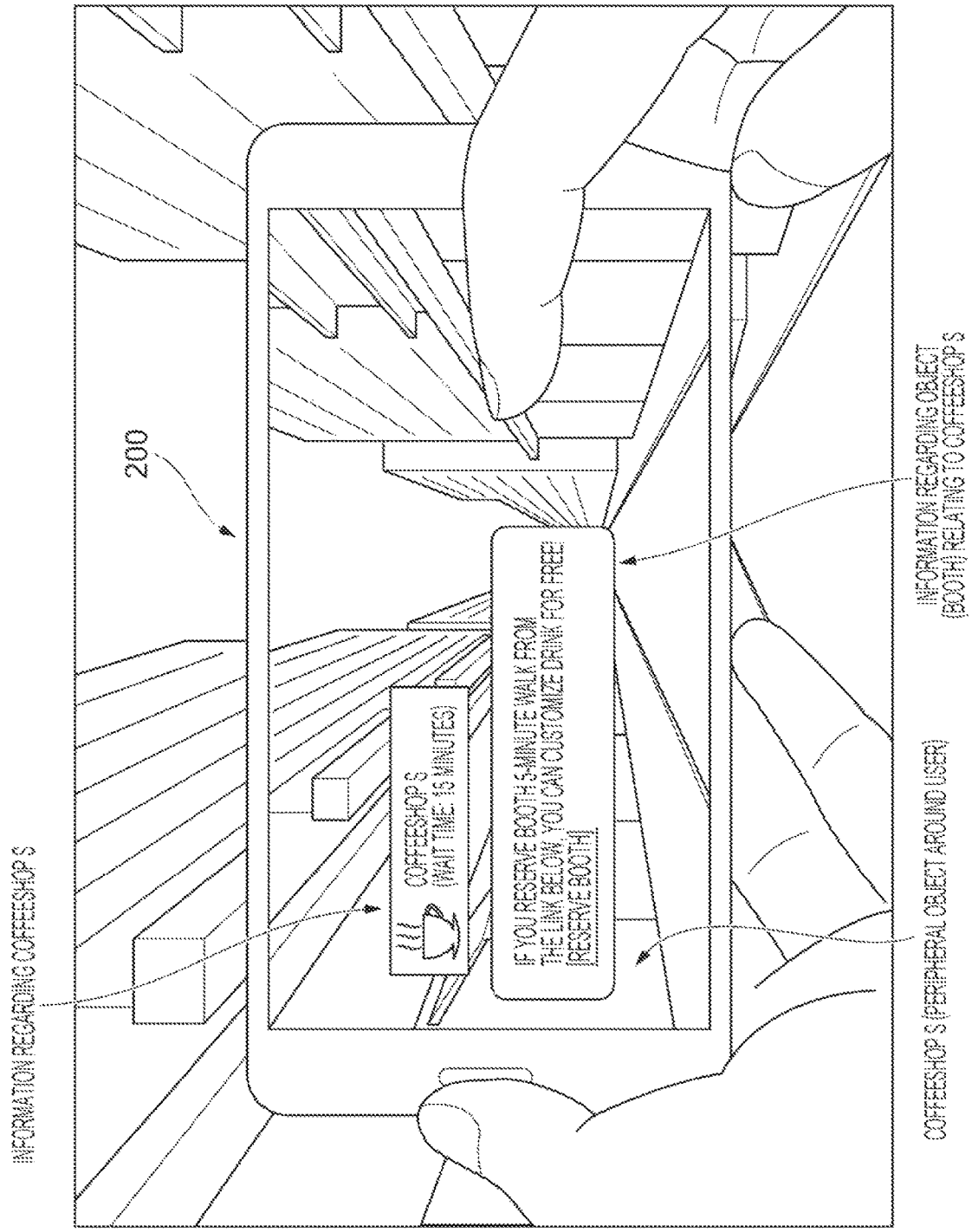
FIG. 27 is a diagram illustrating the terminal apparatus displaying information on a peripheral object around the user and exemplary information on a related object related to the peripheral object.

FIG. 27 illustrates the terminal apparatus 200 displaying information on a peripheral object around the user and exemplary information on a related object related to the peripheral object.

This is an example where a user whose next schedule is a meeting and who has time longer than or equal to a predetermined threshold until the next schedule has moved to a front of coffeeshop S. That is, coffeeshop S is a peripheral object around the user at this time.

In this example, information regarding a booth affiliated with coffeeshop S is displayed as information regarding a related object that is in a predetermined relationship with coffeeshop recognized as the peripheral object around the user. The booth is a 5-minute walk from coffeeshop S.

In this example, information indicating that time taken to reach the booth is 5 minutes and a link for reserving the booth are displayed as the information regarding the booth.

In this example, if the user selects the link, a display screen for reserving the booth is displayed.

In this example, the CPU 111 displays promotion information regarding coffeeshop S that is conditional on use of the booth.

More specifically, in this example, information indicating that if the user reserves the booth, a drink sold at coffeeshop S can be customized for free is displayed as the promotion information.

In the example illustrated in FIG. 27, the promotion information indicating that a drink sold at coffeeshop S can be customized for free is displayed as the information regarding the peripheral object around the user. The information indicating that the time taken to reach the booth is 5 minutes and the link for reserving the booth are also displayed as the information regarding the related object relating to the peripheral object.

Figure 28:
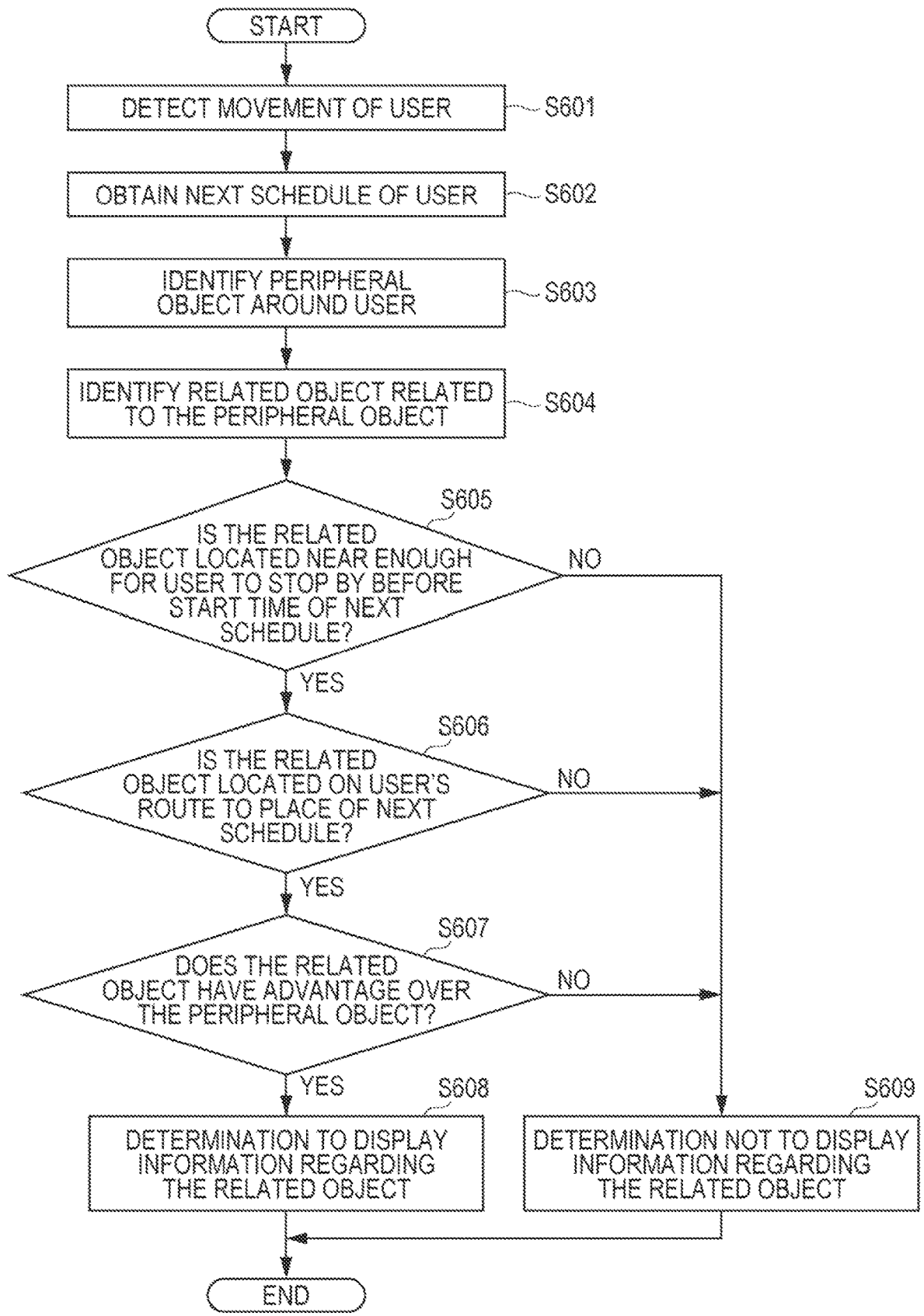
FIG. 28 is a flowchart illustrating an exemplary process to determine whether to present related object information to the user.

FIG. 28 is a flowchart illustrating an exemplary process to determine whether to present related object information to the user with reference to FIGS. 23 to 27.

In an exemplary embodiment, if movement of a user is detected (step S601), information regarding a next schedule of the user is obtained (step S602).

Next, peripheral objects around the user are sequentially identified (step S603). In other words, facilities included in an image obtained by a camera 214 provided for a terminal apparatus 200 owned by the user are sequentially identified.

Furthermore, in an exemplary embodiment, each time a peripheral object is identified, a related object relating to the identified peripheral object is identified (step S604).

Whether the related object identified in step S604 is near enough for the user to stop by before a start time of the next schedule of the user is then determined (step S605).

If so, whether the related object is along a route used by the user to go to a place of the next schedule is determined (step S606).

Furthermore, in an exemplary embodiment, whether the related object has an advantage over the peripheral object is determined (step S607).

If it is determined in step S607 that the related object has an advantage over the peripheral object, it is determined that information regarding the related object is to be displayed (step S608).

If it is determined in step S605 that the related object is not near enough for the user to stop by, if it is determined in step S606 that the related object is not along the route, or if it is determined in step S607 that the related object does not have an advantage over the peripheral object, on the other hand, the process proceeds to step S609.

In step S609, it is determined that the information regarding the related object is not to be displayed.

Steps S605 to S607 are not mandatory, and only one or two of these steps may be performed, instead. Alternatively, if a related object is identified in step S604, information regarding the related object may be displayed without performing these steps. Alternatively, both information regarding a related object and information regarding a peripheral object may be displayed.

FIG. 29 is a diagram illustrating an exemplary database to be referred to by the CPU 111 when peripheral object information and/or related object information are displayed. The database is stored, for example, in the information storage device 102 of the external server 100 (refer to FIG. 2).

In an exemplary embodiment, information regarding facilities is registered in the database as illustrated in FIG. 29. More specifically, facility IDs, facility names, positional information, types of business, ratings, current congestion statuses, approximate stay time, takeaway availability, online reservation availability, URLs for online reservation, whether to display as related facilities, affiliated facilities, presence or absence of a promotion are registered. As positional information, information regarding longitude and latitude or information regarding coordinates on an electronic map, for example, is registered. Details of promotions, notifications from facilities, business hours of facilities may also be registered in the database. The database may be regarded as an example of a database storing information to be presented to a user or an example of a database storing information used to determine information to be presented to a user.

In an exemplary embodiment, in step S604, facilities in a predetermined relationship with coffeeshop S are identified using the database. In an example, a field of "affiliated facilities" of the database is referred to, and facilities affiliated with coffeeshop S are identified.

Facilities in a predetermined relationship are not limited to affiliated facilities. In another example, a field of "positional information" may be referred to, and facilities within a certain distance may be identified as facilities in a predetermined relationship. In another example, a field of "type of business" may be referred to, and facilities of the same type of business may be identified as facilities in a predetermined relationship. Alternatively, facilities that are in plural predetermined relationships, such as affiliated facilities of the same type of business, may be identified. Alternatively, order of priority may be given to plural predetermined relationships. If there is a facility that is in a first relationship, the facility may be identified, and if not, a facility that is in a second relationship may be identified.

In an exemplary embodiment, in step S605, the field of "positional information" of the related facility identified in step S604 is referred to, for example, and whether the related facility identified in step S604 is near enough for the user to stop by before the start time of the next schedule is determined based on positional information, the present time, a current position of the user, and a place and the start time of the next schedule. In addition, not only the field of "positional information" of the related facility but also a field of "congestion status" may be referred to, and whether the user has time to receive a service at the related facility may be determined in consideration of, for example, wait time that can be caused to the user at the related facility.

In an exemplary embodiment, in step S606, the field of "positional information" of the related facility identified in step S604 is referred to, for example, and whether the related facility identified in step S604 is along a route to the place of the next schedule is determined based on the current position of the user and the place and the start time of the next schedule.

In an exemplary embodiment, in step S607, the field of "congestion status" of one of the peripheral facilities identified in step S603 and the field of "congestion status" of the related facility that has been identified in step S604 and that corresponds to the peripheral facility are referred to, for example, and if wait time at the related facility is shorter than wait time at the peripheral facility, it is determined that the related facility has an advantage over the peripheral facility.

In an exemplary embodiment, it is determined as a result of this process that the information regarding coffeeshop D is to be displayed. In the examples illustrated in FIGS. 23, 24A, 24B, and 25, the information regarding coffeeshop D in a predetermined relationship with coffeeshop S is displayed on the terminal apparatus 200 owned by the user who is located near coffeeshop S. Information regarding a distance to coffeeshop D and expected waiting time at coffeeshop D may be obtained for example by referring to the database illustrated in FIG. 29.

The components described above are not limited to the above exemplary embodiments and may be modified without deviating from the scope of the claims. In other words, it should be understood that modes and details of the components may be modified in various ways without deviating from the scope and range of the claims.

For example, some of the components described above may be omitted, or other functions may be added to the above-described components.

Although plural exemplary embodiments have been described above, a component included in one exemplary embodiment may be replaced with a component included in another exemplary embodiment, or a component included in one exemplary embodiment may be added to another exemplary embodiment.

The term "processor" refers to hardware in a broad sense. Examples of the processor include general processors (e.g., CPU: Central Processing Unit) and dedicated processors (e.g., GPU: Graphics Processing Unit, ASIC: Application Specific Integrated Circuit, FPGA: Field Programmable Gate Array, and programmable logic device).

The term "processor" is broad enough to encompass one processor or plural processors in collaboration which are located physically apart from each other but may work cooperatively. The order of operations of the processor is not limited to one described in the embodiments above, and may be changed.

The foregoing description of the exemplary embodiments of the present disclosure has been provided for the purposes of illustration and description. It is not intended to be exhaustive or to limit the disclosure to the precise forms disclosed. Obviously, many modifications and variations will be apparent to practitioners skilled in the art. The embodiments were chosen and described in order to best explain the principles of the disclosure and its practical applications, thereby enabling others skilled in the art to understand the disclosure for various embodiments and with the various modifications as are suited to the particular use contemplated. It is intended that the scope of the disclosure be defined by the following claims and their equivalents.

What is claimed is:

1. An information processing apparatus comprising:
a processor configured to:
    obtain schedule information of a user;
    determine, based on the schedule information of the user, facility information to present to the user, the facility information including information on one or more facilities the user is not scheduled to visit around a current position of the user;
    present the facility information to the user;
    obtain a movement history of the user;
    determine, based on the movement history, whether the user has used a route from the current position of the user to a destination, at a frequency greater than or equal to a threshold;
    when the frequency is greater than or equal to the threshold, do not guide the route of the user; and
    when the frequency is less than the threshold, guide the route of the user.

2. The information processing apparatus according to claim 1,
    wherein the processor is configured to determine to present no facility information if the schedule information satisfies a predetermined condition.

3. The information processing apparatus according to claim 1,
    wherein the processor is configured to adjust an amount of the facility information to present to the user based on the schedule information.

4. The information processing apparatus according to claim 1,
    wherein the schedule information includes at least one of:
    (a) a scheduled time;
    (b) a type of schedule;
    (c) a person related to a schedule other than the user; and
    (d) a memo of the user about a schedule.

5. The information processing apparatus according to claim 1,
wherein the schedule information includes:
(a) at least one of a start time and an end time of a schedule; and
(b) a place of the schedule.

6. The information processing apparatus according to claim 5,
wherein the processor is configured to determine the facility information to present to the user based on time currently remaining until the start time and estimated time required to reach the place of the schedule from the current position.

7. The information processing apparatus according to claim 1,
wherein the processor is configured to:
obtain interest information of the user in a target; and
determine the facility information based on the schedule information and the interest information.

8. The information processing apparatus according to claim 1,
wherein the processor is configured to:
determine, based on the schedule information, whether a route the user will take within a predetermined period of time has a target along the route; and
change content of the facility information depending on a determination whether a route the user will take within a predetermined period of time has a target along the route.

9. The information processing apparatus according to claim 1,
wherein the processor is configured to:
determine whether present time is after a last schedule of the user within a predetermined period of time; and
change content of the facility information depending on a result of the determination.

10. The information processing apparatus according to claim 1,
wherein the schedule information includes a place of a schedule, wherein the processor is configured to determine content of the facility information based on a distribution of facilities between the place of the schedule and a current position of the user.

11. The information processing apparatus according to claim 1,
wherein the processor is configured to:
obtain status information, which is information regarding a status of each facility around the user; and
determine whether to include information regarding each of the facilities in the facility information on a basis of the schedule information and the status information.

12. The information processing apparatus according to claim 1,
wherein the processor is configured to:
determine, based on the schedule information, whether the user is in a predetermined state; and
control the facility information to include information on a facility corresponding to the predetermined state among a plurality of facilities around the current position of the user.

13. The information processing apparatus according to claim 1,
wherein the processor is configured to:
determine, based on the schedule information, whether the user is in a predetermined state; and
in response to a determination that the user is in a predetermined condition, control to present, to the user, route guidance information, which is information indicating a route from the current position of the user to a destination.

14. The information processing apparatus according to claim 1,
wherein the schedule information includes a person relating to a schedule other than the user,
wherein the processor is configured to perform control such that information regarding a store that suits interest of the person or a store that sells a product which suits the interest of the person is presented to the user as the facility information.

15. The information processing apparatus according to claim 1,
wherein the processor is configured to identify the one or more facilities around the current position of the user based on image data obtained by a camera on a terminal apparatus that is carried by the user.

16. The information processing apparatus according to claim 1,
wherein the processor is configured to identify the one or more facilities around the current position of the user based on the current position of the user, a direction the user is facing, and an electronic map.

17. The information processing apparatus according to claim 1, further comprising:
a transparent part,
wherein the user sees a real-world space through the transparent part, and
wherein the facility information is displayed on the transparent part in such manner that information on each facility is associated with the facility in the real-world space seen through the transparent part.

18. The information processing apparatus according to claim 1,
wherein the information processing apparatus communicates with a terminal apparatus that is carried by the user, and
wherein the processor is configured to control the facility information displayed on the terminal apparatus.

19. A non-transitory computer readable medium storing a program causing a computer to execute a process comprising:
obtaining schedule information of a user;
determining, based on the schedule information of the user, facility information to present to the user, the facility information including information on one or more facilities the user is not scheduled to visit around a current position of the user; and
presenting the facility information to the user;
obtaining a movement history of the user;
determining, based on the movement history, whether the user has used a route from the current position of the user to a destination, at a frequency greater than or equal to a threshold;
when the frequency is greater than or equal to the threshold, not guiding the route of the user; and
when the frequency is less than the threshold, guiding the route of the user,
wherein the computer executes the process.

20. A method comprising:
obtaining schedule information of a user;
determining, based on the schedule information of the user, facility information to present to the user, the facility information including information on one or more facilities the user is not scheduled to visit around a current position of the user; and presenting the facility information to the user;

obtaining a movement history of the user;

determining, based on the movement history, whether the user has used a route from the current position of the user to a destination, at a frequency greater than or equal to a threshold;

when the frequency is greater than or equal to the threshold, not guiding the route of the user; and when the frequency is less than the threshold, guiding the route of the user, wherein the method is implemented by a processor.

* * * * *